J. T. HOWIESON.
CALCULATING MACHINE.
APPLICATION FILED JULY 29, 1901.
1,178,806.
Patented Apr. 11, 1916.
27 SHEETS—SHEET 1.
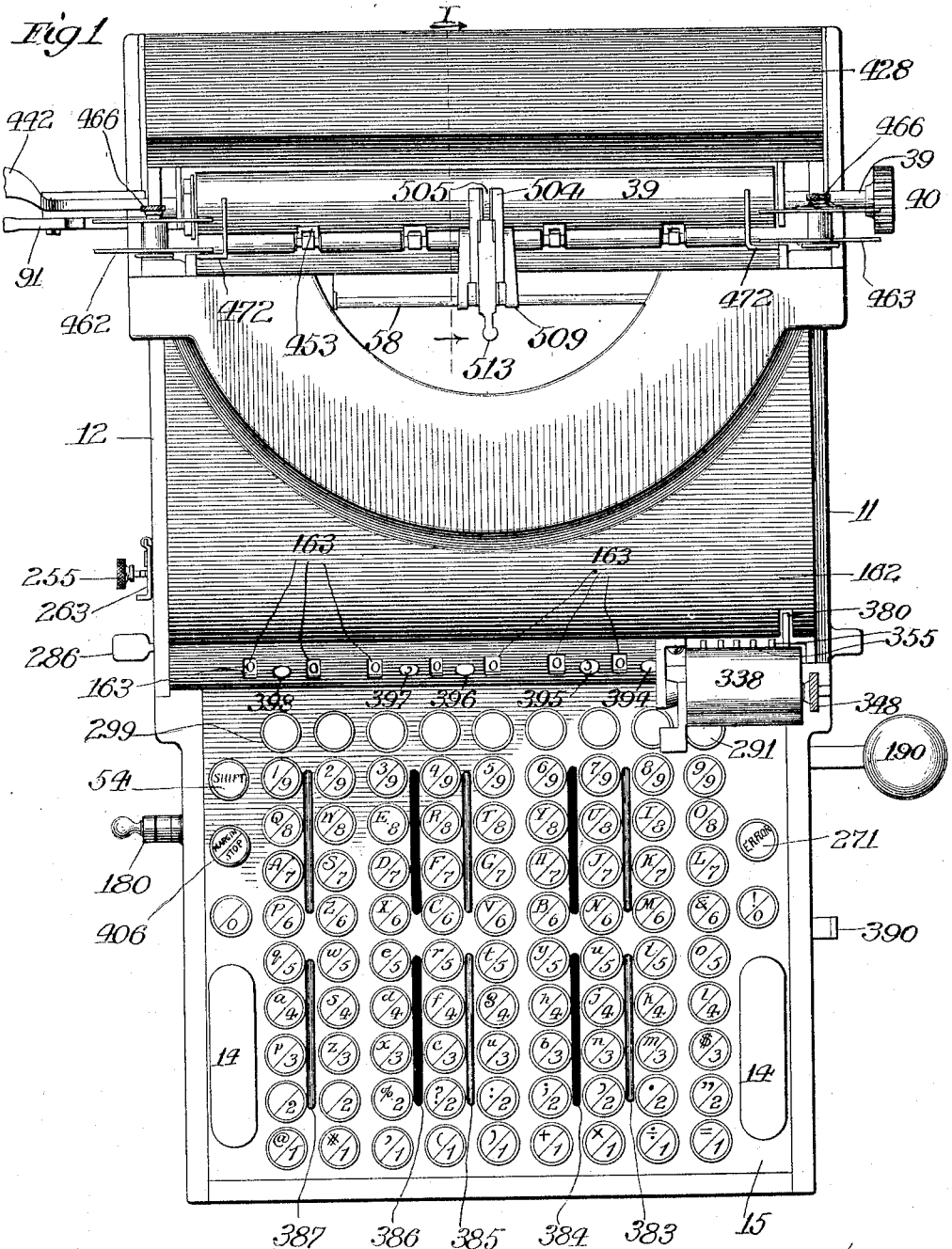

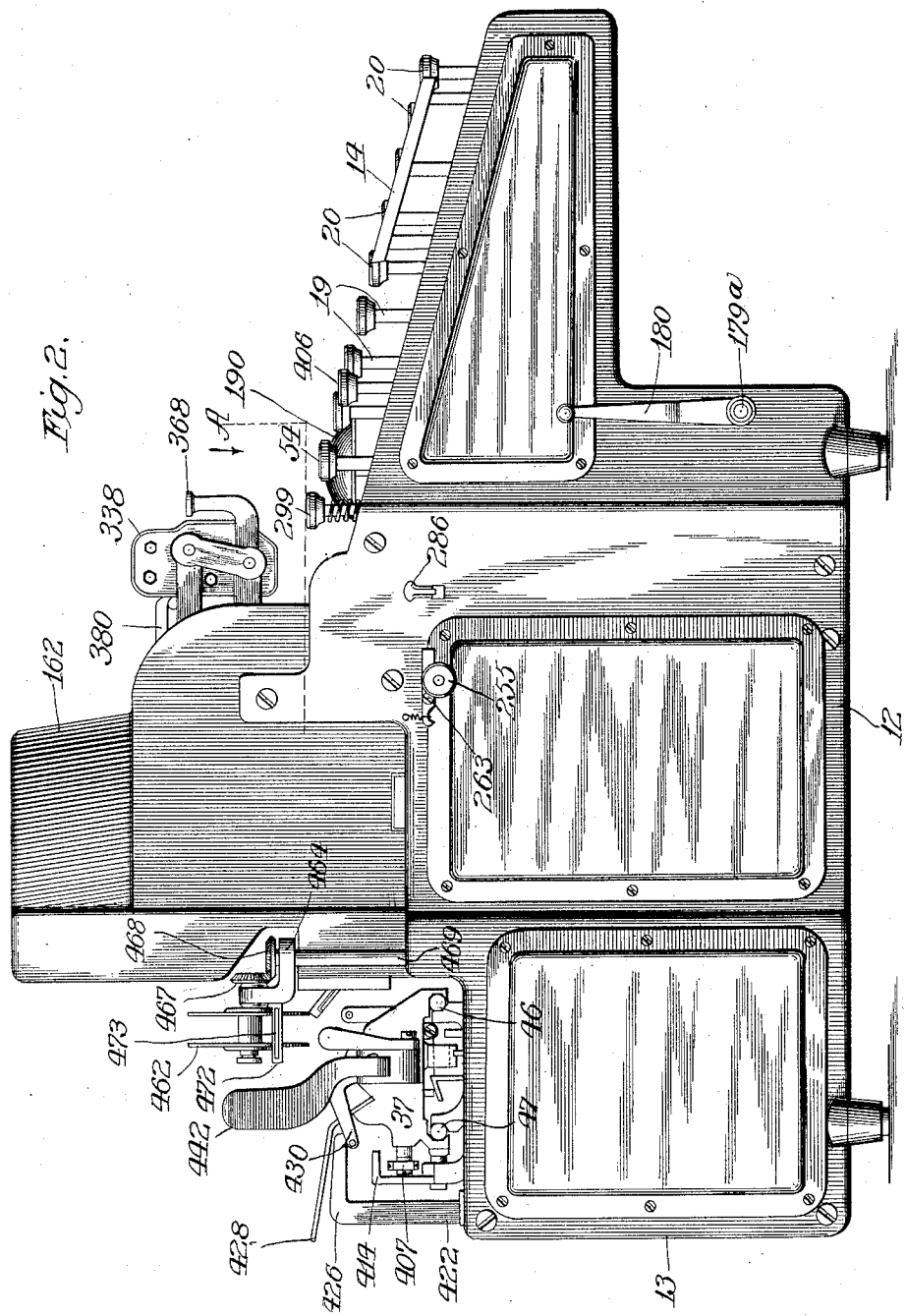

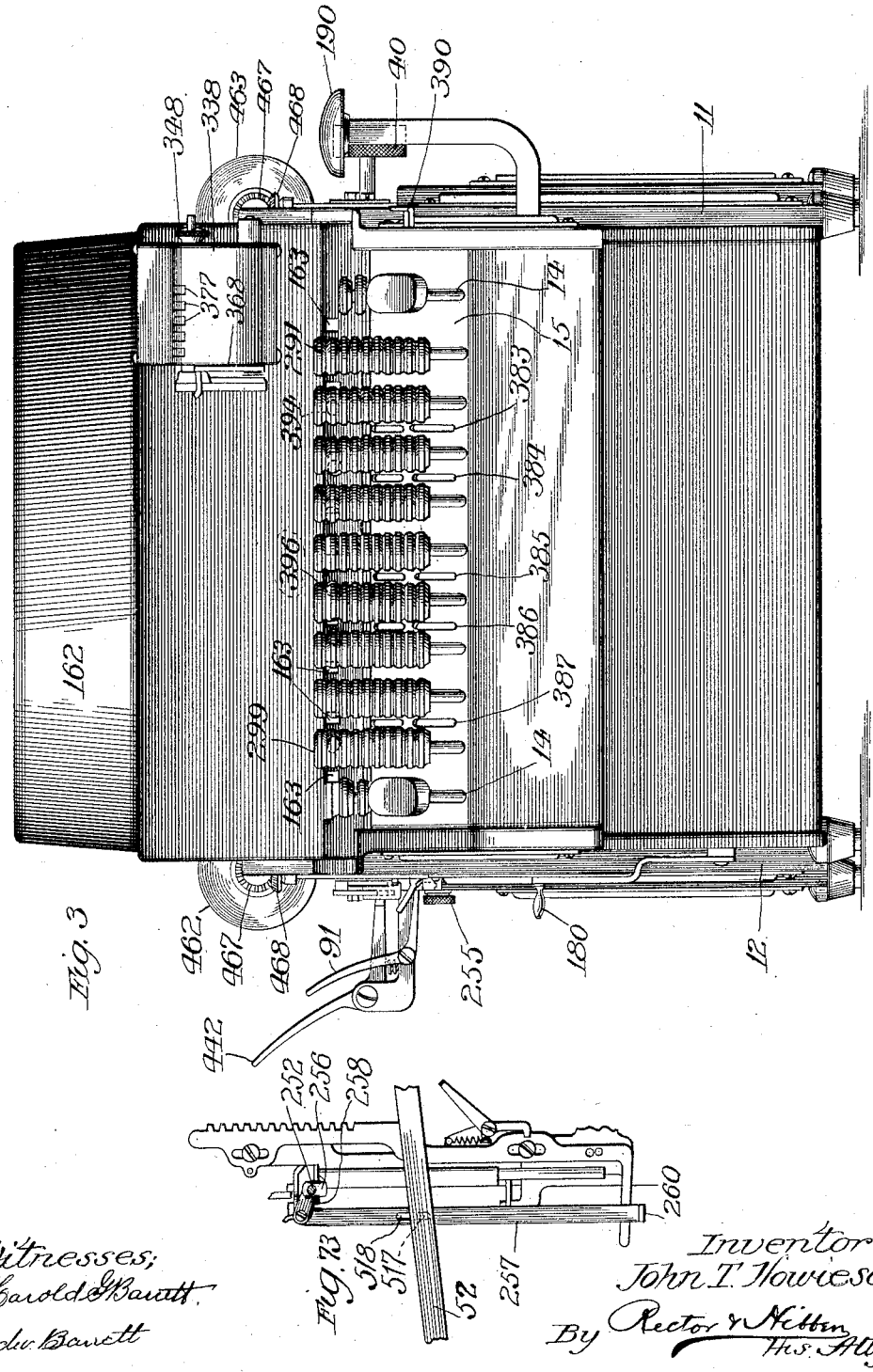

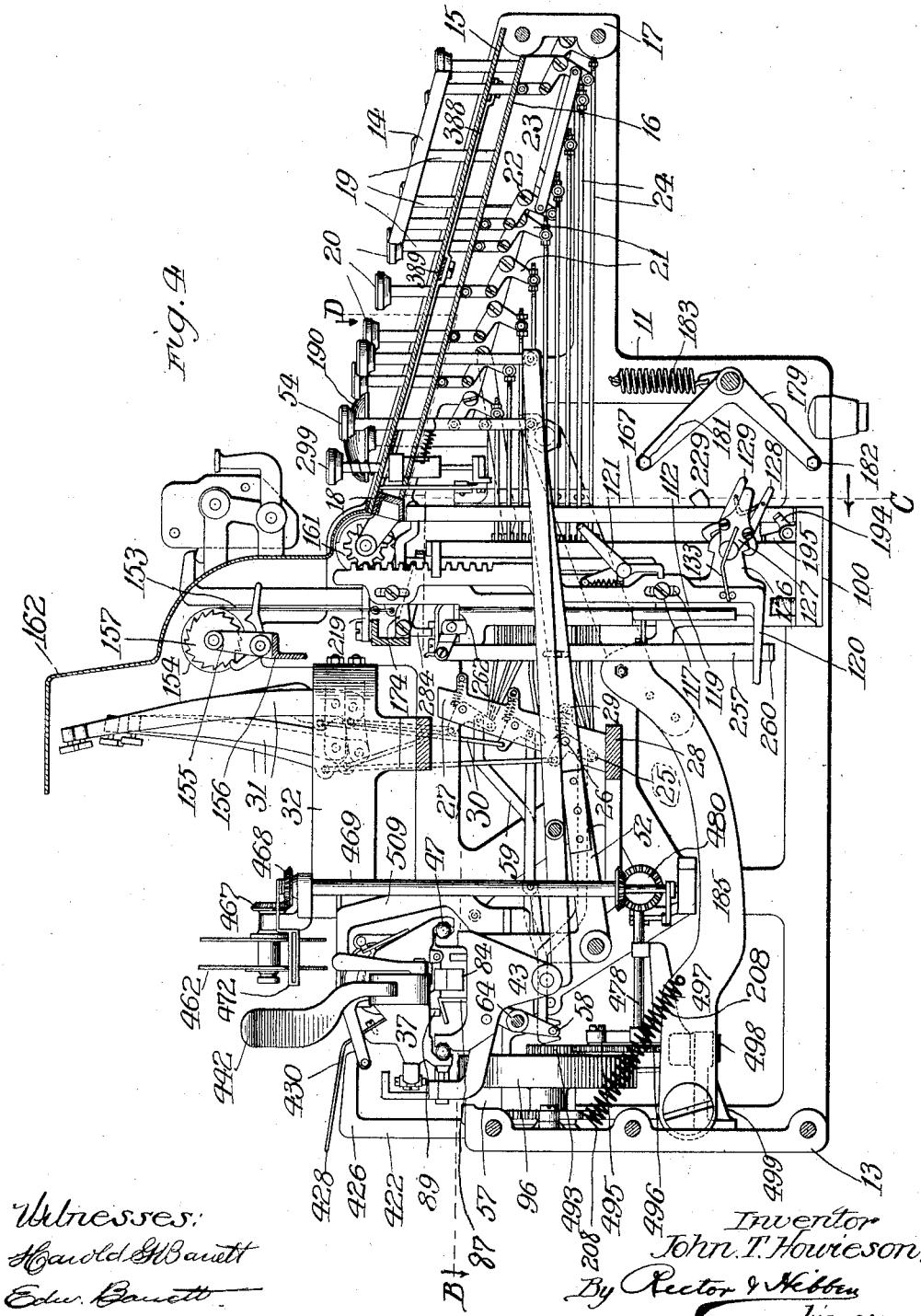

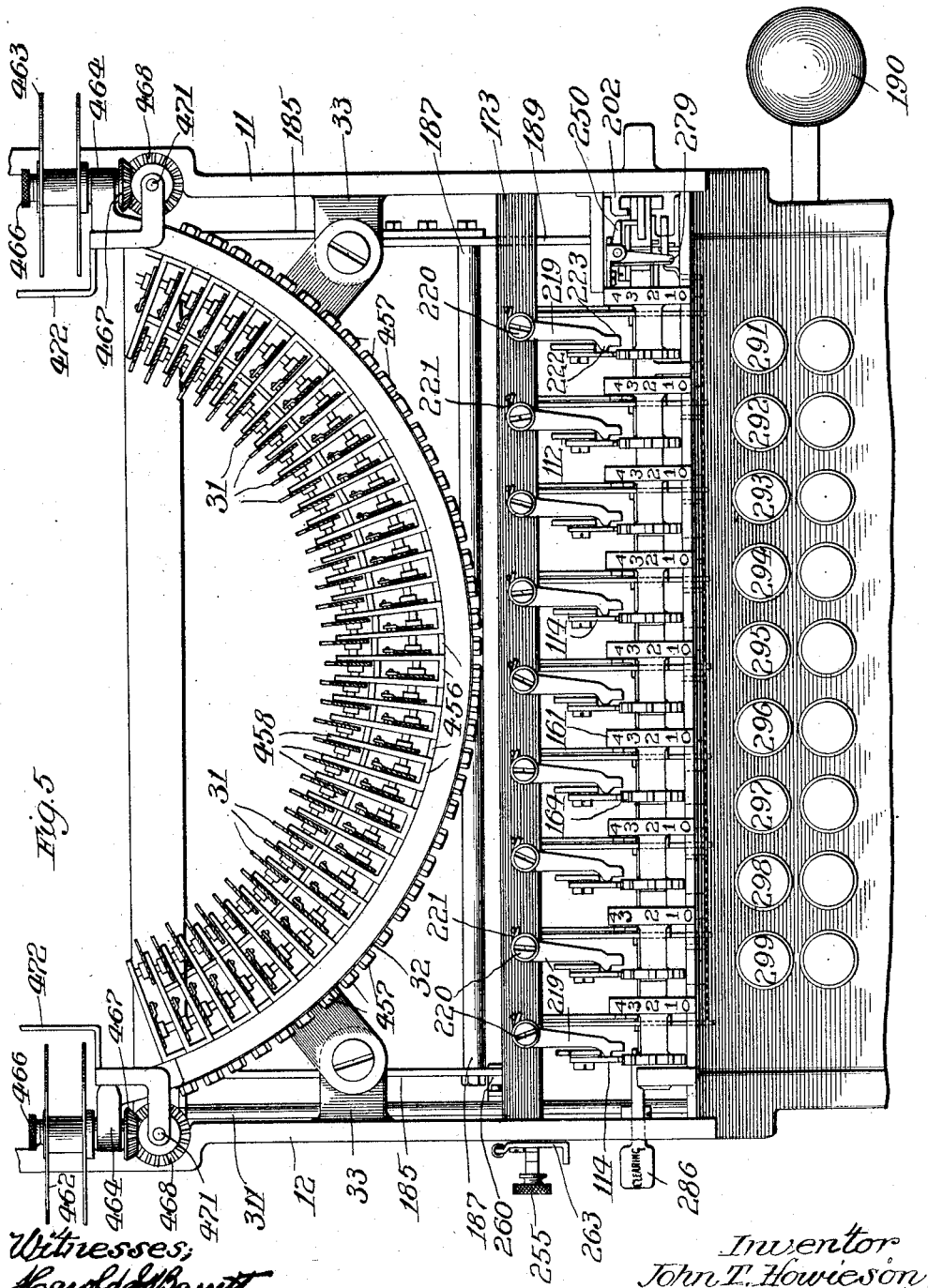

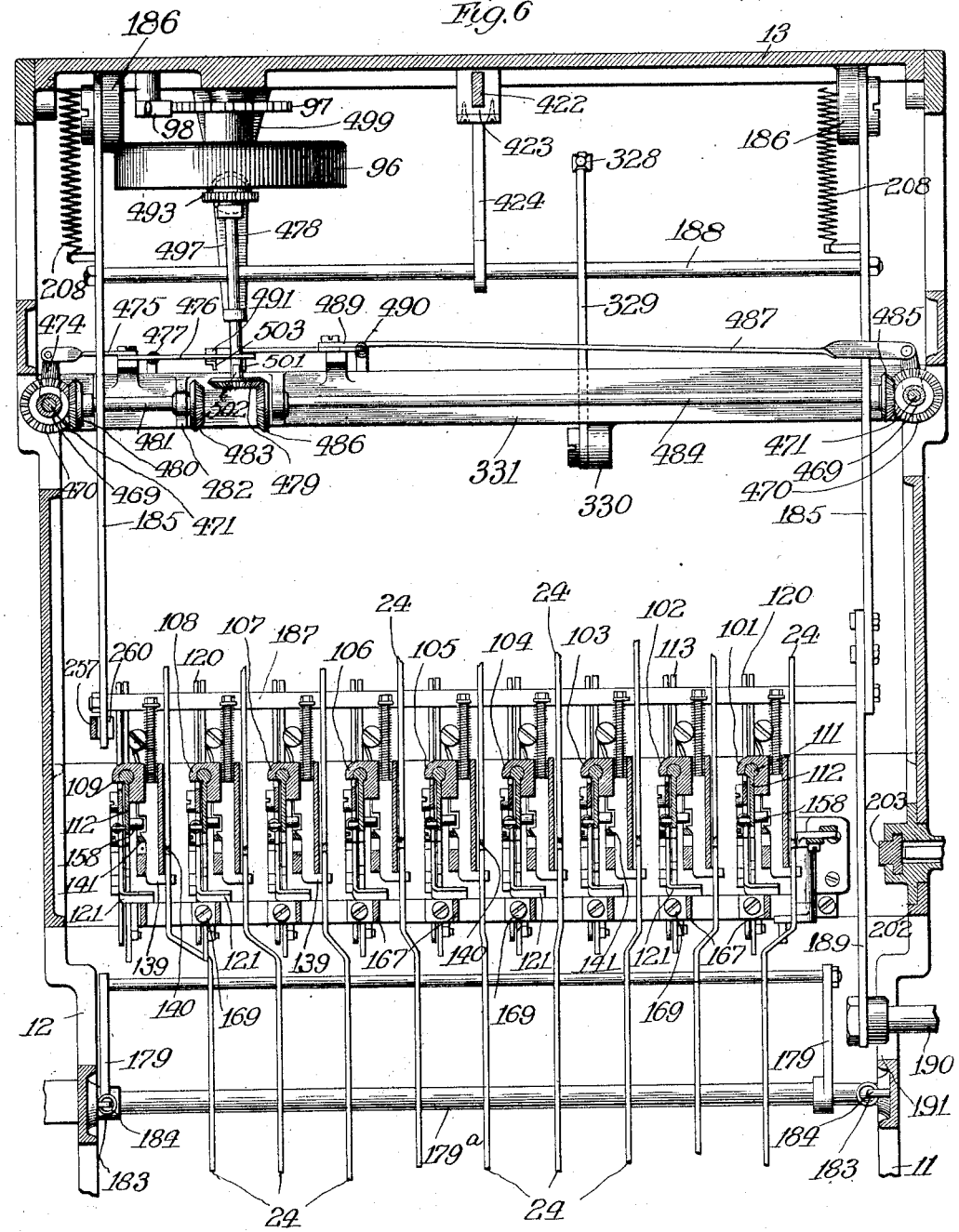

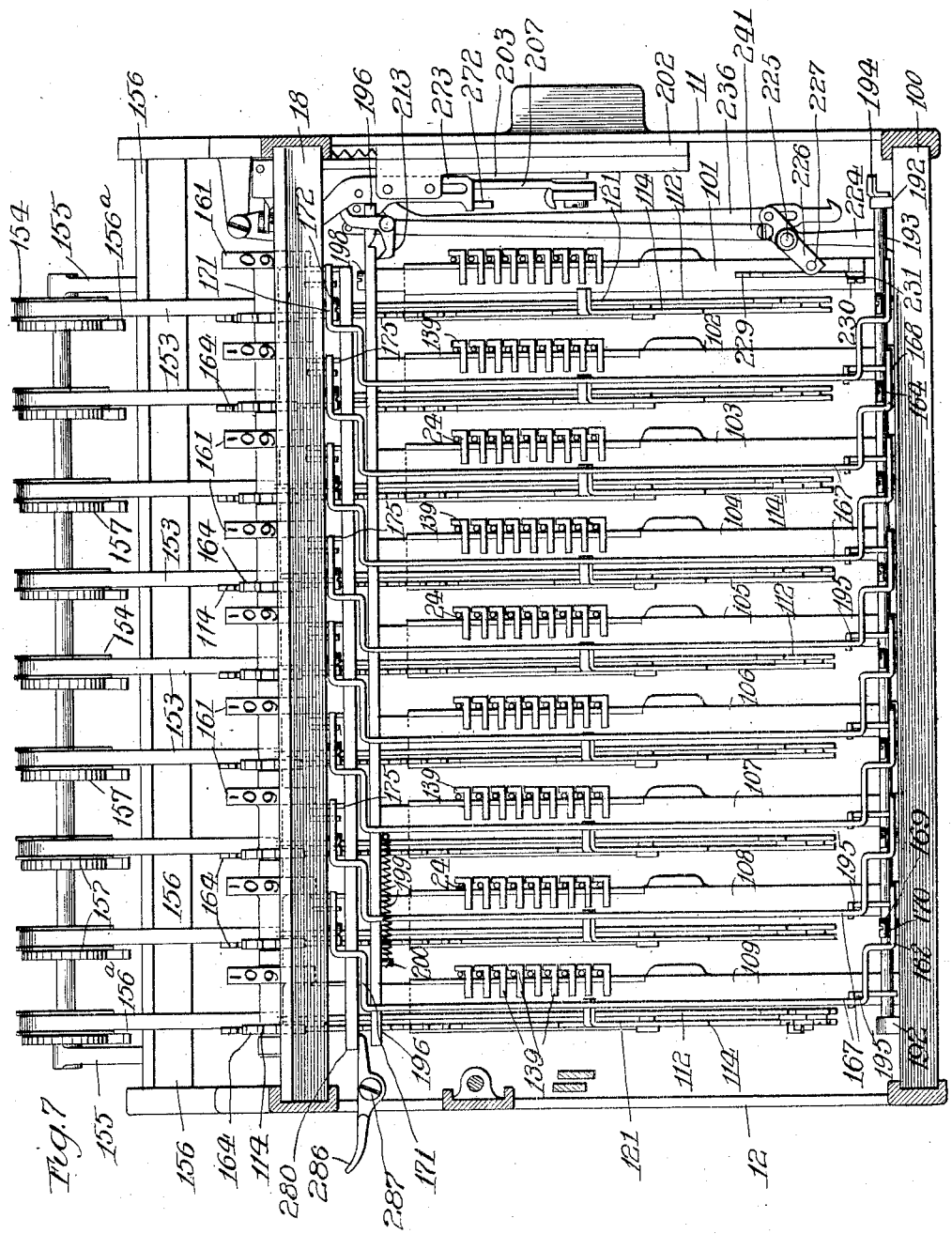

J. T. HOWIESON.
CALCULATING MACHINE.
APPLICATION FILED JULY 29, 1901.
1,178,806.
Patented Apr. 11, 1916.
27 SHEETS—SHEET 8.
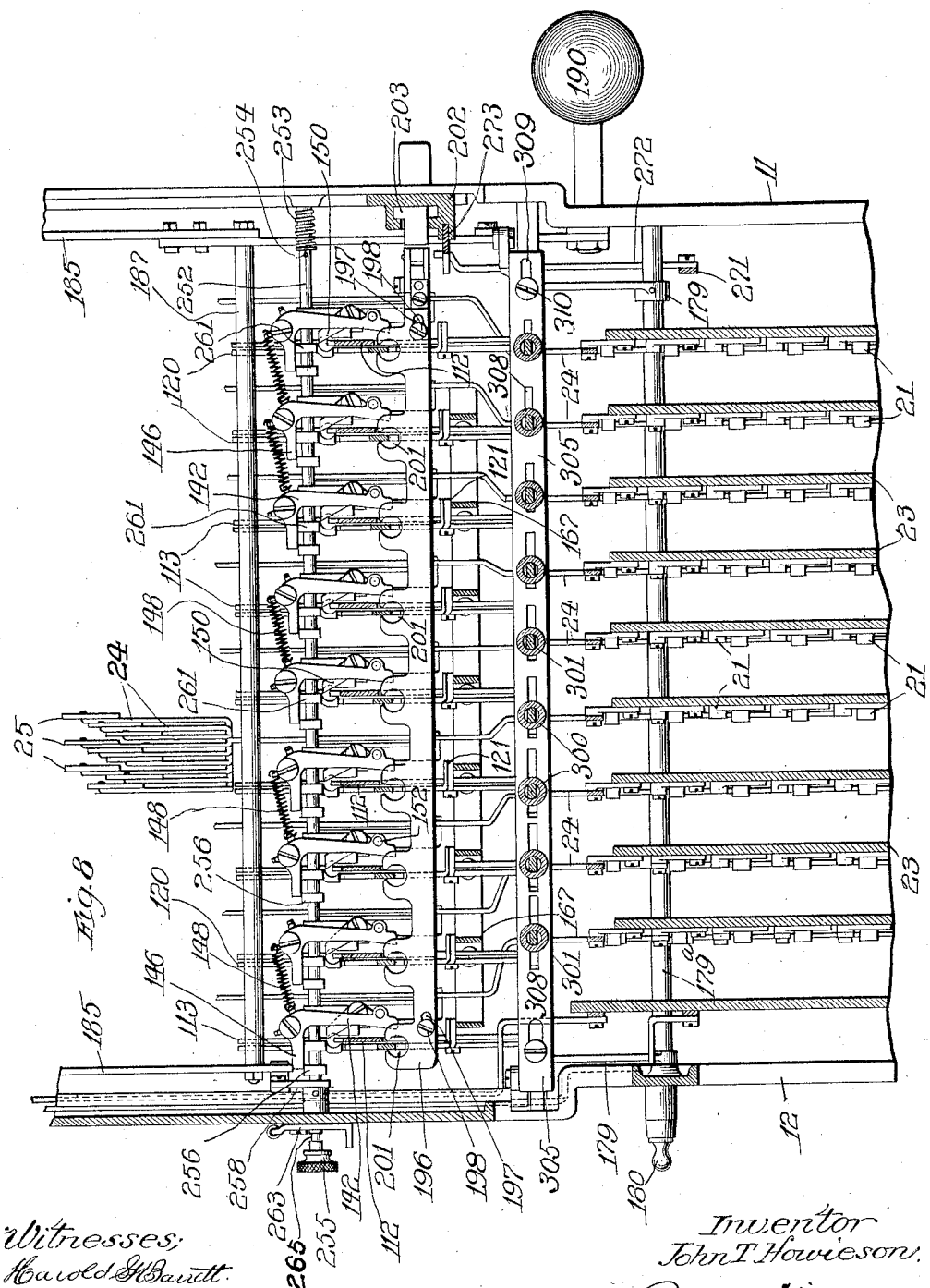

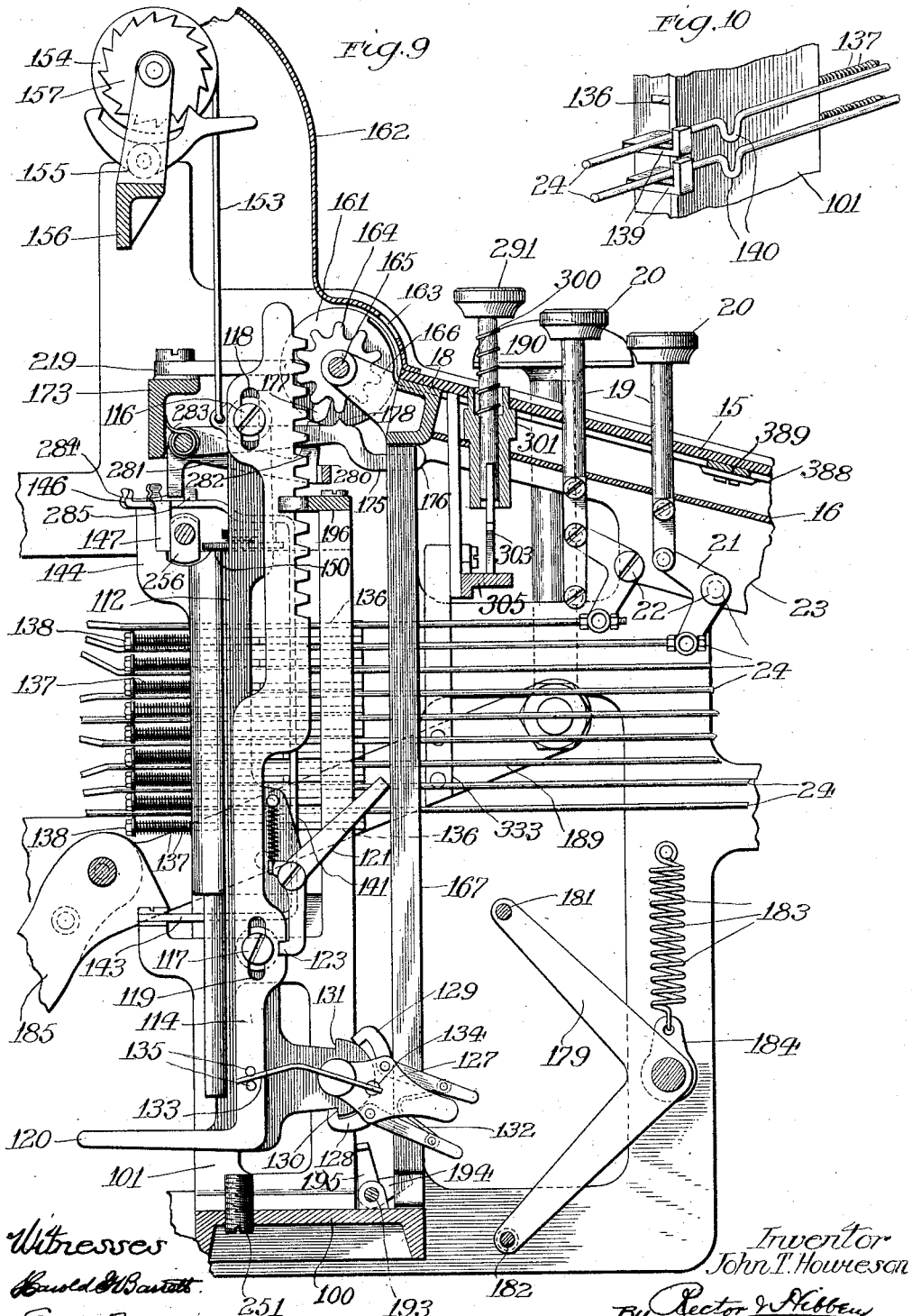

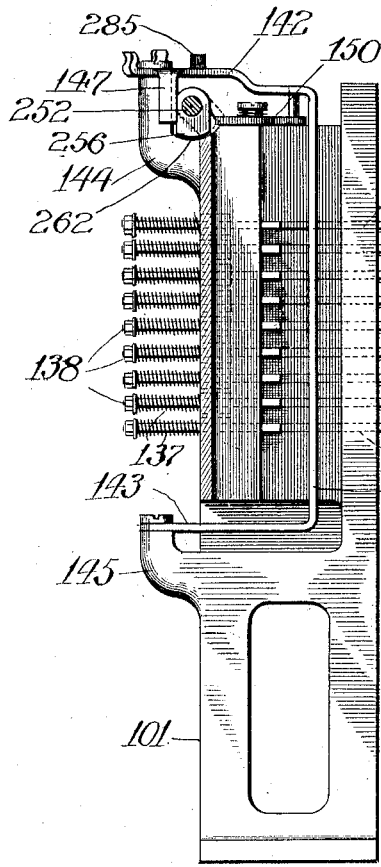

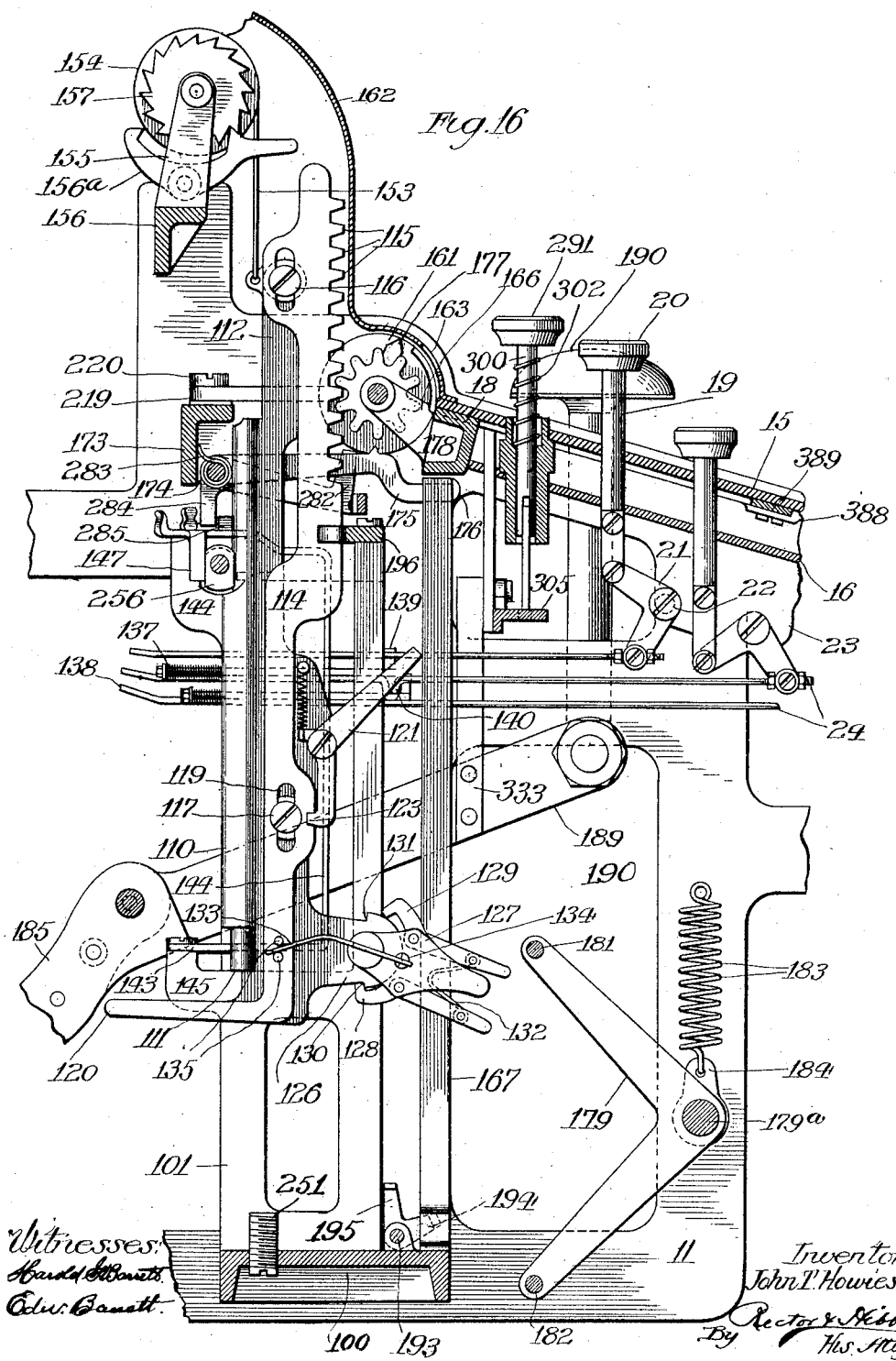

J. T. HOWIESON.
CALCULATING MACHINE.
APPLICATION FILED JULY 29, 1901.
1,178,806.
Patented Apr. 11, 1916.
27 SHEETS—SHEET 12.
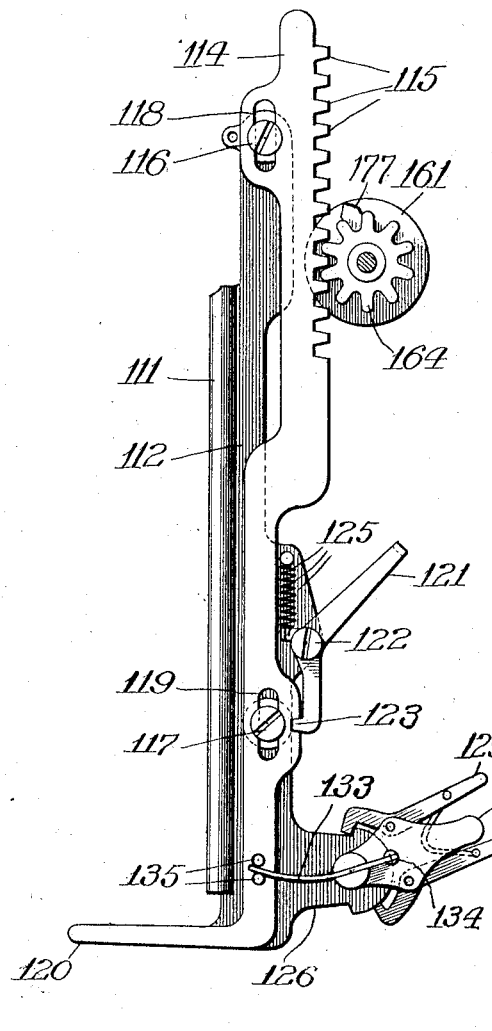
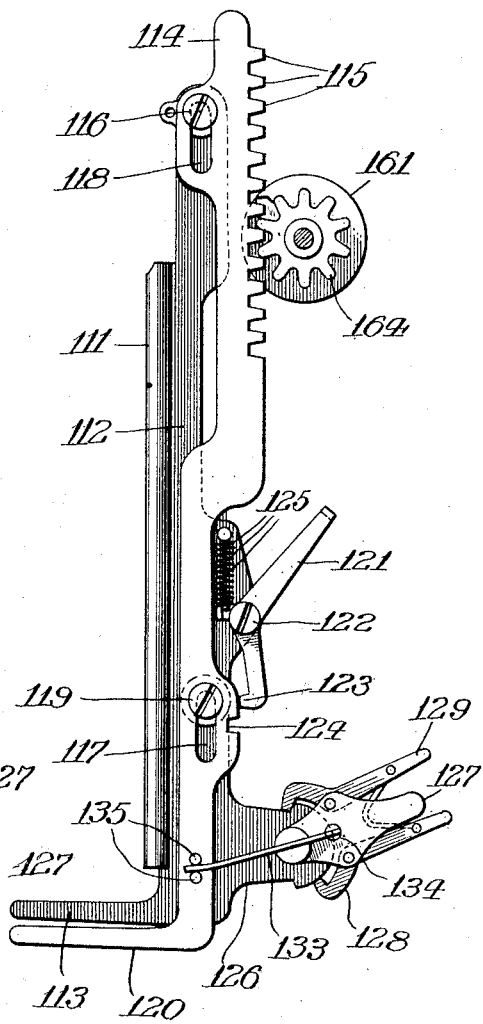
Witnesses:
Harold S. Barrett
Edw. Barrett
Inventor:
John T. Howieson
By Rector & Hibben
His Attys

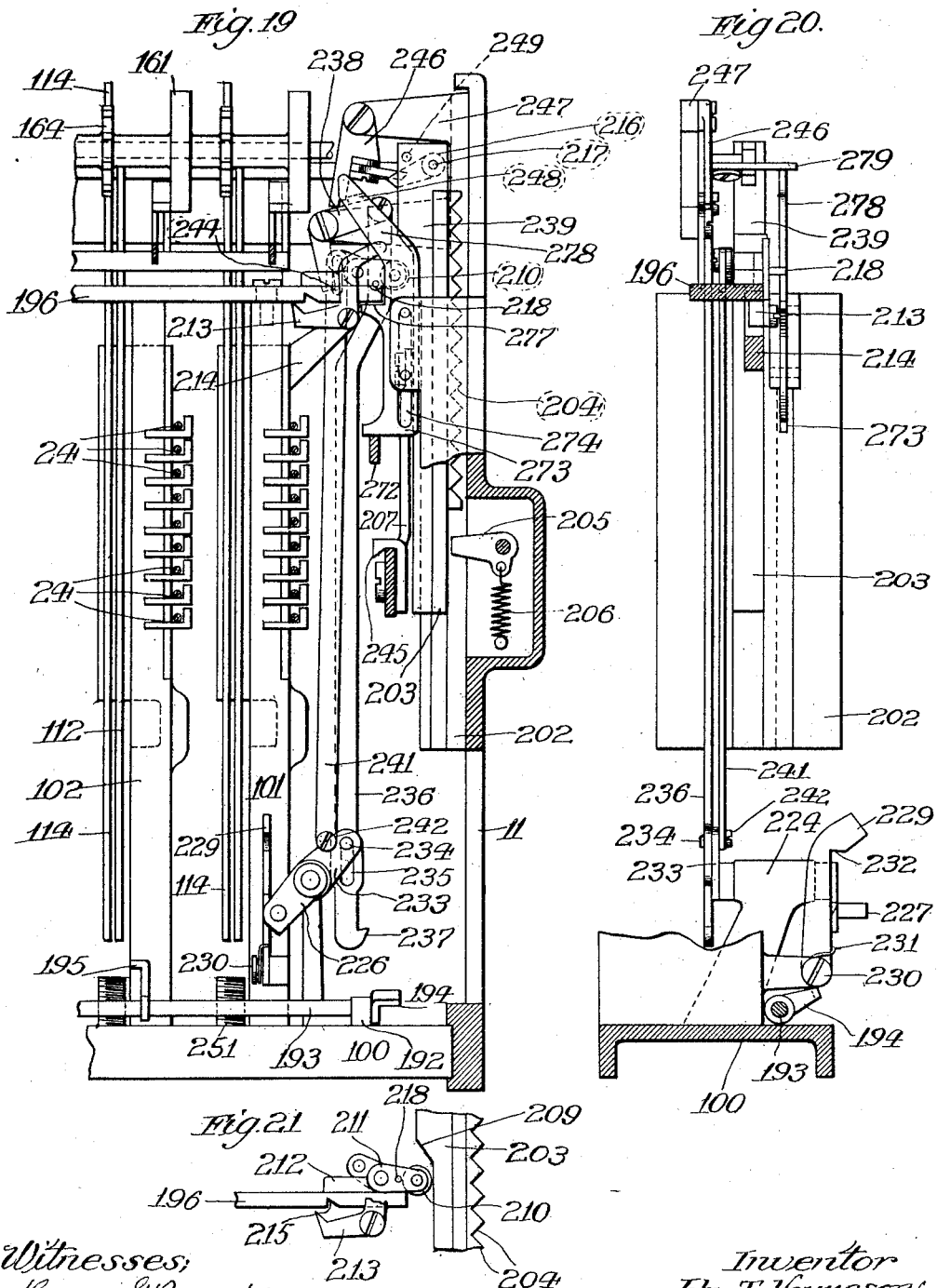

J. T. HOWIESON.
CALCULATING MACHINE.
APPLICATION FILED JULY 29, 1901.

1,178,806.

Patented Apr. 11, 1916.
27 SHEETS—SHEET 14.

J. T. HOWIESON.
CALCULATING MACHINE.
APPLICATION FILED JULY 29, 1901.
1,178,806.
Patented Apr. 11, 1916.
27 SHEETS—SHEET 15.
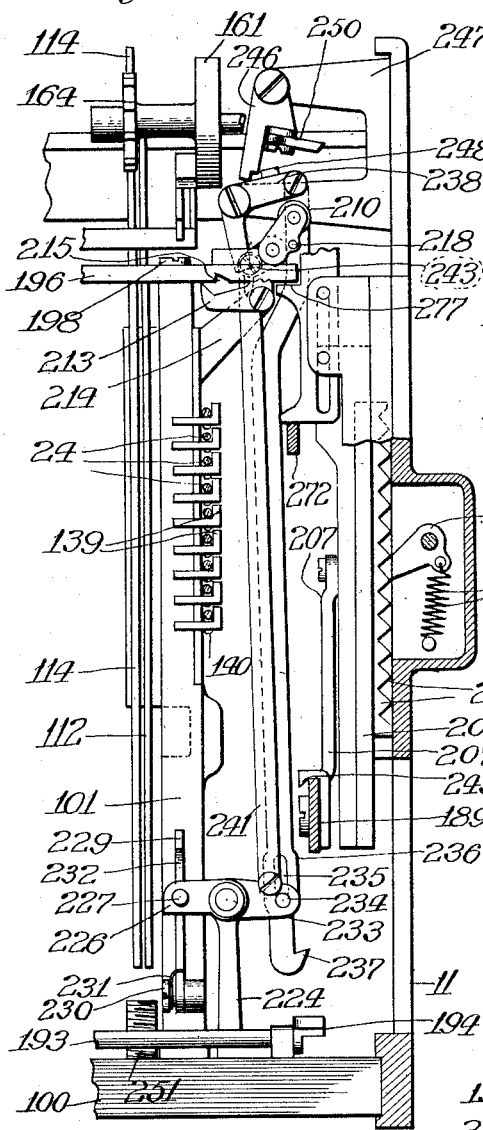
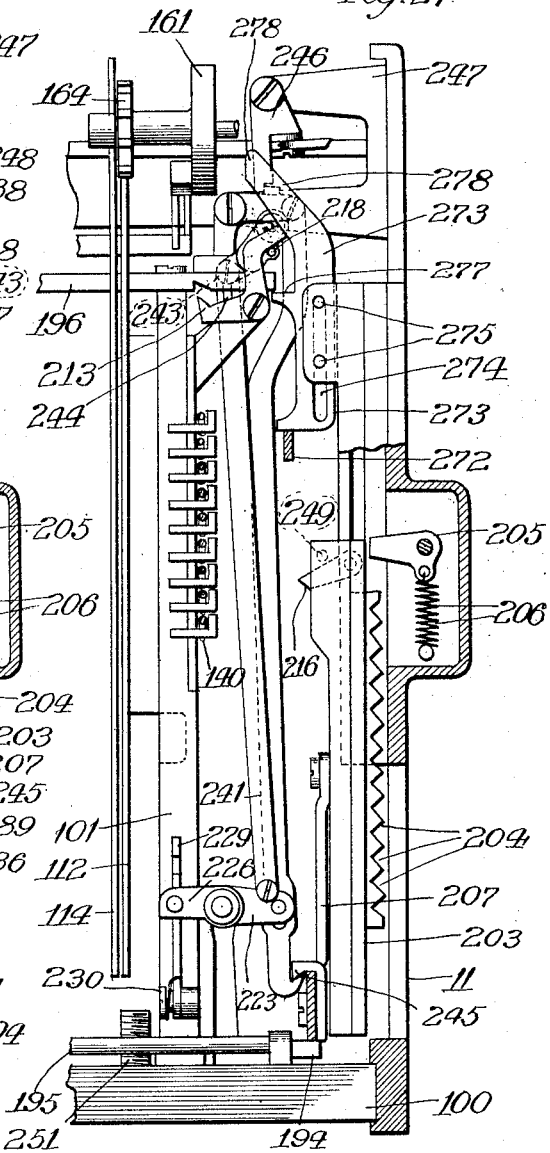
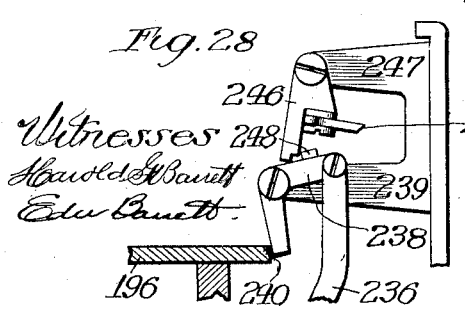
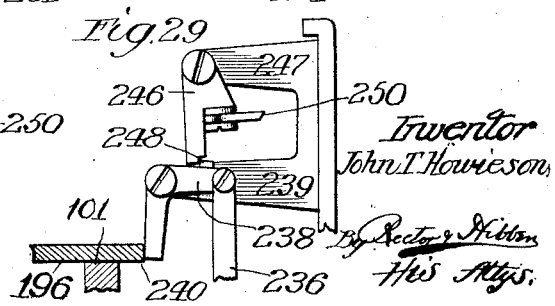

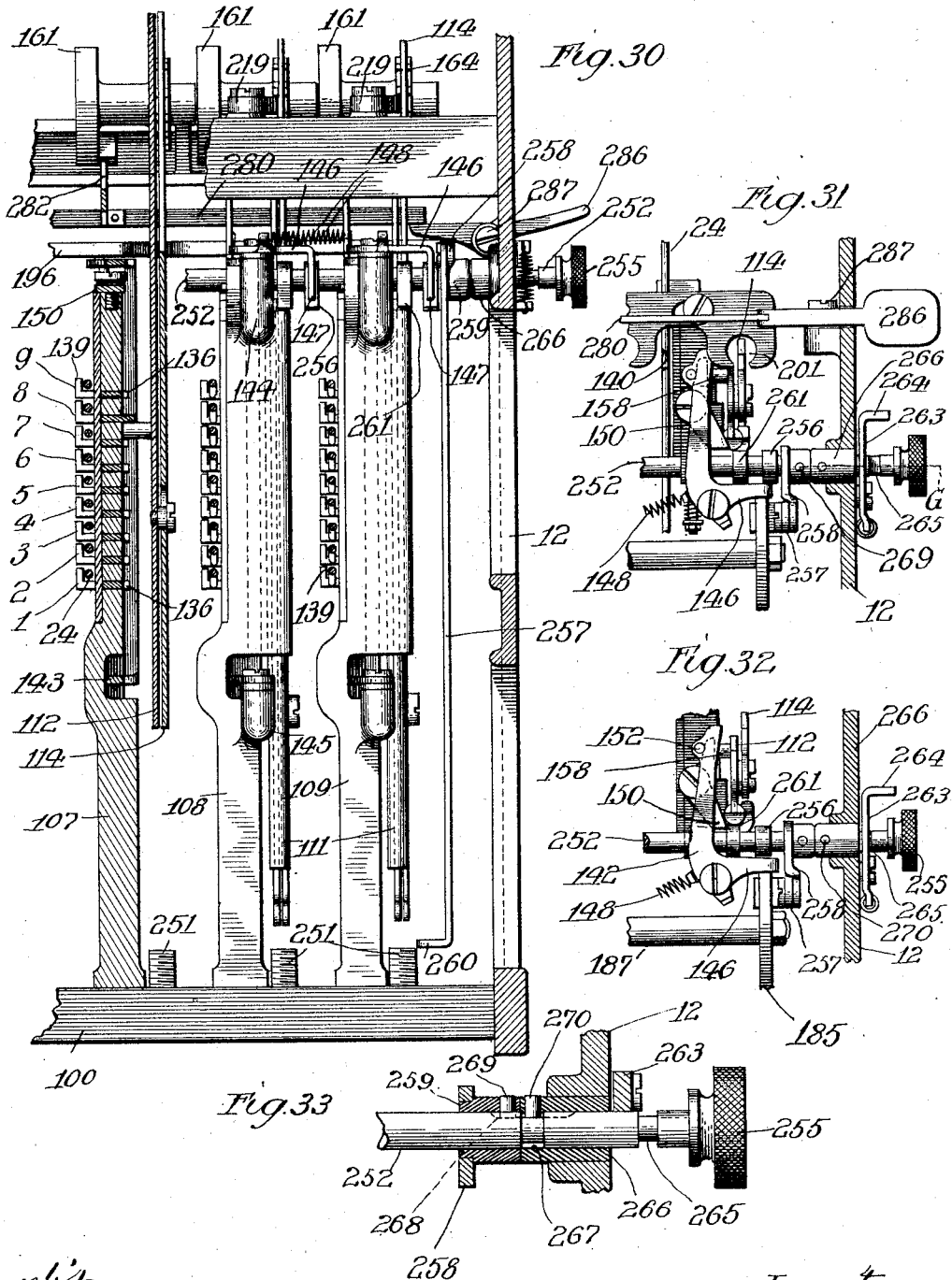

J. T. HOWIESON.
CALCULATING MACHINE.
APPLICATION FILED JULY 29, 1901.
1,178,806.
Patented Apr. 11, 1916.
27 SHEETS—SHEET 17.
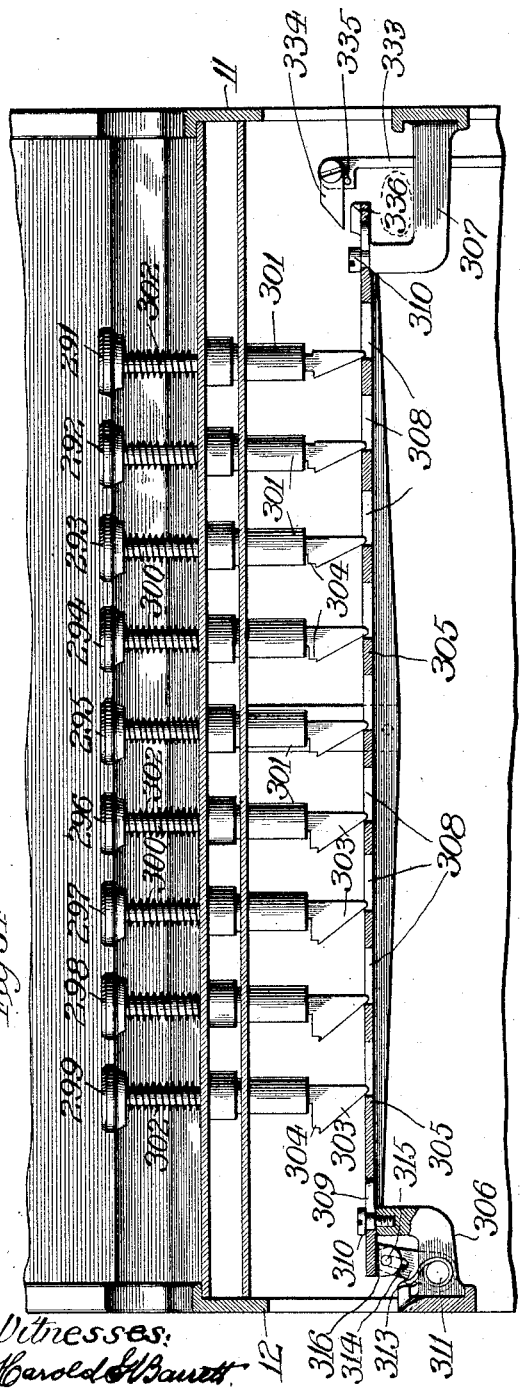
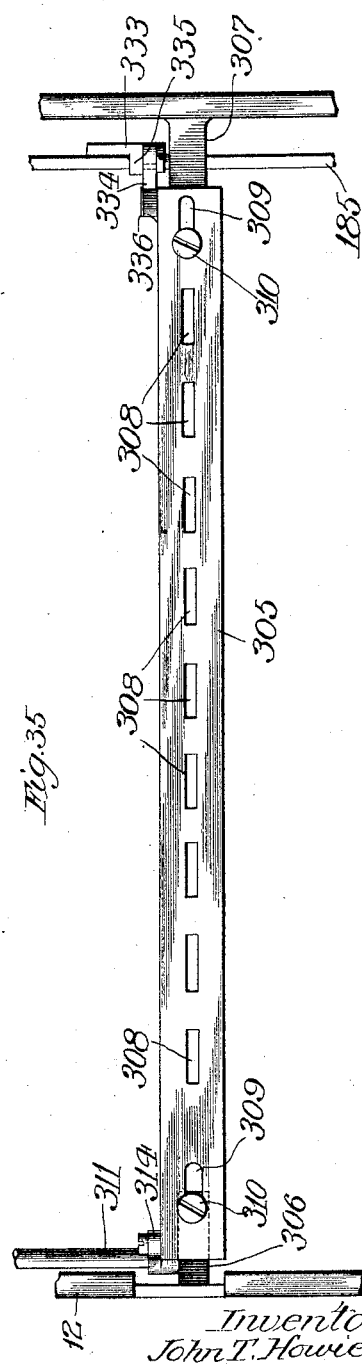
Witnesses:
Harold H. Barrett
Edw. Barrett
Inventor
John T. Howieson,
By Rector & Hibben
His Attys.

J. T. HOWIESON.
CALCULATING MACHINE.
APPLICATION FILED JULY 29, 1901.
1,178,806.
Patented Apr. 11, 1916.
27 SHEETS—SHEET 18.
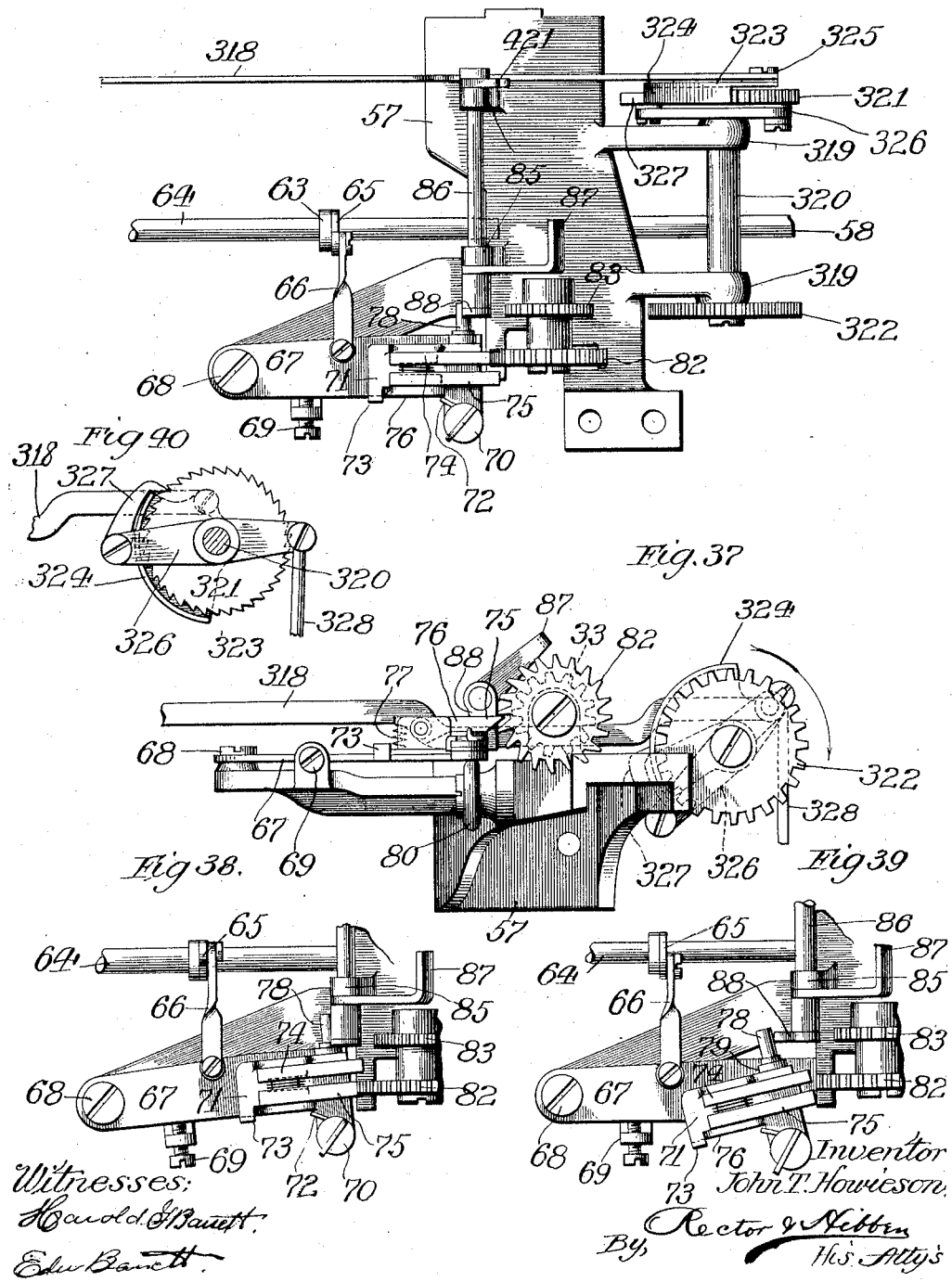

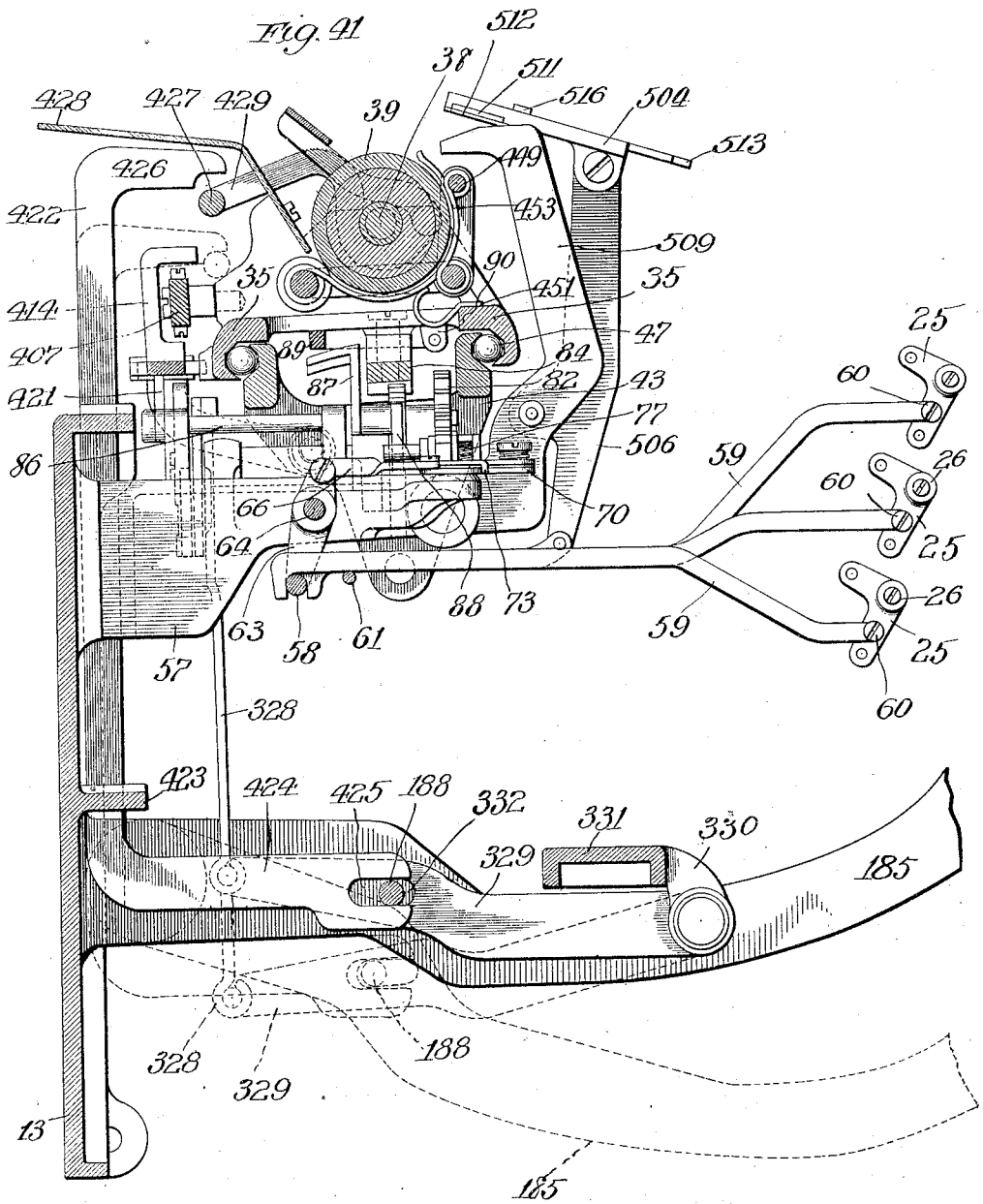

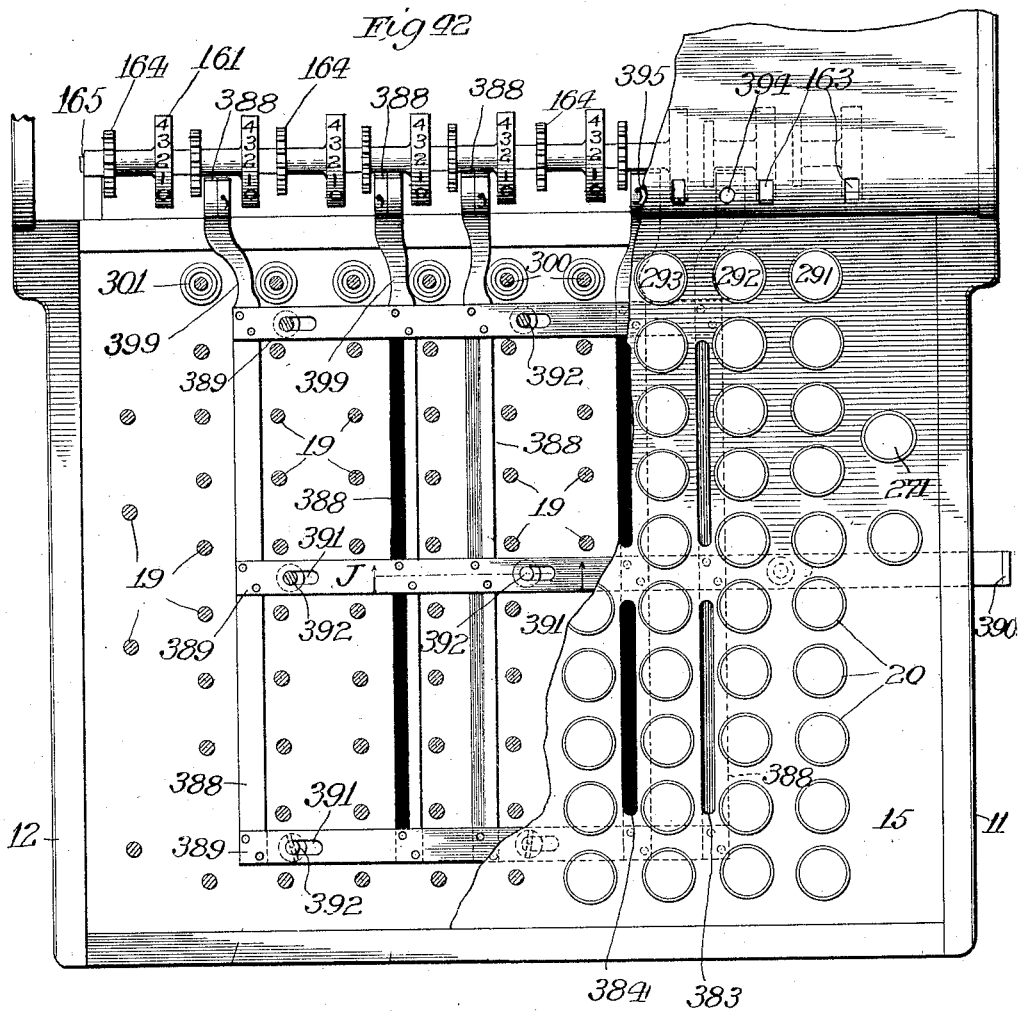

J. T. HOWIESON.
CALCULATING MACHINE.
APPLICATION FILED JULY 29, 1901.
1,178,806.
Patented Apr. 11, 1916.
27 SHEETS—SHEET 21.
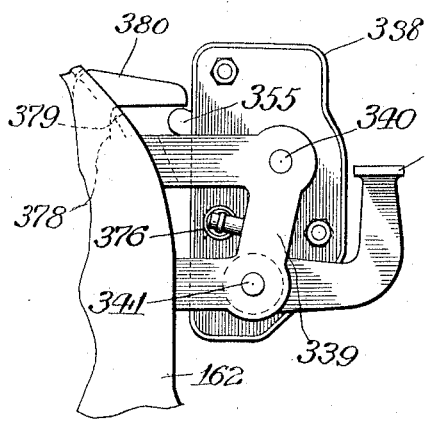
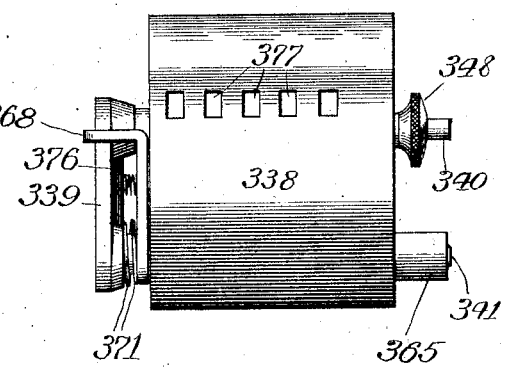
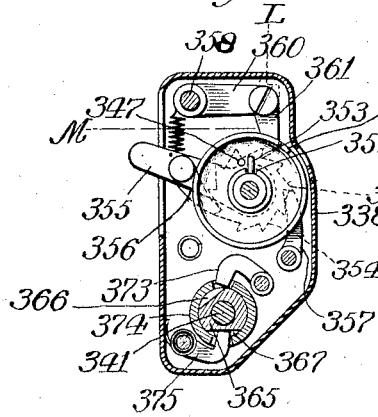
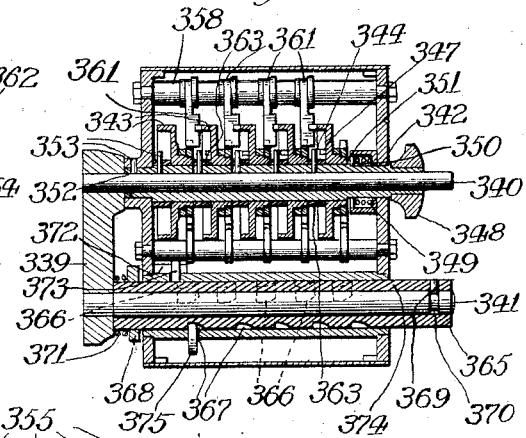
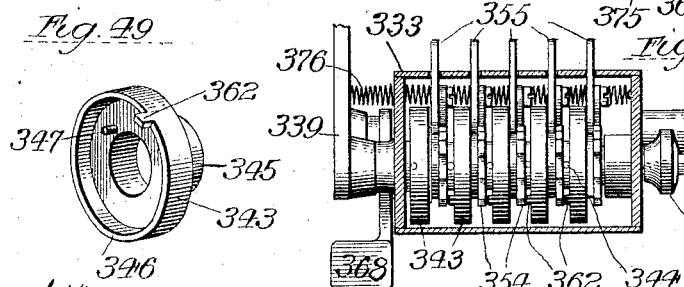
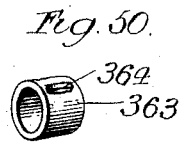

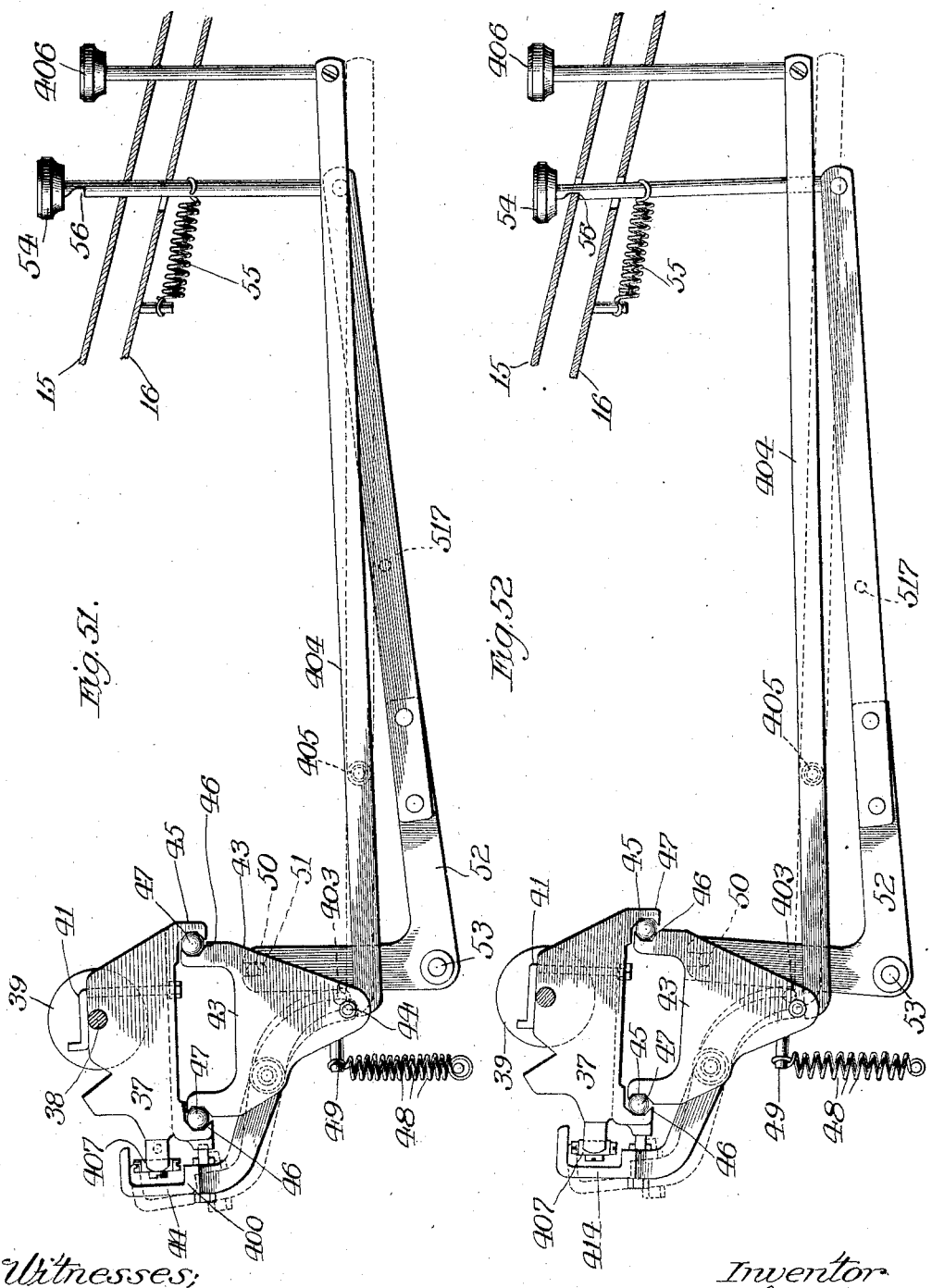

J. T. HOWIESON.
CALCULATING MACHINE.
APPLICATION FILED JULY 29, 1901.
1,178,806.
Patented Apr. 11, 1916.
27 SHEETS—SHEET 23.
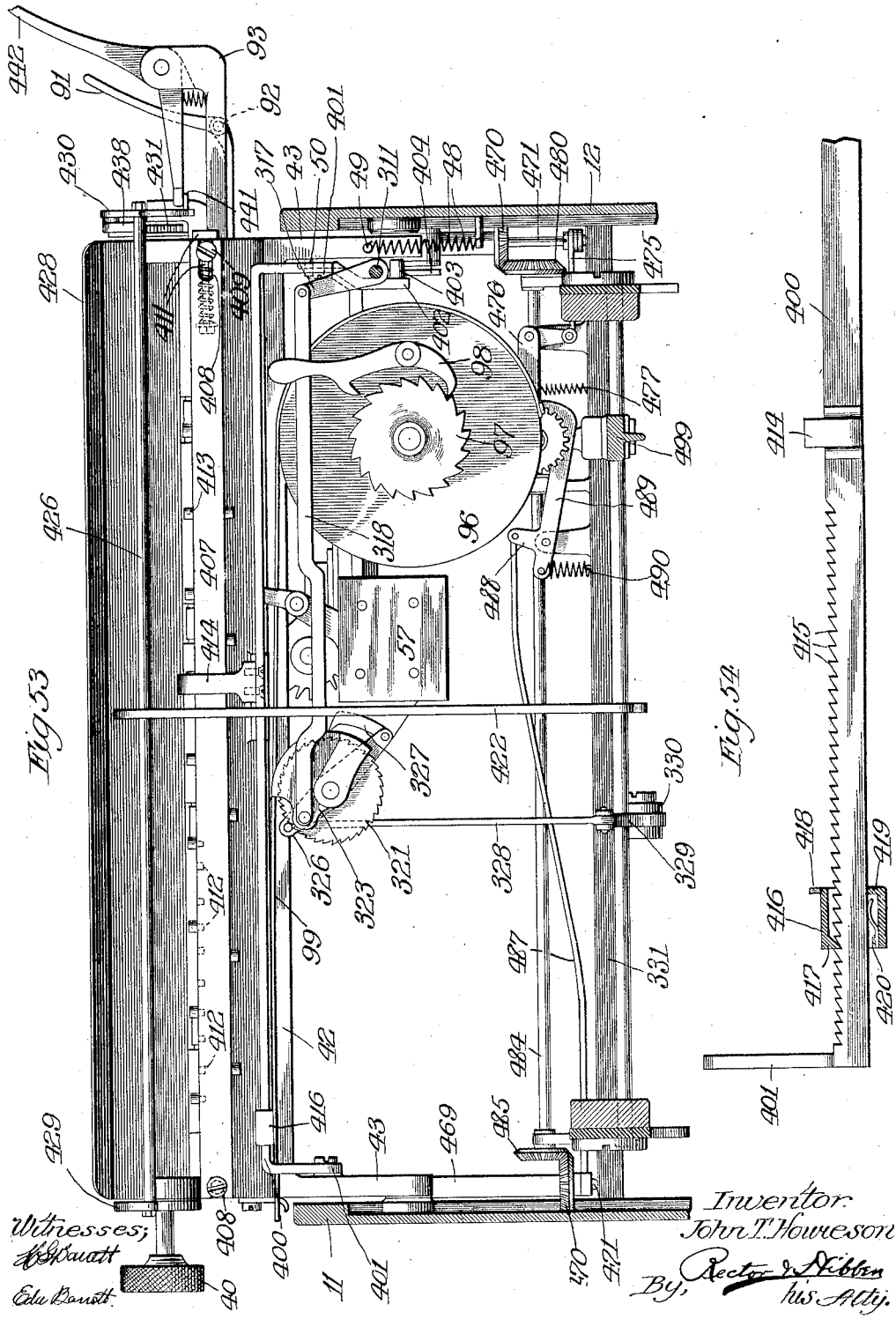

J. T. HOWIESON.
CALCULATING MACHINE.
APPLICATION FILED JULY 29, 1901.
1,178,806.
Patented Apr. 11, 1916.
27 SHEETS—SHEET 24.
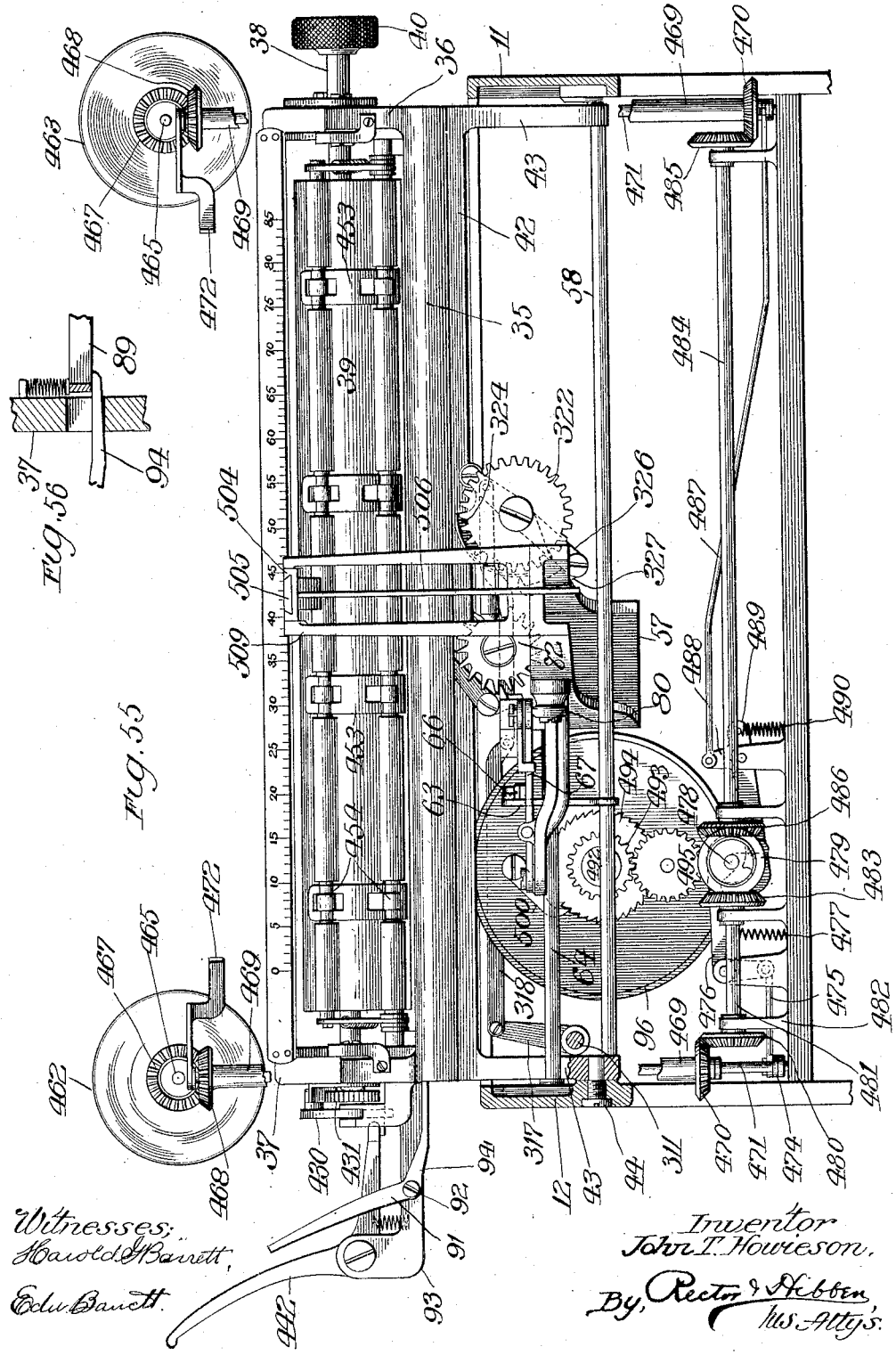

J. T. HOWIESON.
CALCULATING MACHINE.
APPLICATION FILED JULY 29, 1901.
1,178,806.
Patented Apr. 11, 1916.
27 SHEETS—SHEET 25.
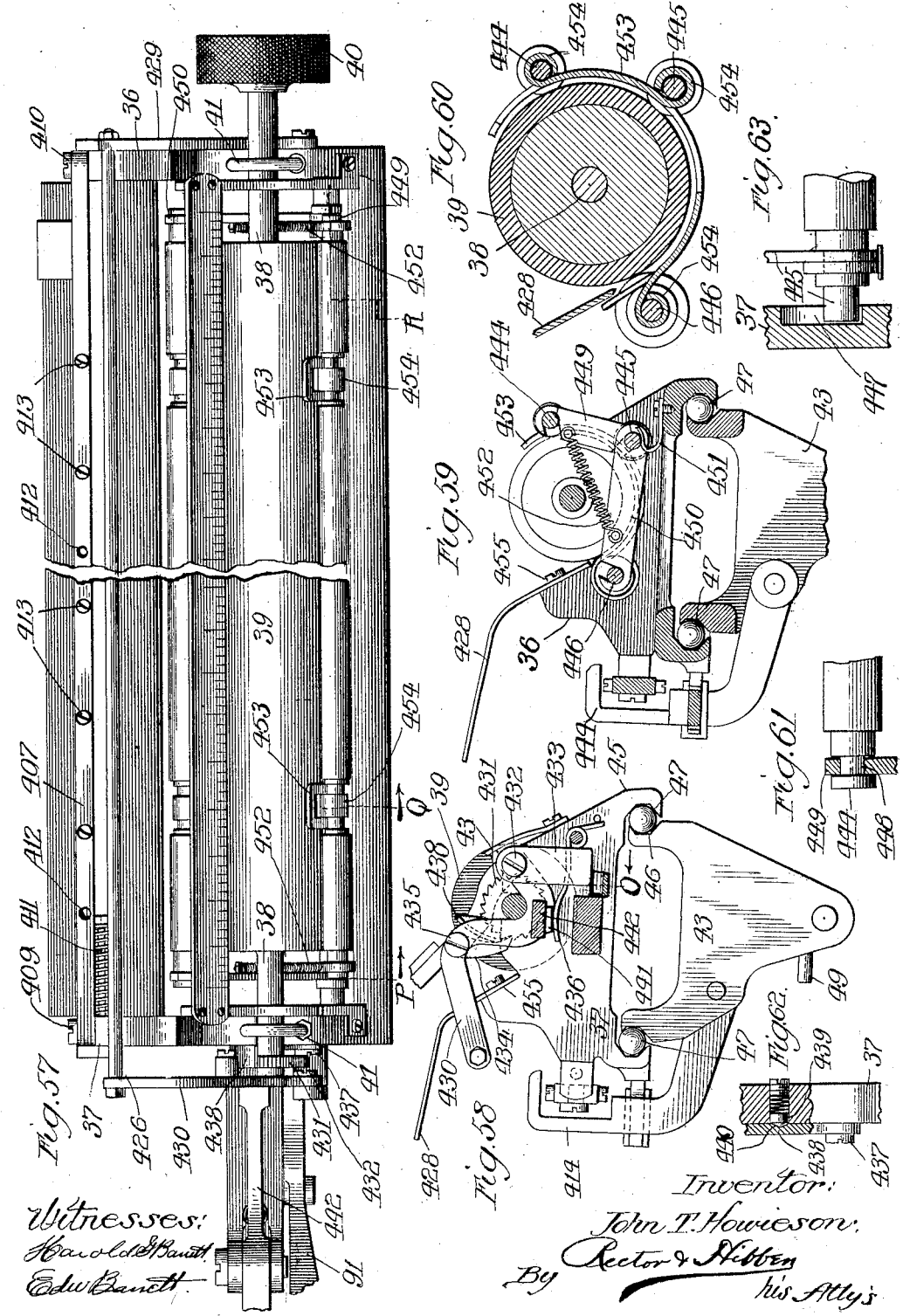
Witnesses:
Harold E. Barrett
Edw. Barrett
Inventor:
John T. Howieson,
By Rector & Hibben
his Atty's

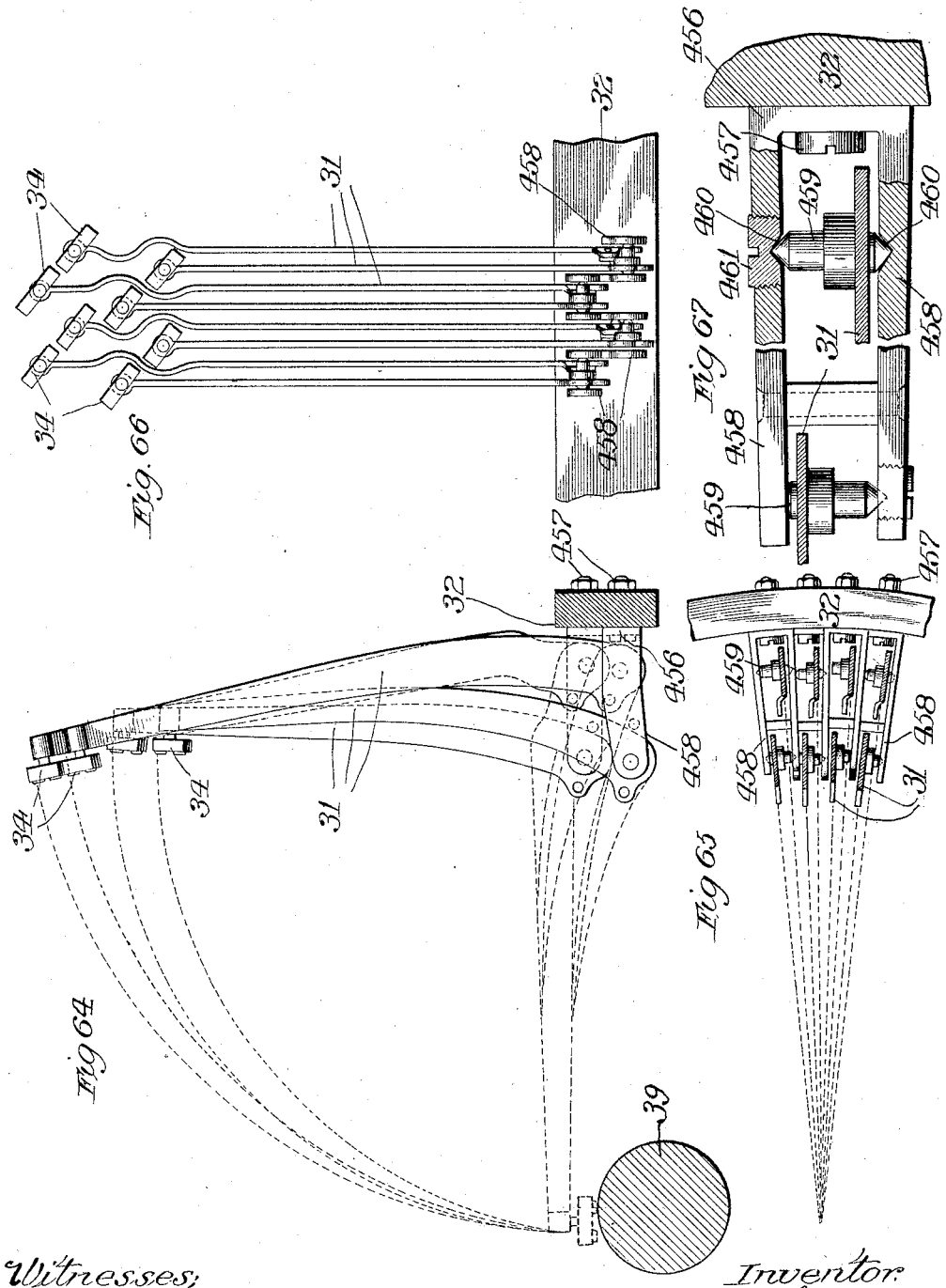

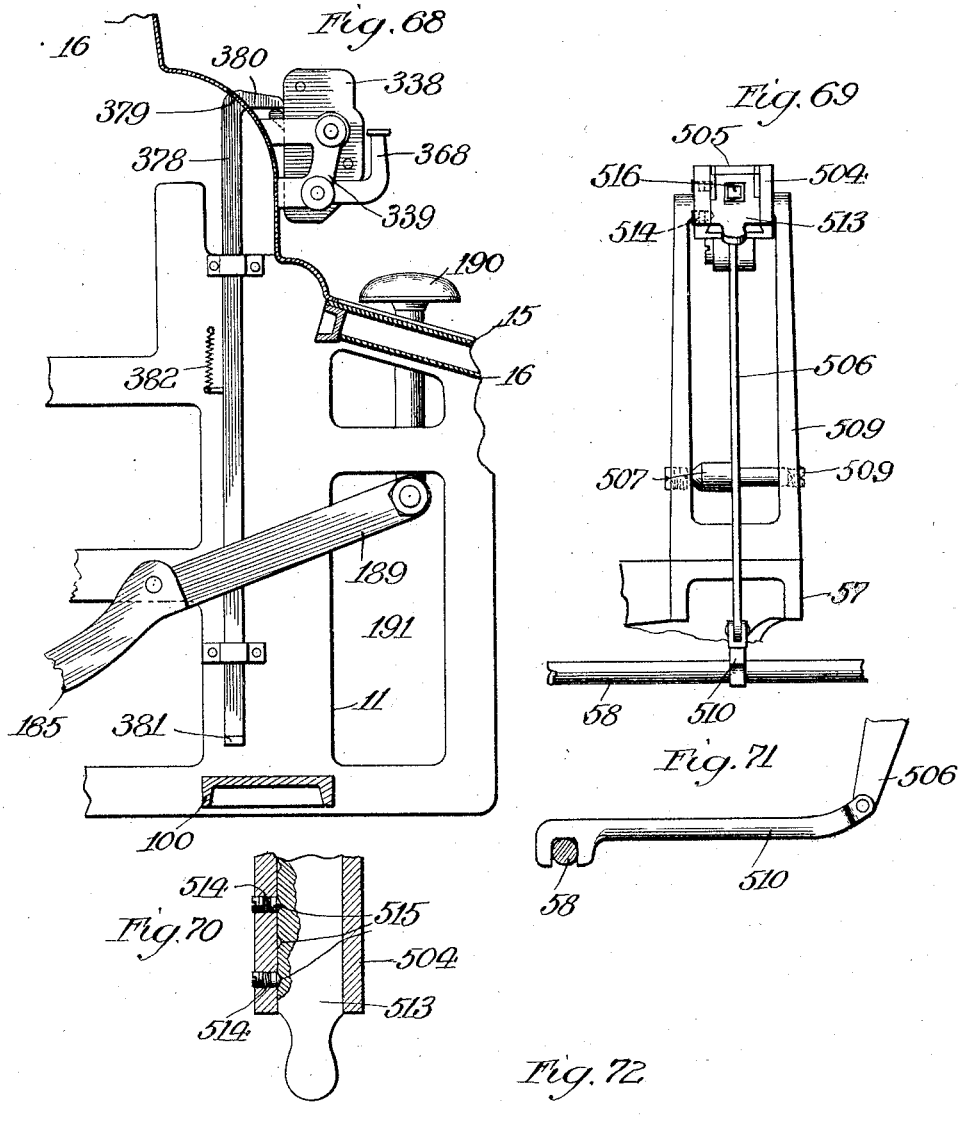

UNITED STATES PATENT OFFICE.

JOHN T. HOWIESON, OF ST. LOUIS, MISSOURI, ASSIGNOR, BY MESNE ASSIGNMENTS, OF ONE-HALF TO BURROUGHS ADDING MACHINE COMPANY, OF DETROIT, MICHIGAN, A CORPORATION OF MICHIGAN.

CALCULATING-MACHINE.

1,178,806.      Specification of Letters Patent.      Patented Apr. 11, 1916.

Application filed July 29, 1901. Serial No. 70,060.

*To all whom it may concern:*

Be it known that I, JOHN T. HOWIESON, residing at the city of St. Louis, Missouri, have invented certain new and useful Improvements in Calculating-Machines, of which the following is a specification.

My invention relates to calculating machines adapted to be used alone or in combination with a typewriting machine and capable of the calculations of addition, subtraction, multiplication and division, or any one thereof, the machine herein illustrated and described being a combined calculating and typewriting machine but having means for rendering the calculating mechanism inoperative when the typewriting mechanism alone is desired.

My invention also relates to certain novel and advantageous features in the combination between the calculating mechanism and typewriting mechanism as well as to certain novel features in said latter mechanism.

In the drawings, Figure 1 is a plan view of my machine; Fig. 2 a side elevation thereof; Fig. 3 a front end elevation of the same; Fig. 4 a side elevation of the machine with the left hand side frame removed; Fig. 5 a sectional plan on line A of Fig. 1; Fig. 6 a sectional plan on line B of Fig. 4; Fig. 7 a vertical sectional elevation on line C of Fig. 4; Fig. 8 a sectional plan on line D of Fig. 4; Fig. 9 a substantially full sized elevation of one of the series of sliding plates and racks, with a portion of the keyboard and machine frame in section; Fig. 10 a perspective of a portion of one of the upright guide frames illustrating two of the sliding stops and two of the wires or rods operated by the keys; Figs. 11 to 15 detail views of the guide frame and its associated parts; Fig. 16 a view similar to Fig. 9 but showing the relative position of the parts when No. 8 key is operated; Fig. 17 an elevation of a sliding plate and rack showing its tension mechanism adjusted for the subtracting calculation; Fig. 18 a view similar to Fig. 17 but illustrating the downward movement of the rack in the subtracting calculation; Fig. 19 a front elevation of two of the upright guide frames and their associated parts, illustrating particularly the mechanism for shifting the rack guide, this figure representing the adding position of the parts; Fig. 20 a side view of the mechanism for shifting the rack guide and also of the mechanism for shifting or adjusting the machine from adding to subtracting position and vice versa; Fig. 21 a detail view of a portion of the rack guide shifting mechanism; Fig. 22 a view similar to Fig. 17 but showing position of parts of the rack guide shifting mechanism when the restoring bail is in its lowered position, the guide being in its shifted position; Fig. 23 a plan view of Fig. 22; Fig. 24 a sectional plan on line E of Fig. 22; Fig. 25 a sectional plan on line F of Fig. 22; Figs. 26 and 27 an elevation of one of the guide frames and rack guide shifting mechanism showing such mechanism adjusted for subtracting calculation, Fig. 27 showing the restoring bail in its downward position and the rack in mesh with its dial pinion; Figs. 28 and 29 detail views of a portion of the rack guide shifting mechanism showing different positions thereof; Fig. 30 a rear view of three upright guide frames, one of the latter being in section, and showing more particularly the repeating and clearing mechanisms; Figs. 31 and 32 sectional plan views of a portion of the mechanism shown in Fig. 30; illustrating different positions of the parts in the repeating operation; Fig. 33 a section on line G of Fig. 31; Fig. 34 a sectional elevation on line H of Fig. 1; Fig. 35 a plan view of the shifting cross bar for the carriage set mechanism; Figs. 36 to 40 detail views of the escapement mechanism and also the carriage set mechanism; Fig. 41 a sectional elevation on line I of Fig. 1; Fig. 42 a plan view of the key-board with a portion thereof broken away; Fig. 43 a section on line J of Fig. 43; but on an enlarged scale; Fig. 43ª a section on line K of Fig. 43; Figs. 44 and 45 side and front elevations, respectively, of the reference dials; Fig. 46 an end elevation of the reference dial mechanism with the end plate removed; Fig. 47 a section on line L of Fig. 46; Fig. 48 a sectional plan on line M of Fig. 46; Fig. 49 a perspective of one of the dials; Fig. 50 a perspective of one of the collars between the dials; Figs. 51 and 52 side elevations of the carriage shift and margin set mechanism showing different positions thereof; Fig. 53 a rear elevation of the machine with the rear end frame removed; Fig. 54 a plan view of the margin rack;

Fig. 55 a sectional elevation on line N of Fig. 4 looking forward of the machine; Fig. 56 a section on line O of Fig. 58; Fig. 57 a plan view of the typewriter carriage; Fig. 58 an end elevation of the typewriter carriage frame showing the line spacing mechanism; Figs. 59, 60 and 61 sections on the line P, Q, and R, respectively, of Fig. 57; Fig. 62 a detail view of the set mechanism for the shield of the line spacing mechanism; Fig. 63 a detail section of a portion of the typewriter carriage frame and the roller 445; Figs. 64 to 67 detail views of the type bars and hangers; Fig. 68 an elevation of the restoring bail and feed hook for operating the reference dials; Fig. 69 an elevation of the ribbon guide; Fig. 70 a detail of the sliding plate in the ribbon guide; Fig. 71 an elevation of the rods actuated by the universal bail for operating the ribbon guide; Fig. 72 an elevation of the margin rack; and Fig. 73 an elevation of a portion of the calculating mechanism showing means for rendering such mechanism inoperative when it is desired to employ the typewriting mechanism alone.

*The key board and key mechanism.*—As shown more particularly in Figs. 1, 2, 4, 5, and 6 of the drawings, the machine has the two side frames 11 and 12 and the end or rear frame 13 which may be more or less open but adapted to support and practically inclose the working parts therewithin. The key board, here shown, is a double key board, containing in the present instance 83 writing keys besides having additional keys such as the shift key, error key, margin-stop key, as well as a top row of nine carriage-shift keys, all of which will be hereinafter explained in function and operation. Obviously the number of keys may be varied as desired but the key board herein illustrated is designed as capable of satisfying all commercial and practical purposes. For instance, for ordinary figuring the machine is capable of calculating up to 999,999,999 and for money figuring it is capable of accommodating to an amount represented by $9,999,999.99, the first two banks of keys counting from the right hand of the machine being used for cents, that is, hundredths of a dollar, and the remaining keys for the dollars. There are consequently nine banks of keys, and two side banks for the shift key, margin stop key, error key, and two keys for ciphers for the calculating mechanism and such other characters desired. Provision is made for operating the machine on the upper and lower case principle, as will be hereinafter more particularly explained, and consequently each key button bears two characters, corresponding with the type on its coöperating type bar, having for lower case work all the letters of the alphabet, both small letters and capitals, as well as other characters such as punctation, etc., and also the figures 1 to 9 for ordinary typewriting; while for upper case work the buttons in each of the nine banks of keys bear the numbers 1 to 9, the machine being shifted to upper case for calculating purposes. In each bank the keys are numbered from 1 to 9, as to lower case, beginning at the front, and consequently all the keys numbered 1, as to lower case, are comprised in the first row, the keys numbered 2 being in the second row and so on up to 9. On either side the key board has a spacing key 14.

The key board, here shown, is preferably composed of two parallel inclined plates 15 and 16 secured at their front end to the front strip 17 of the machine frame and at their rear end supported on a cross rail or bar 18. These plates are provided with registering holes corresponding in number to the number of keys on the key board and receiving the key stems whereby such plates act as guides for these stems. Each key comprises a stem 19 with a button 20 at the upper end above the key board and communicating with an arm of a bell crank 21 which is located below the key board and is free to turn on a stud 22 secured on an angle piece or strip 23 fastened on to the under side of the key board plate 16, there being one of such strips for each bank of keys. The other arm of the bell crank is connected, in the present instance, to a horizontal wire or rod 24 extending rearwardly of the machine, in coöperative relation with certain parts of the calculating mechanism as hereinafter explained. The rear end of each of these rods is connected to the downwardly extending arm of its proper bell crank 25 which is loosely pivoted to a rod 26 arranged between standards 27 that rise from an arc 28 extending between and secured to the side frames. Each of these bell cranks 25, and consequently the rods and keys connected thereto, are held in normal position by suitable springs, such as the coiled spring 29 secured at one end to the bell cranks. Each of the nine banks of keys has its own standard except the two end standards which accommodate ten keys, all of said parts being arranged within small compass without interfering with the proper operation of each other. The upper arm of each bell crank is connected by means of a rod or wire 30 to its proper type bar 31, each of which bars has a hanger secured to the arc 32 which is fastened to brackets 33 on the two side frames 11 and 12. The details of the novel construction of type bar hanger and the parts directly coöperating therewith will be hereinafter fully explained. Each type bar has a type block 34 having, in the present instance, two characters, which, when a key is operated, strikes upon the top of the platen at the printing point so that the typewriter works on the upper and lower case principle and also prints visibly.

It will be understood that the connections between the keys and their type bars may be considerably varied in construction and operation, the key mechanism just described being that which is suitable for the particular construction of calculating mechanism here shown as preferable, but not representing the essential or only one adapted for such purpose.

*General construction of carriage and carriage shift.*—Referring to Figs. 1, 2, 4, 51 to 59, the carriage comprises a frame 35, with end bearings 36 and 37 in which the shaft 38 of the platen 39 bears, one end of which shaft has the usual hand wheel or knob 40 for turning the platen by hand. Small bent arms 41 rotatably secured in the end bearings serve to normally hold the platen in place, as shown clearly in Figs. 51 and 52. Obviously when these arms 41 are turned at an angle of ninety degrees from that there shown, the platen is free to be removed by raising it bodily from its bearings. The carriage is mounted on the supporting frame 42 having end portions 43 which are pivoted to the side frames 11 and 12 by means of studs or screws 44 so that the entire supporting frame together with the carriage which it supports, rocks on a pivotal axis substantially at the lowermost point of such carriage supporting frame. The carriage preferably has a ball-bearing connection with its supporting frame and to this end the long sides of the carriage are flanged or extended downward and provided on their inner faces with longitudinal ball-ways or grooves 45, while the carriage supporting frame has at its upper ends outer ball-ways or grooves 46, said ways receiving a series of balls 47.

The carriage supporting frame is held to its normal rearward position by means of a spring 48 connected at one end to the machine frame and at the other end to a pin 49 fastened to the carriage supporting frame at the rear of its pivotal point, Figs. 51, 52 and 53. This supporting frame has a second pin 50 which is engaged by a slot 51 in the end of a vertical arm of a bell crank 52 which is pivoted at 53 to one of the side frames, in the present instance, to the left hand side frame. The horizontal arm of this bell crank extends forwardly underneath the key board and is there pivoted to the shift-key 54 which, when depressed, rocks the bell crank and throws the carriage supporting frame and consequently the carriage to its forward or upper case position for calculating purposes as hereinafter explained. In order to maintain said forward position of the carriage the shift key, which is normally rearwardly pressed by means of a spring 55 fastened thereto, is provided just below the button with a notch 56 so that when the shift key is depressed the notch will engage underneath the top plate 15 of the key board, the key being drawn rearwardly by the spring to cause said engagement, Figs. 51 and 52. This position is maintained until the shift key is released at the will of the operator by drawing the button forward so as to permit the spring 48 to restore all the parts just described to normal or lower case position. In the drawings, Fig. 51 represents such normal position in which it is observed that the shift key is at its normal or raised position with its notch 56 above the key board plate, while Fig. 52 represents the parts in shifted position, the shift key having been depressed and held in that condition by the engagement of its notch with the key board plate.

*The escapement mechanism.*—The escapement mechanism about to be described is mounted upon or carried by a main bracket 57 secured to the rear end frame 13 substantially centrally thereof and extending forwardly beneath the carriage as clearly illustrated in Figs. 36, 37, and 41, and is operated by a universal bail mechanism. This bail mechanism comprises a lower rod 58 extending from side to side of the machine just beneath such main bracket and is engaged by the hook-shaped end of the rearwardly extending rods or strips 59 which are connected to and actuated by the key mechanism hereinbefore described. For this purpose these rods or strips 59 are pivoted to the lower arm of their respective bell cranks 25 at the point 60 so as to be operated at every movement of such bell cranks. A cross rod 61 may, if desired, be used for the purpose of supporting the free ends of said strips 59 and thereby relieve the universal bail of the strain of their weight. Each bell crank has its own strip 59 which consequently corresponds in number to the number of writing keys on the key board, the spacing key being also connected thereto but in a direct manner. The depression of one of these writing keys, or of either of the spacing keys, will therefore pull this rod 58 forwardly, and by reason of its connection with the escapement mechanism, to be described, will cause a one space movement of the carriage just as soon as the key is released. The rod 58 is hung at the lower end of two brackets or hangers 62 and 63, the former being at one of the side frames and the latter toward the center of the rod 58. Both hangers are secured to the rock shaft 64 having bearings respectively in the main bracket 57 and in the left hand side of the frame 12. An arm 65 extends upwardly from this rock shaft and is connected to a rod or link 66, which, extending forwardly, is pivoted to and actuates a plate 67 which, in the present case, has a movement in a horizontal plane. This plate 67 is pivoted upon the main bracket at the point or on the stud 68 and a set screw 69 mounted in said bracket is preferably provided to serve as an adjustable stop for the movement of such plate. Upon a stud 70 screwing onto this plate is a pawl frame or bracket 71 which is held in normal position by a spring 72 coiled around the stud. This pawl frame has a downwardly projecting lip or flange 73 which determines the normal position thereof by acting as a stop. Pawls 74 and 75 are pivoted intermediate of their lengths between upwardly extending parallel sides 76 of the pawl frame. The pawl 74 is the live pawl and the pawl 75 the dead pawl. Around the pivot between these pawls is a coiled spring whose ends engage under the pawl in advance of their pivotal points. A coiled spring 77 is arranged beneath the outer end of the dead pawl and normally tends to force that end upward and the opposite end downward. A pin or stud 78 projects laterally from the pawl frame in the direction of the rock shaft 64 and is preferably provided with a roller 79 bearing upon the top face of the plate 67 and designed to afford freedom of movement to such frame. To likewise permit the plate 67 to operate freely and also to support its outer end, a banking roller 80 is secured to the main bracket and underneath such plate.

The main bracket has bearings for the shaft 81 on which is secured a ratchet wheel 82 and a pinion 83, the latter being continually in mesh with the rack 84 on the under side of the carriage, as is clearly illustrated in Fig. 41. The pawls 74 and 75 coöperate with this ratchet wheel and together therewith constitute the escapement mechanism proper for the carriage. When a writing, numbering or spacing key is depressed, the resulting movement imparted to the universal bail shifts the plate 67 as well as its two pawls 74 and 75 in the direction of such bail, that is, rearwardly, thereby releasing the live pawl from its normal engagement with the ratchet wheel and bringing the dead pawl into engagement with such wheel in the same space heretofore occupied by the live pawl, Fig. 38. Upon a release of the depressed key, the parts will assume their normal position whereby the dead pawl will be released from the ratchet wheel and the live pawl caused to enter the space in such wheel immediately above that theretofore occupied by it, thereby permitting the ratchet wheel to move one tooth and advance the carriage one space.

In order to release the pawls from engagement and permit the carriage to be shifted by hand, the following arrangement is provided: The main bracket has lugs 85 in which bears a shaft 86 having near one end an upwardly extending arm 87 bent over at its top and also having at its end adjacent to the stud 78 a downwardly extending arm 88. This stud 78 projects in the path of this arm 88 so that when the latter is moved by the rocking of the shaft 86, the stud and consequently the pawl frame of which it forms a part, is forcibly shifted laterally on the stud 70 as a pivot, so as to take the position illustrated in Fig. 39. At this time both pawls are shifted out of engagement with the ratchet wheel so that such wheel is free to move in either direction, thereby permitting the carriage to be freely moved by hand. For operating this arm 87, a release bail 89 is arranged beneath and longitudinally of the carriage with its bent ends pivoted to lugs 90 on either end of the carriage and on the under side thereof, Figs. 41, 55 and 56. A releasing lever 91 pivoted at 92 on the extension 93 of the carriage has its arm 94 extended inward above the release bail which is upwardly spring-pressed by a spring 95. Obviously when this releasing lever is shifted inward toward the carriage, which operation is performed by hand, the release bail is depressed, or rocked downward and the movement thereof is communicated to the arms 87 and 88 and to the frame carrying the pawls 74 and 75 which are thereby released from engagement with their ratchet wheel.

The tension for moving the carriage is supplied by the spring barrel 96 provided with the ratchet wheel 97 and pawl 98, the band 99 of which barrel is connected to the carriage, Fig. 53. This spring barrel is also designed to operate the ribbon movement as hereinafter more fully explained.

Up to this point the mechanism has been sufficiently explained both in construction and function, to permit of a clear comprehension of the calculating mechanism proper now to be described, and which constitutes the main part of this invention, although certain of the features of the typewriter mechanism have not yet been alluded to. A description of these additional features will be reserved until after said calculating mechanism has been fully explained.

*The calculating mechanism.*—The calculating mechanism now to be described is adapted to work with or without the typewriter mechanism accordingly as it is desired to print or typewrite the work being performed with the calculating mechanism proper. When the machine is in normal condition, that is, in lower case position, the machine is solely a typewriting machine for general work, but when adjusted to upper case position by the depression of the shift key, the calculating mechanism is brought into active operation, whereupon the machine can perform not only typewriter work, i. e. the typewriting or printing of numerals, but also calculations, such as addition, subtraction, division and multiplication. Furthermore, so far as the broad features of the calculating mechanism are concerned it is to be understood that such mechanism is capable of operation alone and may be embodied in a machine having no typewriting mechanism.

The calculating mechanism herein shown consists of the following construction, beginning with a description of the upright frames and the movable members or sliding plates operating therein, which parts are best shown in Sheets 4, 7, 9, 10, 11, and 12. Upon a cross bar 100 in the bottom of the machine frame is mounted a series of upright guides or frames, numbered 101 to 109 inclusive, corresponding in number to the number of banks of writing keys. As there are nine banks of such keys in the present instance, there are consequently nine of these guides or frames, each of which takes care of the parts of the calculating mechanism operated by all the nine keys of each bank. The working parts of the calculating mechanism operated by each bank of keys constitutes a separate unit which can be practically removed from the machine without disturbing the other units or sections. The construction of all these frames and their working parts is the same, and consequently the description of one of them will apply to all, the corresponding figures of reference being applied to corresponding parts in the different frames.

*Sliding plates and racks.*—Each frame or guide has at one corner a vertical, longitudinal and substantially circular socket 110, Fig. 13, forming a bearing to receive the shaft or rounded edge 111 of a vertically sliding plate 112, which parts are best shown in Figs. 11 to 14. This sliding plate 112 has at its lower end a rearwardly projecting foot 113 whose function will be hereinafter stated. A rack 114 having rack teeth 115 is mounted upon said sliding plate by means of the two studs or screws 116 and 117, Fig. 12, and in order that such rack may have, under certain conditions, a limited movement independent of its sliding plate, the rack has slots 118 and 119 through which said screws 116 and 117 pass. This rack also has a rearwardly projecting foot 120 for the same purpose as foot 113, as will be hereinafter made apparent.

Being mounted and secured together as above explained, it is evident that both the sliding plate and the rack partake of the same vertical movement when permitted in the manner hereinafter described, but that the rack may be caused to move independently of its plate, either up or down, the said screws 116 and 117 occupying the center point of said slots at normal position but occupying the top of the slots when the rack has made its independent downward movement, and occupying the bottom of such slots when such rack has made its independent upward movement. In order to maintain this normal position of the rack on the sliding plate, that is to lock it in said normal position, and to also provide for said independent movement of the rack, an angular lever or lock 121 is pivoted to the sliding plate at 122 and its lower end is made in the form of a hook or catch 123 adapted to engage in a notch 124 in the edge of the rack. A suitable spring 125 secured at one end to the plate and at the other end to said lock serves to hold the hook normally in engagement with said notch of the rack.

To provide for the independent movement of the rack when said lock is unlocked in a manner hereinafter described, and to determine whether such movement shall be up or down with respect to the sliding plate, the following mechanism herein shown is designed as suitable: Upon a forward extension or lug 126 on the sliding plate is pivoted a plate or arm 127, upon one side of which is pivoted the two locking dogs 128 and 129, the former being adapted to engage in one position of the arm 127 (Figs. 9 and 16) in the notch 130 formed in the lower edge of said lug 126, while the other dog 129 is adapted to engage, when the arm 127 is shifted after the dog 128 is released, in the notch 131 located in the upper edge of said lug 126, Figs. 17 and 18. The construction is such that when one of the dogs is in engagement with its notch, the other dog is out of engagement with its notch, and rides upon the edge of said lug 126. A suitable spring 132 interposed between the outer ends of the dogs serves to throw their inner engaging or hooked ends inward toward each other and against the edge of the lug 126.

Suitable tension mechanism is interposed between the arm 127 and the sliding rack and the construction of said arm 127 and its locking dogs is such as to reverse the direction of thrust of the tension mechanism so as to cause the rack to move either up or down, independently of the sliding plate 112, accordingly as the calculation is addition or subtraction. This tension mechanism, as herein shown, comprises a suitable flat spring 133, Figs. 9 and 16, which is secured at one end in a clamping stud 134 in the arm 127, while the other end rests or is inserted between two pins 135 in the rack.

The parts just described constitute the main portion of the adding and subtracting mechanism, as will be more fully understood from the description hereinafter given, and when in the position shown in Figs. 9 and 16, that is, the adding position, the stress of the spring 133 is upward, and when permitted to do so upon the unlocking of the lever 121 by the mechanism hereinafter referred to, such spring will give the rack its independent movement upward. When, however, the arm 127 and its dogs are shifted to the position shown in Figs. 17 and 18, for instance, that is, in subtracting position, the stress of the spring 133 is directed, downward, which spring, when the lever 121 is unlocked, forces the rack downward to the limit of the slots, Fig. 18. Consequently, it is evident that when this lever or lock 121 is disengaged, in an automatic manner hereinafter explained, the rack will be free to jump either up or down, independently of its sliding plate 112, accordingly as the spring 133 is set for addition or subtraction.

*Sliding stops.*—Each upright frame has a series of nine horizontal ways or slots 136 (see Figs. 9 and 11) in which are adapted to reciprocate a series of nine sliding stops or plates, which, for convenience of reference, are hereinafter numbered from 1 to 9 inclusive, corresponding in number to the number or value of the key with which it coöperates and as expressed on the particular button. These ways or slots are spaced at such a distance from each other as corresponds to the distance between the teeth in the rack, the purpose of which will be hereinafter more apparent. The lowermost sliding stop is numbered 1 because it is actuated by the lower or front key in the bank, which key is numbered 1; while the uppermost stop is numbered 9 because it is actuated by the number 9 key or button. Each stop consists substantially of a narrow flat plate which is preferably reduced at its rearward end which is encircled by a coiled spring 137 bearing against a washer and nut 138 on the outer end of reduced portion of such plate and against the upright frame so as to normally hold such slide rearward. The forward end 139 of each slide is curved or bent so as to lie in the path of movement of a projection on its particular key wire or rod 24 which projection may be of any suitable character to accomplish the desired purpose. The projection as here shown consists of a loop 140 in the wire itself, Fig. 10, although it is evident that the projection may be formed in obvious ways as by a separate piece or block fastened or soldered to each wire at the proper place.

It is apparent from the above description that each upright frame is so positioned in the machine as to be immediately adjacent and parallel, as to its right hand side, to the vertical plane in which is arranged the nine wires or rods 24 operated by the keys of its particular bank, Fig. 6. The ends 139 of each sliding stop are bent laterally and then upwardly across the plane of these wires 24 or rather of the loops therein, as clearly shown in Fig. 10, so as to be pulled out by the wires 24 when operated. For instance, when the key numbered 8 is depressed as shown in Fig. 16, its particular wire 24 will be drawn forward and the sliding stop numbered 8 will also be drawn forward due to the engagement of the loop of that wire with the end 139 of said sliding stop, and so on for any key depressed.

The sliding stop is withdrawn in the manner above described, against the tension of its spring 137 which tends to restore it to normal position, but in order to lock such sliding stop out in its withdrawn position, and prevent its return with its wire 24 which actuated it, proper automatic locking mechanism is employed. The mechanism here shown for this purpose consists of a locking bail which, as illustrated, in Figs. 6, 9, 11 and 13 to 16, is a vertically arranged bail whose vertical portion 141 extends along the edges of all of the sliding stops and whose upper and lower horizontal portions 142 and 143 are respectively pivotally mounted on the lugs or ears 144 and 145 on the upright frame. The horizontal portion 142 of said vertical bail has a lateral extension 146 terminating in a downward extension or finger 147 for purposes hereinafter made apparent. This bail is normally spring pressed toward the sliding stops, and in order to lessen the number of parts a single spring may be employed for the vertical bails of two adjacent sections or frames, although it is evident that each bail may be provided with its own individual spring. As shown, the springs 148 are interposed between the horizontal portions 142 of two adjacent vertical bails, five of such springs sufficing for the nine bails, Fig. 8. As particularly shown in Figs. 8, 11 and 13 each vertical bail is spring-pressed against the sliding stops in advance of an inclined projection 149 on the left hand edge of each of such sliding stops, whereby, when any one of these sliding stops is outwardly drawn, as above described, the bail 141 will first be forced away therefrom against its spring tension by contact of the projection 149 and will then snap into place behind such projection. The particular sliding stop operated, that is, drawn forwardly, will now be held in such forward position although the key wire or rod, which operated it, has been returned to normal position. The stop will remain in such position until the bail is operated by mechanism adapted to unlock it as hereinafter explained.

*Locking mechanism for plates and racks.*—On the top of each upright guide or frame is arranged a locking dog 150 pivoted intermediate of its length and having around its pivot a coiled spring 151 which presses its rearwardly extending end normally over the bearing or socket 110 in which the sliding plate 112 reciprocates and thus prevents the upward movement of such plate, that is, locks it down, Figs. 8, 9, 11 and 15. The other end of this locking dog projects in the path of a downwardly extending pin 152 on the horizontal portion 142 of the vertical locking bail 141, with the result that when this bail is moved outwardly by the projection 149 as above described, this pin 152 will strike one end of said locking dog, and throw the other end out of locking position, that is, out of the path of movement of the sliding plate 112. Such sliding plate and its rack carried thereby will thereupon be free to move or jump upward by reason of suitable tension mechanism used for that purpose. In the present instance this tension mechanism comprises a series of spring bands 153 one for each of such plates, connected at one end to the plates and at the other end to spring barrels 154 which are mounted upon the brackets 155 secured to a cross bar or rail 156ª in the machine, Figs. 4, 7, 9 and 16. The tension of these bands may be regulated and maintained by means of the pawl 156 which engages the ratchet 157 whose hub is connected to the inner end of the spring in the barrel. Inasmuch as the tension of these spring bands is upward, the sliding plates to which they are connected will be drawn upward whenever permitted to do so by the unlocking of the locking mechanism which has just been described. This locking mechanism is controlled by means of the vertical bail which is itself controlled by means of any one of the sliding stops with which it coöperates.

In order that the extent or height of the jump or upward movement of the rack may be determined or limited by the particular sliding stop which is drawn out, the sliding plate is provided with some suitable projection on that side adjacent to the said stops. In the present instance a stud or pin 158 is shown as such a projection suitable for the purpose, Fig. 12, and is adapted to strike against and be stopped by the extended portion or projection 159 of the particular stop which has been pulled out by the depression of one of the keys, Fig. 13. All of the sliding stops move in parallel planes while the sliding plate and its rack move in a plane at right angles to the planes of these stops. When the machine is operated the sliding plate is free to move upward without any interference until its pin reaches the projection 159 of any stop which has been pulled out. If stop No. 1 has been operated then the movement of the sliding plate will be comparatively slight, being to the extent of only one tooth, whereas if stop No. 9 should be operated by the depression of No. 9 key then the sliding plate will be free to move or jump to the extreme upper limit of its stroke. In moving upwardly the pin or projection 158 on the sliding plate passes through the recess 160 of each of the stops below the particular one which is operated, the recess 160 being formed on each stop between the projections 149 and 159, Fig. 13.

The distance between the sliding stops has a correspondence to the distance between the teeth on the rack, these distances being in fact equal, consequently the rack moves upward a distance determined by the particular stop drawn out, which amount of movement equals the value of the key depressed and which value is communicated to registering and totalizing dials about to be described. For instance, if No. 8 key is depressed, No. 8 stop is pulled out and the rack moves a distance of eight rack teeth until stopped by contact of its pin 158 against the under side of No. 8 stop which has been brought to interfere across the path of movement of such pin 158.

As there is a correspondence between the rack teeth and the distance separating the sliding stops, so there is a correspondence between the size or length of the slots 118 and 119, in that the total length of the independent movement of the rack on its plate is equal to two rack teeth, to the end that when it makes its independent upward movement in the adding calculation said rack will move upwardly exactly the distance of one rack tooth while in the subtracting calculation said rack will move downward exactly the distance of one tooth.

In order that the sliding plate and rack may move upward exactly the distance of one tooth when key No. 1 is depressed it is necessary that the projection or pin 158 on the sliding plate shall be so located thereon as to normally be positioned below sliding stop No. 1 exactly the distance of one rack tooth. When key No. 1 is thus depressed, stop No. 1 is of course withdrawn or pulled outwardly and the sliding plate being then unlocked will jump upward until stopped by contact of its pin 158 with the projection 159 on stop No. 1, said pin 158 and consequently the rack having moved exactly the extent of one rack tooth.

*Totalizing dials.*—To register and totalize the amounts or values communicated from the keys through the sliding racks, a series of dials 161 are employed, Figs. 4, 5, 7, 9, and 11, which are here shown as nine in number, corresponding to the number of banks of keys and sliding racks, the number varying with the number of such banks and racks used, although, obviously, dials may be added on the left of the last dial without employing any additional banks of keys. These dials are arranged in a plane above the upright guides or frames just inside the shield 162 which covers a portion of the machine in advance of the key board, and also protects the type bars. Such shield has a series of sight or dial openings 163 at the proper plane to expose one number on each dial beneath, which dials and their openings are so arranged as to be easily visible to the operator of the machine. These totalizing dials each have a ten toothed pinion 164 and are properly spaced or distanced, and also loosely mounted, on a horizontal shaft 165 secured in brackets 166 on the cross rail 18. Each dial pinion is adapted to engage with its respective sliding rack, twelve or more teeth being usually provided on such rack so that when the machine is set for adding calculation, for instance, the rack will have some of its teeth in positive engagement with its pinion. When a rack jumps upward, as above explained, and assuming that the machine is set for the adding calculation, the value or number of the key depressed is registered on its dial, the rack having moved upward the number of teeth represented by the key and having consequently turned its pinion the same number of teeth. In the subtracting calculation the coöperation between the rack and its pinion is exactly the reverse, as will be hereinafter more fully explained, inasmuch as the engagement therebetween will occur just prior to the downward stroke or restoration of the rack to normal position.

*Carrying or subtracting 1.*—In adding figures, it becomes necessary, of course, to "carry 1" as it is commonly called in arithmetic, and also necessary to take away or subtract 1; that is to say, in the adding calculation, to carry 1 from units to tenths, for instance, or in the subtracting calculation to subtract 1 from tenths, for instance. In the present instance, this mechanism for carrying or taking away 1 comprises what, for convenience, may be termed a dial-communicating-bail 167, because it in fact does communicate between the dials and always coöperates with the rack on the left hand of the particular dial by which it is operated. As shown there is a series of eight of these bails, one less than the number of racks employed in the machine here illustrated, inasmuch as the ninth dial on the left is the last dial and does not require any such bail. Inasmuch as the construction and operation of each of the bails is precisely the same, a description of one of them will suffice for all, reference being had to Figs. 4, 7, 9, and 16 of the drawings. The lower end 168 of this bail is pivoted as shown on the stud 169 screwing into the cross rail 100 of the machine. A spring 170 is coiled around the stud and against the bail, so as to tend to force the vertical portion of such bail against the outer end of the lock 121 and thereby tend to unlock the latter. Obviously, any other manner of providing a tension may be employed. The upper horizontally bent end 171 of this bail is pivoted on a stud 172 screwing into the cross rail 18. This bail thus has a movement substantially forward and rearward but is normally forced rearwardly by said tension mechanism. As just explained, the spring 170, which in the present case provides the tension, tends to throw the bail proper rearwardly and of course the movement of the extreme end of the bent portion 171 beyond its pivot would be forwardly. In order to lock this dial connecting bail outwardly against the stress or tension of its spring the following mechanism is provided as suitable and efficient for the purpose: On the rail 173 is arranged a series of forwardly projecting lugs 174 on which is pivotally mounted an upwardly spring-pressed locking finger 175 whose extreme end is shaped into a hook 176 adapted to engage the said extreme end of the horizontal portion 171 of the bail, and thereby lock the bail proper outwardly and prevent its unlocking the dog from engagement with the rack. This locking finger 175 may be spring-pressed in any suitable manner as by means of a spring coiled around its pivot or stud. So long as the dial communicating bail is thus held forwardly by the locking finger and its spring thus prevented from exerting its tension or force against the locking dog 121, the engagement between the sliding rack and its plate will not be disturbed and said rack and plate will thereupon move up and down as if they constituted a single integral piece.

In order to provide for the unlocking of the locking finger 176 at the required time, that is, when the dial with which the end of the bail coöperates has received a number greater than its capacity, which, in the adding operation, is 9, so that there will be 1 to carry, or in case of the reverse operation for the subtracting calculations, the following mechanism may be adopted (Figs. 9, 16 and 17): Upon the side of each dial is a projection 177 which is adapted, once in each complete revolution of its dial, to contact an upward projection 178 on the top edge of said locking finger. This projection 177 is so located on the dial with respect to the dial figures as that it will contact the other said projection 178 when the cipher on the dial appears at the dial opening. This contact between said projections causes a depression of such locking finger and a release of the catch thereof from the bail, whereby the spring on the bail will cause the latter to contact and operate the locking dog 121 belonging to the rack and dial on the left of that dial which operated the bail, and consequently permit the said rack to make its hereinbefore described movement independently of its sliding frame to the extent of one notch, either up or down accordingly as the machine is set for the adding calculation or the subtracting calculation. It is to be understood that this bail extends to the left and is operated by the dial to the right of the one with which it is more directly associated, that is, one dial operates the bail belonging to its neighboring dial on the left and operates the rack of such latter dial to carry or subtract 1. If the machine is adjusted for adding, then the spring 133 at the lower end of the rack is so set as to normally thrust the sliding rack upward so that when this bail operates its lock the rack will jump upward to the extent of one notch and turn its dial one figure. In this condition and position of parts the operation here described is that of "carrying 1" from one dial to its neighboring dial on the left. If, however, the spring at the lower end of the rack is adjusted for the subtracting operation, then such spring normally tends to thrust the rack downward with respect to its sliding plate, so that when the locking dog 121 is operated by the dial communicating bail as just described the rack will be pulled down to the extent of one tooth and one figure will be taken off from that particular dial. This operation of taking 1 off from the dial is caused by the subtracting from its neighboring dial on the left in the same manner as the carrying was occasioned by such dial on the left except that the operations are reversed owing to the reversal in the direction of the thrust of the spring. It will be understood from the examples hereinafter given that this operation of carrying or subtracting 1 will occur at any position of the sliding plate.

*Adding and subtracting shift.*—In order to change the machine from adding to subtracting position or vice versa, a bell crank 179 is mounted on both ends of a cross shaft 179ᵃ, Figs. 4, 9 and 16, which is pivoted in the side frames and provided with an extension coming through the frame where it has an operating handle 180, here shown on the left hand side of the machine, Figs. 1 and 2. The corresponding arms of the bell crank are connected together by means of cross rods 181 and 182 which in their movements occasioned by the operating handle are adapted to contact one or the other of the locking dogs 128 and 129 so as to release the particular dog contacted, and also to shift the arm 127 to which the dogs are pivoted, thereby changing the direction of the thrust of the spring on such arm. In the position shown in Figs. 9 and 16 the machine is adjusted for adding, but by turning the operating handle so as to thrust the lower bell crank upward, their connecting rod 182 will contact, and release the lower locking dog 128 and shift its arm 127 on its pivot, thereby carrying the arm and the other locking dog 129 around until the latter dog engages in its notch 131. The direction of thrust of the spring is now downward and the machine is adjusted for subtracting, Figs. 17 and 18. A spring 183 connected at one end to the side frame of the machine and at its other end to a lug 184 on the shaft or on the bell crank serves to hold the bell crank in the normal position shown. The object in this arrangement is to normally keep the bell crank and said connecting rods out of the path of movement of the sliding plate and said locking dogs so that in all movements they will clear such connecting rods 181 and 182.

*The restoring bail.*—The main lever or restoring bail coöperating with the calculating mechanism and reference dials and also the carriage set mechanism and the paper feed mechanism as hereinafter referred to, is for convenience designated the restoring bail, and is best shown in its practical entirety in Fig. 6 of the drawings. As herein shown it comprises a frame consisting of two side portions 185 which are pivoted at their rear ends in lugs 186 on the end frame 13 and provided with a cross bar 187 adjacent to the sliding plates and racks and an intermediate cross bar 188 for a purpose hereinafter specified. The right hand side of this bail frame is continued forwardly or provided with a separate strip or bar 189 to whose forward end is secured an operating handle 190 passing through a slot 191 in the right hand side frame 11 of the machine and in easy reach or grasp of the hand of the operator. This bail constitutes the main operating device both for actuating certain parts of the calculating mechanism and for restoring the same to normal position. In view of its last named function and for convenience this bail or lever will be hereinafter called the restoring bail. One of the functions of this restoring bail which may be here alluded to is to restore to normal position those dial communicating bails which may happen to have been operated and to this end I have shown the following arrangement and construction, Figs. 4, 7, 9, 16, 19 and 20: On the cross rail or bar 100 at the bottom of the machine is pivotally mounted in lugs or bearings 192 a rock shaft 193 having at its right hand end a crank arm 194 arranged in the vertical plane in which the arm 189 of the restoring bail operates so that when this restoring bail is depressed to the full extent of its downward stroke said shaft 193 will be rocked. On this rocking shaft is mounted a series of upwardly projecting arms 195 arranged in the same vertical plane as the dial communicating bails to the rear thereof, so that when said shaft 193 is rocked as just described these arms 195 will contact all of the bails which may have been operated, and restore them to normal position, that is, in such a position as that the locking finger 176 will engage the upper horizontal portion of said bails.

*The rack shifting guide.*—In the adding calculation the sliding racks which have been operated being in engagement with the pinions of the dials, jump up and turn those dials to the amount or value represented by the key which has been depressed. In order that the racks may be returned to normal position without disturbing the dials which they have operated it is necessary that those operated racks shall first be removed from mesh with the dial pinions. In the subtracting calculation the operation is just the reverse, that is the racks which have been operated have been previously removed from mesh with the dial pinions so that when they jump they are not in mesh therewith, but are put in mesh after they have jumped up the distance corresponding to the amount expressed by the key or button which has been depressed, whereby when the restoring bail has been depressed the racks now in engagement with the dial pinions are carried downward and the proper amounts are subtracted or taken off from the dials, after which the racks are removed from mesh with their dial pinions ready for the next calculation.

The construction and mode of operation of the mechanism for shifting the various racks as above described will now be explained, reference being had particularly to Sheets 13 to 16, inclusive, and also to Sheet 8 of the drawings. As shown this mechanism consists of a rack shifting guide or bar 196 which is adapted to slide horizontally at the upper end of the upright frames, and, as shown, this guide has slots 197 at intervals to accommodate studs or screws 198 entering two or more of these upright frames. This rack shifting guide is normally spring pressed to the right by means of a spring 199 fastened at one end to some stationary part of the machine, such as one of the upright frames, and at the other end to a pin 200 fastened to the guide, Fig. 7. On the rear side or edge of this rack shifting guide is a series of circular holes or recesses 201 with a side opening through which enters the sliding racks, such openings being circular or enlarged so as to permit the rack to have free movement at whichever angle it may happen to be shifted. At the same time the rack shift or plate engages the rack at a point beyond its teeth and will therefore not interfere with the latter. When this rack shifting guide is in normal position the racks are at right angles thereto and are consequently in mesh with their respective dial pinions, but when such guide is shifted to the left the racks are also shifted and carried out of engagement with the dial pinions. In adding operation, this shifting of the rack out of engagement with the dial pinions occurs when the racks are in their upward position and in subtracting operation when they are in their downward position.

The automatic shifting device for this rack shifting guide is constructed as follows, first referring to those parts particularly concerned in the adding calculation, Fig. 19, 20, and 21: As herein shown, on the right hand side of the machine is provided a bracket 202 on which slides a frame 203 having on its face adjacent to the side frame 11 a series of notches 204, which, in the vertical movements of the sliding frame, are adapted to come in contact with the pivoted pawl 205, whose outer free end is forced downwardly when the sliding frame is depressed, and forced upwardly against the tension of a suitable spring 206 when this sliding frame rises. This sliding frame is connected to the restoring bail by means of a link 207 fastened to the inner side of such sliding frame so that the latter is moved up and down with every motion of the restoring bail. The object of the said pawl which engages the notches in the sliding frame is to always compel a complete stroke of the restoring bail so that the machine may be properly operated and cleared. In case the stroke is not complete this pawl will engage said notches and lock the sliding frame and consequently also lock the restoring bail. Before the machine can be further operated the restoring bail must be given a full stroke so as to release the pawl from its engagement thereby permitting the return of the restoring bail to normal position which is maintained by suitable means such as the springs 208 fastened at one end to the end frame 13 and at the other end to the restoring bail near its pivotal point, Fig. 4.

The sliding frame 203 has on its inner face a cam 209, Figs. 21 and 22, which, when moved, contacts a roller 210 mounted on the right hand end of a short lever 211 which is itself pivoted upon a bracket 212 fastened to or forming a part of the rack shifting guide. When this sliding frame is depressed the engagement of the said cam upon the roller serves to force said roller and consequently the rack shifting guide to the left and when moved sufficiently far in this direction a locking trigger 213 which is mounted on a bracket 214 connected to one of the upright frames 101 engages into a notch 215 in the under side of said rack shifting guide, so that the latter will be at this time locked in its shifted position until the return of the restoring bail to its normal position, Fig. 22. The shifting of this guide has caused a shifting of the racks and a disengagement thereof from the dial pinions in the manner above described. The upper end of the sliding frame is slotted to receive therein a dog 216 pivoted at 217 and projecting slightly from the outer face of the sliding frame. This dog rests on the bottom of the slot, but is free to move upwardly. When the sliding frame is depressed, this dog will be carried upwardly by the roller until it clears the latter, but on the upward stroke this dog will strike the roller and raise the same so that a pin 218 on the lever 211 on which the roller is mounted will contact the locking trigger 213 which holds the rack guide in its shifted position. This release of the trigger permits such guide to be returned to its normal position by reason of the stress of its spring, as well as the return of the racks to engagement with their respective dial pinions.

In the drawings, Fig. 19 clearly illustrates the normal position of the parts of the rack shifting guide and the coöperating mechanism when the machine is set or adjusted for the adding calculation, in which it is seen that the racks are in mesh ready to operate their dials while all the locks and triggers are at normal position, that is, out of active coöperation with the rack guide which is consequently pressed to the right by its spring. Upon the completion of a number by the desired buttons, the racks which are operated jump up as before explained thereby turning their respective dials. The operator then depresses the restoring bail and thereby causes the cam on the sliding frame to force the rack guide to the left. The plates and racks are then shifted out of engagement. As all of the sliding plates which carry the racks are vertically pivoted on the upright frames, said shifting of the plates and racks is possible. Before the restoring bail has reached the limit of its downward stroke, its cross bar 187 will contact the feet 113 and 120 of the sliding plates and racks respectively, and carry them down to restore them to normal position. To restore the racks, that is, to again put them into mesh with their respective dial pinions or in the plane thereof, the restoring bail having made a full stroke downward moves upward by reason of its springs whereupon the dog 216 will cause the unlocking of the trigger 213 in the manner before described.

In order to guard against any possibility of derangement or accidental movement of the dials when the racks are shifted out of mesh with their pinions, means are provided for locking such dial pinions at the moment the racks become disengaged. In the present instance these means consist of a series of locking fingers 219 pivoted on studs 220 screwing into the cross rail 173 and spring pressed against the racks by springs 221, Figs. 5 and 9. There are nine of these fingers corresponding in number to the number of racks. Each finger projects forwardly in the machine and the spring tension tends to throw it to the left. The left hand side of each locking finger has a projection 222 which is always held spring pressed against the side of its rack. When, therefore, the racks are shifted from engagement with their dial pinions, these locking fingers all follow up their racks in their movement to the left, whereupon the extreme end 223 of such fingers will engage in their dial pinions and thereby prevent any movement thereof while the racks are disengaged. Obviously when the racks are shifted back or in engagement with their pinions, the locking finger will likewise be shifted out of engagement. The fingers are, in the present instance, so constructed and arranged as to enter the dial pinions just as the racks are leaving them.

In giving a description of the operation of the parts just described, an example in addition will be done and it will therefore be assumed that the units dial registers 1 and that 8 is to be added. Starting with the plate 127 and its locking dogs in adding position, Fig. 9, with the racks in mesh with the dial pinions and the rack shift mechanism in the position shown in Fig. 19, key No. 8 in the units bank of the keys is depressed, thereby permitting the units rack to jump up to the extent of 8 rack teeth as hereinbefore explained, whereupon the units dial is actuated to the extent of eight units which, added to the 1 unit already there, makes 9 as registered on such dial. The next operation is the depression of the restoring bail, near whose first movement the cam 209 contacts the roller 210 thereby forcing to the left the rack guide to which such roller is indirectly connected as before described. At the same time the trigger 213 will engage in the notch 215 and hold the rack guide in said shifted position against the tension of its spring. These movements cause a shifting of the racks out of engagement with their dial pinions which are locked against accidental displacement by the series of fingers 219 until such racks are again put in engagement. The further depression of the restoring bail will carry the operated unit sliding plate and rack down to normal position when they become locked as before described. When the restoring bail rises, the dog 216 which cleared and passed by the roller 210 on the down stroke will now strike and raise such roller on the up stroke and thereby bring the pin 218 against the upper arm of the trigger 213 withdrawing the latter from engagement and permitting the rack guide to be restored to normal position and its guides into engagement with their dials. The units rack which was operated was previously restored by the cross bar 187 of the restoring bail and it, with the other racks, is put into mesh with its respective dial pinion. The parts are now again in the original position from which we started.

The example just performed did not bring into operation the mechanism for "carrying 1", and in order to illustrate this operation of this mechanism, it will be assumed, for example, that the dials already register 387 and that it is proposed to add 258. Starting with the machine in adding position, the number is written on the machine by first depressing the key 2 in the hundredths bank, then the key 5 in the tens bank, and finally the key 8 in the units bank. The racks thus operated will jump up to the extent determined by the values of the keys depressed, as before explained, and communicate such values to the registering or totalizing dials. But during the upward movement of the two racks on the right, the units and tens dials have been moved beyond their cipher position which causes the projection 177 to unlock the finger 175 thereby releasing the two dial communicating bails on the right and permitting them to unlock the dogs 121 belonging to the tenths and hundredths dials. The sliding racks belonging to the hundredths and tenths dials consequently make an independent movement upward to the extent of one tooth so that those two particular dials received respectively 3 and 6 by reason of the 1 carried over from the right. The result which is 645 now appears on the dials. These bails for "carrying 1" can be operated at any position of the sliding plates, as, for instance, in this example, the tenths dial operated the bail of the hundredths sliding rack while such plate was in its raised position, (that is, raised to the extent of two rack teeth,) whereby 1 was carried onto the hundredths dial, while the units dial operated the bail of the tenths rack when such plate was in its raised position to the extent of five rack teeth, whereby 1 was carried onto the tenths dial. If, for another example, all the dials show 9 except the last one on the left which shows 0, and supposing that 1 unit is to be added, then No. 1 key in the units bank is depressed, thereby causing the rack and plate corresponding to that bank to jump up to the extent of one rack tooth, whereby the units dial will be brought to 0. This causes the operation of the first bail which will permit a carrying of 1 on to the second or tenths dial which operation in turn actuates the second bail, and so on, through all the bails until the last rack will cause a registration of 1 on the last dial. So far as the calculating mechanism is alone concerned it is immaterial which of the keys is depressed first, but when the machine is also typewriting the numbers, the keys must be depressed from left to right.

Now referring to the subtracting operation, the construction of the mechanism for shifting and locking the rack guide is as follows (Figs. 19 to 22, and 26 and 27): A bracket 224 mounted on the cross bar 100 at the lower portion of the machine carries a short horizontal shaft 225 having at one end an arm 226 carrying a forwardly projecting pin 227 which is in the path of travel of the cross rods 181 and 182 connecting the ends of the bell cranks 179, Figs. 9 and 16, which are operated by the adding and subtracting lever on one side of the machine. A suitable means, such as a spring, is employed for holding the shaft and its connections in normal position. When the shaft is partially rotated by the adding and subtracting lever as described, and brought to a substantially horizontal position, (see Figs. 26 and 27) its said arm 226 is engaged and locked by a locking finger 229 at its lower end, which is pivoted on a stud 230 screwing into an extension of the bracket 224 and normally spring-pressed forwardly by suitable means such as the spring 231 coiled around the stud, Figs. 19 and 20. By means of this spring the locking finger is normally held projected across the path of movement of the arm 226 which, when adjusted to horizontal position, becomes engaged by the recess 232 in the locking finger. The parts just described are best shown in Figs. 19, 20, 22, 26, and 27. This arm remains locked in this position until released as hereinafter described. The shaft 225 also carries another arm 233 projecting therefrom diametrically opposite from the first mentioned arm and is provided at its outer end with a stud 234 adapted to work in a longitudinal slot 235 in a vertical link 236. This link has at its lower end a hook 237 and is connected at its upper end with the upper arm of a bell crank 238 which has a bearing in the end of a bracket 239 extending to the left of the machine and mounted on the right side frame. The other arm of the bell crank 238 extends downwardly and is adapted to engage at its extreme lower end against a shoulder 240 on the rear side of the rack guide. A second link 241 is pivoted at its lower end to a stud or pin 242 arranged on the arm 233 intermediate of its length while its upper end is pivoted to a stud 243 on the left hand arm of the lever 211 on which the roller 210 is mounted. The said upper end of the link 241 has a slot 244 in which the stud 243 works for a purpose hereinafter apparent. When said shaft 225 is partially rotated the arm 233 carries the slotted link 236 slightly to the right so that its hook 237 will be in the path of travel of a hook 245 connected to or forming a part of the restoring bail, so that such link 236 will be carried downwardly near the extreme lower stroke of the restoring bail. At the moment when the shaft 225 was rocked to throw the link 236 into the path of movement of the restoring bail the other link being thereby depressed pulls downward the left hand arm of the lever 211 and thereby elevates the opposite end, carrying upward the roller 210 which is in consequence carried out of the path of the cam face on the sliding frame. A further consequence of these movements is the elimination of the shifting mechanism which was particularly concerned in the operation of the rack guide when the machine was adjusted for the adding calculation, as hereinbefore explained. Thus the roller 210 is thrown out of service and simultaneously the pin 218 on the lever 211 will contact the trigger 213 and keep it out of engagement with the rack guide so that the latter will be operated by the bell crank 238 and its co-operating parts. This downward movement of the link 236 operates the said bell crank 238 so that its downwardly extending arm will engage the shoulder 240 on the rack guide and shift the latter to the left. Suitable mechanism is desired to lock this bell crank in such shifted position and in the present instance the following mechanism is adapted for this purpose (Figs. 22, 28 and 29): A locking finger 246 is pivoted on a bracket 247 extending from the right side frame and projects downwardly so that at its lower end which is notched or shouldered will engage and lock the bell crank after its operation, the lower end of the finger engaging and fitting against a projection 248 on the top of the bell crank. As the sliding frame moves downward a rearwardly extending pin 249 near the upper end of such frame strikes against the arm 250 of a bell crank shaped pawl which is pivoted in said locking finger 246 whereby such locking finger is thrust to the left out of engagement with the bell crank 238 so that the rack guide will now be free to be returned to its normal position by means of its spring. When the restoring bail is moved downwardly to the limit of its depression it also carries the slotted link downwardly thereby moving the bell crank and permitting the locking finger 246 which may be spring-pressed to be thrust into locking position, and thereby lock down such bell crank. On the upward movement of the sliding frame the pin 249 at the upper end thereof will slide by the arm 250 of the pawl in the locking finger and will not disturb or unlock the bell crank 238. To permit of this operation the under side of the pawl is beveled and likewise the top of the pin. This unlocking of the bell crank 238 thus occurs only when the restoring bail is depressed.

In the subtracting mechanism just described the slot in the link 241 performs no function but in the adding position of the parts it permits free movement of the lever 211 which can thus move up and down as to its left hand end without interfering with its connecting link.

A clear understanding of the above described mechanism for shifting the rack guide in the subtracting calculation may be obtained by following the various operations and correlative movements of parts beginning at the key board, but first assuming that the machine has been adjusted to subtracting position which results in having the various parts as shown in Figs. 26 and 27, that is, the arm 226 has been shifted to horizontal position thereby causing the shifting of the links and parts actuated thereby and throwing the locking finger 213 entirely out of service. Likewise the springs 133 on the sliding racks have been adjusted so as to exert their tension downward for the purpose of subtracting 1. In this condition of the above mechanism, a blank stroke of the restoring bail is made so that the rack guide is held to the left in its shifted position and all the racks are consequently disengaged from their pinions while the locking fingers 219 are in engagement with the pinions. When a key, say No. 8 key, for instance, has been depressed, sliding stop No. 8 corresponding to this particular key is pulled out and the mechanism which locks down the sliding plate carrying the rack is unlocked. The sliding plate and its rack will now jump up but at one side of its pinion until stopped by said stop No. 8, and the same operation would result from the depression of a key in any of the other banks. The next operation is the movement of the restoring bail by the operator. Just after the first downward movement of this bail and its sliding frame, the pin 249 will contact the arm 250 of the pawl and unlock the bell crank 238 by shifting the locking finger 246. The rack guide will now be restored by its spring and the link 236 will be moved upwardly freely, because of the provision of the slot 235. By this restoration or shifting of the rack guide to the right, the racks have all been brought into engagement with their pinions, the operated rack engaging its pinion a certain distance up its rack corresponding to eight teeth. Upon a further depression of the bail the cross rod 187 will contact the feet 113 and 120 of the operated plate and rack respectively, and thereby carry them down to normal position, the rack becoming locked down by the mechanism before described. The racks and plates not operated have remained in their normal position so far as vertical movement is concerned and consequently the cross bar 187 has no effect upon them. At the extreme of the down stroke of the bail the hook 245 thereon will engage the hook 237 on the end of the link 236 and consequently shift the rack guide to the left, by reason of the movement of the lower arm of the bell crank 238 which then becomes locked as before described, while the machine remains adjusted for subtraction.

In order that all the sliding plates and racks may be fully restored to their normal downward position at the same time and to provide for the stoppage of the plate or rack so that they may be brought into proper relative position to permit lock 121 to operate, it is preferred to use a series of set screws 251 screwing upwardly through the cross bar 100, one being provided for each sliding plate and rack and positioned directly below the feet 113 and 120 so as to contact and stop both of them. Although one set screw is shown for a plate and rack it is obvious that a separate set screw may be provided for each plate and rack. If 1 was carried by a rack in the adding calculation its sliding plate would strike the set screw first and be thereby stopped until the rack was brought down to locking relation; while in the subtracting calculation if the particular rack should have subtracted 1, then the rack would strike first and the plate would be brought down into locking relation therewith. The racks are now again out of engagement with their pinions, and ready for another subtracting operation.

The above described calculation was a comparatively simple one and the operation assumed that the particular dial which was actuated already contained a value of eight or more from which the subtracted number 8 could be taken. A more complex subtracting calculation will now be made in order to show the coöperation of the mechanism for subtracting 1 from the dial on the left hand side of the particular dial which required the taking away of 1. For example, suppose that these totalizing dials register 354 and it was desired to subtract 169. The mechanism is first set for subtracting by the manipulation of the handle 180 which operates the mechanism at the right hand end of the rack guide or plate and disables the means for shifting the rack guide at the outset of depression of the restoring bail, while enabling the means for shifting said guide at the conclusion of such movement of said bail so that the taking of a blank stroke thereupon shifts such guide to the left in the manner already explained. The racks are now shifted out of engagement with their dials. Likewise the plate 127 and its dogs are shifted to subtracting position, Figs. 17 and 18, so that the stress of the spring 133 is downward. The keys indicating 169 are now depressed, the 1 key being in the third or hundredths bank, the 6 key in the tens and the 9 in the units. By reason of the operations already fully explained the racks corresponding to these three banks of keys jump upward, the hundredths rack to the extent of one tooth, the tens to the extent of six teeth, and the units to the extent of nine teeth, it being borne in mind that these three racks are now out of engagement when they thus move. The next operation is the depression of the restoring bail. At the first movement thereof the rack guide is permitted to return to the right together with its racks so that the latter are put into engagement with their dials. The operated racks are of course at different heights, representing different values, and are simply shifted horizontally into mesh with their dial pinions. The cross bar 187 of the restoring bail then contacts the feet 113 and 120 of the three operated sliding plates and racks, contacting the units plate first because it is at the highest elevation and contacting the hundredths plate last because it is at the lowest elevation. While these racks are moving downward, the units rack soon takes away the four units on its dial which consequently brings its projection 177 in contact with the locking finger 175, thereby releasing the first dial-communicating bail 167. The tension of this bail 167 is now exerted against the locking dog 121 belonging to the tenths rack and unlocking such rack from engagement with its sliding plate, whereupon this rack will make its independent downward movement to the extent of one tooth so that 7 will in fact be taken off from the tenths dial, that is, the 6 in the number 169 being subtracted and the 1 required by the units dial. In like manner when the tenths rack has brought its dial around by taking off the 5 indicated thereon the similar projection 177 will operate the next locking finger 175 situated on the left, thereby causing the bail coöperating with the lock 121 on the hundredths rack to release the latter rack and to thereby take away 2 instead of 1 from the hundredths dial, that is, the 1 in the number 169 and the 1 required by the tenths dial. The dials now indicate the result, which is 185. Just before the restoring bail reaches the bottom of its stroke, it will contact the crank arm 194 on the horizontal shaft 193, whereby the arms 195 will actuate and thereby reset any of the bails 167 which have been operated, in the above example, the first and second bails from the right. By such resetting is meant the engagement of the locking fingers 175 with their respective bails. Upon the continuance of the downward stroke of the restoring bail, the cross bar 187 will carry the sliding plates down as far as their racks, speaking particularly of the operated racks, which have of course been stopped on the set screws in the cross bar 100, just before the completion of the stroke of the restoring bail, and in advance of the contact of their plates therewith. When these operated plates and racks have been thus brought into normal relative position the dogs 121 will engage the racks and hold these particular members together. Just before the restoring bail has completed its downward stroke, it operates the rack guide and causes a shifting of the racks from engagement with their pinions, after which the restoring bail will be returned to normal position. Now, if the next calculation was to be addition, the handle 180 would be operated to adding position which causes a shifting of the plate 127 and consequent change in direction of thrust of the spring 133 so that this particular mechanism would be set to "carry 1." The same movement of the handle would put the parts concerned in the shifting of the rack guide in the position shown in Fig. 19, so that by a blank stroke of the restoring bail the racks would be immediately restored to engagement with their dial pinions. The machine is now set and ready for the adding calculation.

In the foregoing description it has been assumed that proper mechanism was employed for unlocking the vertical locking bails which normally locked down the sliding plates and racks. As herein shown, this mechanism is adapted to be operated by the movements of the restoring bail. The preferable construction for the purposes desired is as follows (Figs. 4, 8, 9, 16, 24, 31, 32 and 33): A rock shaft 252 is arranged transversely of the machine with its ends journaled in the side frame thereof, which shaft is normally pressed to the left as by means of a coiled spring 253 encircling the shaft and bearing at one end against the side frame and at the other end against a pin 254 on the shaft, Fig. 8. The left end of the shaft is extended through the left side frame where it is provided with a hand knob 255 for pressing the shaft inward. This shaft extends transversely of the machine just above the sliding plates and has a number of depending arms or cams 256 corresponding in number to such plates and adapted to contact the downwardly extending fingers 147 heretofore explained as provided on the upper horizontal portions of the vertical bails 141 which are operated by the sliding stops and control the locking dog or pawl 150. When the shaft is rocked the cams 256 are brought into contact with the fingers 147 whereby the vertical bails, of which these fingers, in the present instance, form a part, are shifted so that the vertical portions 141 of these bails will be shifted laterally to the left, thereby withdrawing them from engagement with the projection or catch 149 in the particular sliding stop which might have been operated. When this bail is thus shifted the sliding stops which have been thus operated are free to be returned to their normal position by the tension of their springs at the rear end thereof, said stops having been withdrawn or pulled forwardly against such tension. The stops and the vertical bails are now restored to normal position ready for the next operation or calculation. As herein shown the movement or rocking of the shaft 252 is performed by the restoring bail itself and accordingly suitable connections between the shaft and this restoring bail are provided. In the present instance, Figs. 4, 30, 31, 32 and 33, these connections consist of a vertical link or strip 257 pivoted at its upper end to a short arm 258 which is fastened to a hub or bushing 259 which bushing has a peculiar operative connection with the rock shaft 252 as will be hereinafter explained when the repeating mechanism is described, with which mechanism it has more particular relation. This vertical link or strip 257 is arranged adjacent to one of the side frames, being arranged in the present instance at the left hand side of the frame and its lower end is bent at right angles to form a foot 260 which projects in the path of movement of one of the sides of the restoring bail. The result of this construction and arrangement is to cause a rocking of the shaft 252 at each downward stroke of the restoring bail, this restoring bail contacting and operating the strip 257 near the limit of its downward stroke. Consequently the sliding stops are released and permitted to be restored to normal position at the proper time.

*The repeating mechanism.*—After the keys have been operated for a certain number, it may be desirable or necessary to repeat that number to any extent, either in the calculations of addition, subtraction, multiplication or division. It is desirable that one operation of the key board, that is, a single depression of the proper keys for that number, shall be sufficient in the operation of repeating that number as many times as found necessary. The machine herein shown is designed to attain these objects and for this particular purpose the following mechanism is designed as the preferable one: Referring particularly to Figs. 8, 9, 30, 31, 32 and 33 of the drawings, the rock shaft 252, hereinbefore mentioned, is provided with a second series of downwardly depending arms or cams 261 corresponding in number to the number of sliding plates. When the rock shaft 252 is pressed inwardly toward the right these cams 261 are brought to bear against any of the locking dogs 150 which may have been operated by their sliding stops. These dogs are thus held in the position in which they were put by the operation of the particular keys depressed, or in other words, these particular dogs are rendered inoperative. The lower outer ends of these cams 261 are curved and the upright frames are also correspondingly curved at the point 262 in order to accommodate such cams. For the purpose of holding the rock shaft in its inwardly thrust position suitable catch mechanism may be employed and to this end I have provided an arm or plate 263, having a finger or thumb piece 264 and normally spring-pressed against the outer surface of this sliding rock shaft 252 so as to catch into a circumferential groove 265 on such shaft and thereby lock the shaft in its inward position. Upon a movement of the finger piece, the plate or catch will be disengaged from the groove and the shaft will be restored to its normal position by the thrust of its restoring spring at the right hand end thereof.

When the rock shaft 252 is set to repeating position, arrangement must be made for preventing the operating of that shaft by the restoring bail, as hereinbefore described, the object of the rocking of the shaft by the bail being for the purpose of unlocking the sliding stops which were operated and permitting them to be restored to their normal position, whereas it is the object and intention of the repeating operation or calculation to hold these stops outwardly until the number is repeated the desired number of times, so that a single manipulation of the key board will suffice. Consequently provision is made for rendering the movement of the vertical link or strip 257 inoperative or ineffective upon this rock shaft. The following construction is suitable for this purpose: As hereinbefore stated, the arm 258 to which the vertical link 257 is connected, is fastened to the bushing 259 which abuts against the end of a bushing 266 fixed in the side frame 12 and through which the shaft 252 passes. Near the parting line between this fixed bushing and the movable bushing, the shaft 252 is provided with a circumferential groove 267 and also with a longitudinal groove 268 intersecting said groove 267 on the upper face of the shaft. The movable bushing is provided with an inwardly extending pin 269 while the fixed bushing is provided with a similar pin 270, the pin 269 normally engaging in the groove 268 and the pin 270 normally entering the groove 267. When the parts are in their normal position as is clearly shown in Fig. 33, the movable bushing becomes practically a part of the shaft 252, or, in other words, is connected thereto, so that when the vertical link 257 is operated by the restoring bail this movable bushing will be rocked, thereby causing a rocking of the shaft 252 due to the engagement of the pin 269 in the longitudinal groove 268. The fixed pin 270 does not, at this time, interfere with the rocking of the shaft 252 because of its position in the circumferential groove 267. The position of the parts shown in Fig. 31 represents the normal position of parts and not the repeating position. When, however, it is desired to adjust or set the calculating mechanism in repeating position, the shaft 252 is inwardly thrust, as hereinbefore described, with the result that the circumferential groove 267 is brought into register with the pin 269 of the movable bushing, while the fixed pin 270 will occupy one end of the longitudinal groove 268, Fig. 32. It will now be seen that the shaft 252 is locked against rotation by the engagement of the pin 270 in said longitudinal groove, while the movable bushing is free to rock on the shaft 252 without effecting any rocking of the latter by reason of the position of its pin 269 in the circumferential groove. When, however, the locking mechanism at the side of the machine is operated to release the rock shaft 252, the parts will be restored to their normal position and the movable bushing will again be in operative connection with such shaft.

For an explanation of the operation of the repeating mechanism it will be assumed, by way of example, that the number 169, which was heretofore written when the subtracting operation was fully explained, is to be repeated a certain number of times, as may be desired, without again manipulating the key-board, that is, without writing that number on the key-board every time such number is to be repeated. It will further be assumed that the parts of the machine are adjusted to adding position, the operation being first explained in connection with an adding calculation, and, also, that the rock shaft 252 has been thrust by hand inward toward the right hand side of the machine just after the number is written, thereby bringing the movable pin 269 into register with the groove 267 in said shaft while the stationary pin 270 will be positioned at one end of the longitudinal slot 268. When the number 169 was written on the key board the racks corresponding to the particular banks of keys which are operated jumped up respectively a distance of 1, 6, and 9 teeth and operated their respective dials according to the values represented by the keys or buttons depressed and also, of course, represented by the extent of upward movement of the racks. When the restoring bail is now depressed, it will operate the mechanism that controls the movement of the rack shifting guide in adding calculations, as hereinbefore described, thereby shifting the racks out of engagement with their pinions, which racks will then be carried downward and restored to normal position by the restoring bail, and then finally upon the up or return stroke of the restoring bail, the trigger 213 will be operated to release the rack shifting guide and permit the racks to be put into engagement with the dial pinions. Ordinarily, at this point of the operation, the racks were locked down against the tension of their springs and at the same time the vertical bails were operated, by reason of their connection with the restoring bail, so as to release any of the sliding stops which may have been operated. In the supposed example, the sliding stops 1, 6, and 9 of the hundredths, tenths, and units banks respectively had been withdrawn or pulled out in the manner hereinbefore described. It now being the desire to repeat the number 169, said operative connection between the restoring bail and said vertical bails is rendered inoperative or ineffective so that the sliding stops will remain in their operated position. The restoring bail will operate the vertical link 257, as heretofore described, but such movement cannot be communicated to the rock shaft 252 because the bushing 259 will rock freely on such shaft. Therefore the vertical bails, which serve to lock the operated sliding stops in their outwardly drawn position, will not be actuated, wherefore they will remain in locked position and thereby prevent these stops from being released or restored to normal position. Furthermore, this inward thrust of the rock shaft has caused the locking mechanism of the particular operated plates and racks to be held out of service, that is, rendered inoperative. This results from the contact of the cams 261 against the operated locking dogs 150 which are thereby held toward the right away from the path of movement of the operated sliding plates. After the number 169 has been written on the key board as hereinbefore explained, the racks will be shifted out of engagement with their pinions, then carried downward by the restoring bail and again put into mesh with their pinions after such restoration. Then the three racks which have been operated, in the assumed calculation, will follow the restoring bail upward to the extent permitted by the sliding stops which have been operated and which have been caused to remain in operative position as hereinbefore described. Consequently, the number 169 will again be added to the totalizing dials, the operation being repeated as often as necessary for the desired calculation. After the number is once written on the key board and the repeating mechanism put into service, the number can be repeated simply by operating the restoring bail without any further manipulation whatever of the key board.

The above example related to the calculation of addition but it will be apparent that the number written on the key board can be repeated in the same way in the subtracting operation, the only difference being that such operation is the reverse. The machine is first adjusted for the subtracting calculation and a number, say the number 169, the same as before, is written, whereupon the three racks on the right hand side of the machine will jump upwardly to the extent permitted by the sliding stops, but, as hereinbefore explained in regard to the subtracting operations generally, these racks are now out of mesh with their pinions. It being first assumed that the shaft 252 has been inwardly thrust for repeating, the downward movement of the restoring bail will now put the racks in mesh with their pinions, as before described, and will cause the restoration of these racks and consequently the taking off from the dials the amount 169, after which the rack shifting mechanism, controlled by the restoring bail, will shift the racks again out of mesh and, as the sliding racks are no longer locked down because of the particular locking mechanism being thrown out of service, such racks will follow the restoring bail upwardly to the extent indicated by the number 169. This operation may be repeated as often as desired and with but a single manipulation of the key board. The repeating mechanism is not only used in connection with adding and subtracting, but also for multiplication and division which are in their nature different forms of adding and subtracting calculations. The number of times that the restoring bail is operated may be registered by which I have hereinafter termed reference dials, which will be explained later on, by means of which dials the number of times the particular number is repeated, that is the number of times the restoring bail is operated, is registered or indicated, so that the product of a calculation in division, for example, will be indicated. Furthermore, when these reference dials are used the operator in multiplication will not have to remember the number of times he has operated the restoring bail, inasmuch as such dials register every stroke of the restoring bail.

*The error correcting mechanism.*—If in either the adding or subtracting calculations an error has occurred but is discovered before the depression of the restoring bail, provision is made in the machine for correcting such error, the following mechanism being shown in the present instance as the preferable one. As shown clearly in Figs. 1, 7, 8, 19, 22, 26, and 27, the key board is provided with an error key and button 271, which key is connected to a lever 272 pivoted intermediate of its length in one of the side frames, its rearward end projecting underneath and in contact with a plate 273 which has a slot 274 receiving the studs or pins 275 in the bracket 202 which carries the sliding frame hereinbefore referred to. By reason of this construction it is evident that upon a depression of the error key, said plate 273 will be moved upwardly and restored by gravity, or otherwise. This plate has a stop or shoulder 277 extending toward the left of the machine and which, when the plate is upwardly pressed by the error key and lever, as just explained, comes into contact with the pin 218 on the lever 211, thereby moving the roller out of the path of the cam on the sliding frame. The result of this movement is to throw the rack shifting mechanism out of operation, that is to say to render it inactive. Consequently, in the adding position of the machine, upon a depression of the restoring bail, the racks will take off from the dials what has just been put thereon by them by their jumping up due to the depression of the keys when the number was written on the key board; while in the subtracting operation, the upper portion 278 of the plate 273, which portion is inclined obliquely toward the left, will come into contact with the projecting arm 279 of the pawl on the locking finger 246, thereby carrying such pawl out of the path of the pin 249 near the top of the sliding frame, whereby the racks will be prevented from going into mesh with the dial pinions and leaving the dials in their original position, because of the intended failure of these racks to be shifted into mesh therewith.

By way of example, in an explanation of the operation of the error correcting mechanism, it will be assumed that the number 169 was intended to be added on the machine but that the operator in writing the number made a mistake and wrote the number 159, but discovered his mistake before he had operated the restoring bail. The three racks, corresponding to the banks of keys which were operated, have already jumped upward, while in mesh with their dial pinions to an extent as indicated by the value or number 159 so that such latter number has been added to the totalizing dials. Ordinarily the next operation would be the depression of the restoring bail with the rack shifting mechanism in active operation so as to shift the racks to the left and out of engagement with the dial pinions. But the operator having discovered his error, will thereupon depress the error key and thereby throw out of operation said rack shifting mechanism so that the racks will remain in engagement with their respective dial pinions. Now, upon the depression of the restoring bail, the three operated racks will be carried downward into normal position by means of the restoring bail, but it will be observed that they were brought down or restored while in mesh with their pinions so that just as much will be taken off from the dials as was added thereto when they jumped upward immediately after a depression of said operated keys. When the error key is released and the restoring bail has returned to normal position, the machine is in exactly the position and condition that it was before the operator made his mistake.

The operation of the error correcting mechanism when the machine is adjusted for subtracting calculation is similar in principle but of course the reverse in the actual movement of the parts. Supposing that the machine was set for subtracting and that the operator had made the same error as stated in regard to the adding calculation, the three racks which were operated have jumped upward the distance or extent corresponding to the value of the number 159. However, the racks are not in engagement with their pinions and consequently the problem is here to restore the racks to their original position occupied before they were operated, that is to say, that having jumped upward while out of mesh with the pinions they must be returned to normal position while out of mesh. Consequently, when the error key is depressed, the portion 278 of the plate 273 will contact the arm 279 and thereby throw the other arm 250 out of the path of movement of the pin 249 on the sliding frame so that the rack guide will remain in its shifted position to the left. Then, upon the depression of the bail the three operated racks will be restored to normal position and locked down by their locking mechanism hereinbefore described. Of course if the bail has already been operated before the error is discovered by the operator then the only remedy is to again write the number which was previously written, then change the adjustment of the machine from adding to subtracting or vice versa, and then subtract that number if the mistake occurred in the adding operation and add that number if the mistake occurred in the subtracting operation, to the end that the entire machine including the dials may be restored to that position and condition existing before the mistake was made. Or the difference between the proper number and the number written by mistake might be either added or subtracted so as to make the total correct as indicated on the totalizing dials.

For rendering the calculating mechanism practically inoperative when it is desired to use the typewriting machine alone, suitable means may be employed such as that shown in Figs. 4 and 73, from which it is observed that the strip 52 operated by the shift key has a pin 517 received by a slot 518 in the vertical strip 257, with the result that when the shift key is operated the strip 257 is depressed and the projections 256 are rocked into the path of the sliding plates so that the latter cannot operate even though the sliding stops may be. Said Figs. 4 and 73 illustrate the position of parts when both the typewriting and calculating mechanisms are in coöperative relation.

*The clearing mechanism.*—It is necessary to clear the totalizing dials and to bring the entire machine to an initial position, that is, with the dials all at 0 and all the parts of the calculating mechanism in normal position, and the following mechanism which is the preferred form, is made to accomplish these objects. As shown, in Figs. 7, 9, 16, 30, 31 and 32, upon the cross rail 173 of the machine is pivoted a transverse bail 280 which will be hereinafter designated as the clearing bail. This bail is in a substantially horizontal position but inclines slightly downward and forward and is provided with a series of arms 281 extending rearwardly and pivoted on the same center or axis on which the locking fingers 175 which control the vertical bails for the carrying mechanism are pivoted. There are as many of these arms 281 as there are dials and each arm is provided with an upwardly extending finger 282 normally downwardly pressed by a spring 283 and adapted to be projected into the path of travel of the projection 177 on each dial, which projection is so located on the dial as that the figure 0 will show through the dial openings when the dials are cleared. Each of these arms is also provided, immediately below its pivotal point, with a downwardly projecting finger 284 adapted to contact a lug or projection 285 on the top horizontal portion 142 of each of the vertical bails which control the locks for the sliding racks, Figs. 9 and 16. Through one side of the machine frame, in the present instance through the left hand side, a finger-piece or lever 286 extends, which lever is pivoted, intermediate of its length on a stud or screw 287 screwing into a lug on the side frame of the machine. The inner end or arm of this finger lever projects underneath said clearing bail and is adapted to raise such bail when the outer end of the lever is depressed by the operator's finger. The result of this operation is to throw the upwardly projecting fingers of the clearing bail into the path of movement of the projection 177 on the dials and to simultaneously unlock the locking mechanism which normally holds the sliding racks downward in normal position. This release of the bail and locking mechanism is caused by the thrust of the fingers 284 against the lug or projection 285 on the top or horizontal portion of each of said vertical bails. The result of the unlocking of the racks is to permit all of the racks to jump upward until the projection 177 on all of the dials comes in contact with said fingers 283 which consequently serve as stops and prevent further movements of the parts. All of the dials will now be at 0 position and then upon depressing the restoring bail all the parts of the calculating mechanism will be restored to their normal position.

*The carriage set mechanism.*—When the calculating mechanism hereinbefore described is working in connection with the typewriting mechanism so that the calculations are not only recorded on the totalizing dials but are also written on the typewriter mechanism, it is desirable that provision be made whereby the carriage of the typewriter may be, by simple manipulation, set to the space or at the column where it is desired to print; for instance, after having written the number 300 and it is desired to write the number 5000 therebelow, the carriage should be set back to the fourth space or column, counting back from any predetermined point or stop. To this end I have devised the following arrangement and construction which is shown as suitable for the purpose, reference being had particularly to Figs. 4, 9, and 34 to 41 and also 53 and 55 of the drawings: At the top or back of the key-board I have provided a row of keys which are marked from 291 to 299, both inclusive, which keys will be termed for convenience carriage set keys. These keys correspond in number to the number of banks of figure keys and may be varied in number according to the number of banks of figure keys used on any particular machine. Each key has a stem 300 adapted to slide in a bushing 301 secured between the two plates 15 and 16 of the key-board and preferably counterbored at the top and there provided with a coiled spring 302 encircling the upper end of the key stem whereby the key is normally upwardly spring pressed. The lower end of the stem is provided below the bushing with a plate 303 beveled on one side, on the left hand side in the form of construction herein shown. As clearly indicated in Fig. 34 the degree of bevel or obliquity of the left hand side of these plates varies from the first to the ninth key, the least degree being at the first key on the right hand side and increasing gradually to the ninth key in a certain predetermined proportion or amount. Each plate at its upper left hand corner is provided with a shoulder or notch 304 for a purpose hereinafter explained.

Immediately below this row of keys and directly in the plane of vertical movement of the plates 303 is a transverse plate or bar 305 which is capable of a sliding movement on brackets 306 and 307 extending inwardly from the left and right hand sides respectively of the machine frame. This sliding transverse plate is provided with a series of nine longitudinal slots 308, all preferably of the same length.

The extreme lower ends of plates 303 are adapted to enter slightly in their respective slots to keep them from turning. Near each end of the sliding plate is a slot 309 adapted to receive a stud or screw 310 screwing into the top of the upturned portion of the brackets 306 and 307 respectively, in order that the plate may have a sliding movement to the right and left. Obviously when a key is depressed, the beveled side of its plate will engage the left hand end of its slot, thereby forcing the sliding plate to the left a certain distance corresponding to the amount or degree of the bevel of the key plate. Key No. 291, will of course, cause a comparatively slight movement of the sliding plate 305, whereas the last key No. 299, will move such sliding plate substantially to its limit of movement to the left. In order that the movement of these carriage set keys may be communicated to the carriage the following mechanism is employed: A shaft 311 extending rearwardly of the machine is supported at one end in the side bracket 306. Upon the forward end of this shaft, adjacent to the bracket 306, is mounted an upwardly extending arm 313 having a longitudinal slot 314 located near its outer end and adapted to receive or engage a pin 315 arranged on a lug 316 depending from the left hand end of the sliding plate. It is evident that any movement of the sliding plate 305 as above referred to is communicated to the rear end of the machine by means of the shaft 311 which is caused to rock by the engagement of said arm 313 with said sliding plate. The rear end of the shaft has an upwardly extending arm 317 to which is pivotally connected a link 318, Figs. 53 and 55, extending substantially horizontally to the longitudinal axis of the machine where it is connected to the carriage set mechanism which is more directly associated with the escapement mechanism and the carriage and which is now to be described.

That part of the carriage set mechanism which is more directly associated with the carriage itself is best illustrated in Figs. 36 to 41 inclusive of the drawings, and as shown, is mounted in the main bracket 57 which supports the regular escapement mechanism hereinbefore described. Upon lugs 319 projecting from the main bracket is journaled a short shaft 320 to which is secured at one end a ratchet wheel 321 and at the other end a pinion 322. This pinion rotates in substantially the same plane as the pinion 83 belonging to the escapement mechanism, and consequently such pinion 322 is at all times in mesh with the carriage rack 84 and moves with every movement of the carriage. Upon the rear end of the shaft 320 beyond the ratchet wheel 321 is loosely mounted a shield which consists of a flat portion 323 parallel with the outer face of the ratchet wheel, and a marginal flange portion 324, such latter portion, being in the present instance, almost semi-circular, and projecting over and thereby shielding a portion of the ratchet teeth. This curved flange is described from the same center as the ratchet wheel, that is, from the central axis of the shaft 320

The transverse rod or strip 318 hereinbefore described as connected with the movable transverse bar 305 which is actuated by the carriage set keys, is connected eccentrically to the flat side of the shield at the point 325 as clearly shown in Fig. 36. Upon said shaft 320 is also loosely mounted a swinging plate 326 carrying at one end a suitable spring-pressed pawl 327 adapted, under certain conditions, to engage and actuate the ratchet wheel 321, but which normally bears against and rides upon the outer surface of the shield which serves the purpose of normally keeping such pawl out of engagement with the ratchet teeth. In order to actuate this swinging plate 326 and the pawl carried thereby, at every operation of the restoring bail suitable connection is made between said swinging plate and said restoring bail. In the present instance, this connection comprises a vertical rod or strip 328 which is connected at its upper end to that end of the swinging plate 326 opposite the pawl 327. This rod 328 extends downwardly and is connected to the free or rearward end of an arm or lever 329 which is pivoted at the end of a bracket 330 depending from a cross-rail or strip 331 extending transversely of the machine. Near its rearward end this arm or lever 329 has a longitudinal slot 332 through which the rearward cross bar or shaft 188 of the restoring bail passes. Obviously upon a downward stroke of the restoring bail the rod 328 will be pulled downwardly by reason of its connection with the arm or lever 329. This downward movement of the rod 328 will cause a swinging of the pawl 327 upward, but under ordinary conditions said pawl will simply press upon the outer surface of said shield without any effect whatever on the carriage set mechanism. At every depression of the restoring bail this pawl moves or slides upon the shield in the manner just stated and upon the return of the restoring bail to normal position the swinging plate 326 and its pawl will be restored to normal position clearly shown in Fig. 37. Inasmuch as the restoring bail has a predetermined length of movement in both directions, that is, up and down, the swinging plate, and particularly its pawl 327, has an arc of movement of a predetermined length, that is, it moves upward to a certain predetermined point; but normally this predetermined point is covered by the shield and is near the upper end or extremity of the shield, or rather the flanged portion 324 thereof. Therefore under normal conditions, this pawl is kept away from its ratchet wheel. When, however, one of the carriage set keys is depressed, say, for example, key 295, which correspond to five spaces, the sliding bar 305 is moved a certain distance determined and permitted by said key and such extent of movement is communicated through the shaft 311 and strip or rod 318 to the shield which is thereby partially rotated or swung such a distance as to expose five ratchet teeth between its upper end and the point which marked the limit of upward movement of the pawl 327, which five teeth had been theretofore covered by such shield. All parts of the carriage set mechanism being now in the relative positions just mentioned, upon a depression of the restoring bail, the swinging plate 326 will be rocked or operated as hereinbefore referred to, but this pawl 327 will soon ride beyond the end of the shield and will catch or drop into the first exposed tooth of the ratchet wheel in the direction of the arrow in Fig. 37, a distance corresponding to five ratchet teeth, inasmuch as five such teeth were exposed between the end of the shield and the extent of the predetermined movement of the pawl 327. The result of the movement of said ratchet wheel is to move the pinion 322 in the same direction, but inasmuch as this pinion is in engagement with the carriage rack such carriage will be carried backward, that is, from the left to the right a distance corresponding to five spaces. The relative position of the shield and ratchet wheel, as well as the pawl 327, when the carriage set key 295 has been depressed as in the above example, is clearly shown in Fig. 40. It is evident that any other one of the row of carriage set keys is operated, as many ratchet teeth (ordinarily concealed) will be exposed as indicated or predetermined by the number or value of the key depressed. The carriage may be set back either from the extreme left hand end of the movement of the carriage or from any fixed or predetermined stop.

When the bar or sliding plate 305 has been moved to the left by any one of the row of carriage set keys, it is desirable to lock it in such shifted position until the depression of the restoring bail and to this end I have shown the following arrangement, which is preferable: As hereinbefore stated, the corners of each of the plates 303 of these keys are provided with a notch 304 adapted to engage or catch underneath the bar or plate 305 when the key is depressed. Ordinarily the parts will remain in this locked position, but for the purpose of unlocking or releasing this bar after it has performed its function in the actuation of the shield as hereinbefore explained, I employ a rod or strip 333 which is fastened to the right hand side of the restoring bail and projects upwardly into proximity to the right hand end of said sliding bar 305. As shown more particularly in Figs. 34 and 35 the upper end of this strip is provided with a pivoted dog 334 which normally rests against the projecting pin 335 on said strip, the dog being spring pressed or not as desired. When the restoring bail is depressed the strip 333 will of course be carried downwardly with it and the dog 334, will, by contact of its under side with the end of the sliding bar 305, be shifted upwardly against spring tension, but on the return stroke of the restoring bail, the beveled outer end of the dog will strike against a similar beveled projection 336 upon the right hand end of the sliding bar, whereby such bar will be shifted a slight distance farther to the left, the distance of shifting being sufficient to permit the key which has been depressed to be released from engagement, the spring 302 with which each of the carriage set keys is provided, returning the key to normal position. Likewise the sliding bar 305 will be restored by means of the spring 313 to its normal position ready for the next operation.

*The reference dials.*—As is well known, division is nothing more than a series of subtractions, while multiplication is a series of additions. Consequently, in multiplying with my machine, the number of times the number is added, that is, repeated, should be registered in some manner, and the same is true as to the number of subtractions in dividing. To register the number of such repetitions of such numbers and to have means of reference thereto, is the object of what will be hereinafter termed the reference dials. As hereinbefore stated in referring to the repeating operations both in adding and subtracting, the repetitions were caused by repeated movements of the restoring bail after the key board had been once manipulated for the desired number. It is to register the number of times that the restoring bail is operated that these reference dials are employed in the present instance, so that the operator need not remember or keep in mind the number of repetitions but simply watch such dials. These reference dials are adapted to subserve another purpose inasmuch as they are capable of indicating to the operator the number of items or amounts in a column. The preferable form of construction and manner of operation to attain these objects will now be described.

As herein shown more particularly in Figs. 44 to 50 the dials are mounted in a case 338 which is supported upon a bracket 339 fastened to the shield 162. This case is mounted so as to slide laterally, in the present instance, toward the right hand side of the machine, upon two shafts 340 and 341 extending parallel and at right angles to said bracket 339. The upper shaft 340 is surrounded by a bushing 342 which is free to rotate in the end plates of the side case, and is also movable longitudinally upon this shaft. The series of dials 343 are loosely mounted upon the bushing 342 and while a series of five of such dials are herein shown a greater or less number thereof may be employed as found desirable, although the five dials will accommodate all ordinary transactions. The bushing 342 has a series of vertically or upwardly extending pins 344 which project inside of the dials, each of which consists substantially of a hub portion 345 and a flanged portion 346 bearing figures from 0 to 9. These pins 344 are adapted to engage pins 347 arranged on the dials at certain predetermined points so that when the bushing is pulled outwardly by means of the knurled knob 348 screwing onto the outer end of the bushing outside of the dial case, and such bushing is rotated, the pins 344 thus brought into the path of the pins 347 will restore all of the dials to normal position, that is, the dials will be cleared. The bushing 342 is normally held pressed to the left by means of a spring 349 at the right hand side of the dial case which spring presses against a collar 350 bearing against a shoulder 351 upon the bushing. The inner end of the bushing is provided with a slot or recess 352 engaging a pin 353 passing through the hub of the case. In normal position, this bushing is thus locked against rotation, but when it is desired to clear the dials the bushing is drawn outwardly by pulling upon the knurled knob, which action will release the bushing from the pin 353 at which time the pins 344 on the bushing will engage the pins 347 on the dials and restore all of them to cipher position.

As stated the dials are provided with hubs 345 loosely mounted on the bushing. On the end of the hub of each dial is secured a ratchet wheel 354, while between each ratchet and the disk is loosely mounted a spring pressed lever 355 extending through a slot in the rear side plate of the dial case and having pivoted thereon a pawl 356 engaging its ratchet wheel. There are as many of these plates or levers projecting through the case as there are dials within and whenever any one of these levers is pressed downward its dial is turned 1. In addition to the ordinary pawl 356 a locking pawl 357 may be provided for each ratchet wheel.

An upper cross shaft 358 is provided in the case, on which shaft is loosely mounted a series of horizontal arms 360, one for each dial except the last dial. Upon the forwardly extending end of each of these arms is pivoted a spring pressed pawl 361 engaging with the ratchet wheel belonging to the dial on its left, the ratchet wheel of each dial being, in the present instance, on the right hand side with respect to the dial. On the edge of the flange of each dial is a small projection 362 adapted to engage the pawl 361 on the right hand side thereof, the object of these pawls and said projections on the edge of the dials being to carry 1 from one dial to its neighboring dial on the left hand side. A series of distance collars 363 is provided between the dials and each collar, except the last one, is provided with a slot 364 to accommodate the pins 344 which are fastened to and project from the bushing and which have a rocking movement on account of the rocking of said bushing. The lower shaft 341 is surrounded by a bushing 365 which has a series of exterior notches on opposite sides, the upper notches being indicated by the reference character 366 and the lower notches by the reference character 367, which notches are arranged staggered with respect to each other, that is, in different but parallel vertical planes. Upon the inner end of the bushing, toward the bracket, is secured a finger lever 368 having at its upper end a finger piece or button so that this bushing 365 may be thereby rocked with respect to its shaft 341. In order to provide for this rocking movement of the bushing with respect to its shaft but prevent longitudinal movement, said bushing has at its outer left hand end an inwardly extending pin 369 adapted to enter a circumferential groove 370 in the shaft. A coiled spring 371 interposed between the finger lever 368 and the bracket 339 serves to restore the bushing to normal position after being rocked by the operation of the finger lever. Upon the left hand end of the dial case and arranged therewithin upon a lateral bracket 372 is pivoted a spring pressed dog 373 adapted to pass through a slot or opening in an outer sleeve 374 and to engage the upper series of notches 366 in the bushing. A similar spring-pressed dog 375 is pivoted in the lower part of the dial case and also passes through said sleeve and is adapted to engage the lower set of notches 367. When the finger lever is depressed, the bushing 365 is rocked so that the lower dog is carried out by the notch to the circumference of the bushing, while the upper dog falls into its notch. Supposing that the dial case has been pulled outwardly to the right upon the shafts against the tension of the spring 376, and assuming also that the finger lever has been depressed as just stated, the whole case will be drawn inward one-half of the distance between two dials, the distance between any two of the said notches representing the distance between the dials or rather the distance between their lever arms 355. Upon the release of the finger lever and its restoration by its spring 371, the case will move another half space, the bushing having been restored to normal position, thereby allowing the case to move the other half space. At this time the lower dog will engage in the next notch to the left. These dogs 373 and 375 constitute a species of escapement inasmuch as when one of them is in engagement with a notch in the bushing the other one is not in engagement with any one of its own notches.

Of course the dial case is provided with a series of dial openings 377 so as to expose a figure on each one of the dials. As hereinbefore stated, any suitable number of dials may be employed dependent upon the character or extent of the work to be done by the machine, although the five dials herein shown will accommodate all ordinary transactions that are apt to arise.

For operating the dials by means of the restoring bail the following construction and connections may be used as efficient for this purpose: A vertical feed hook 378 is arranged at one side of the machine, being suitably guided by the side of the machine frame, and passes through a slot 379 in the shield with its upper or hooked shaped end 380 extraneous of the shield. This hook is adapted to contact and depress any particular operating lever 355 which may be presented to it according to the relation between it and the dial case as determined by the operator. The lower end of this feed hook is provided with a foot 381 adapted to be engaged by one of the side strips of the restoring bail at or near the extreme downward limit of the stroke thereof. Suitable tension mechanism, such as the spring 382, connected thereto, may be employed for restoring the feed hook to normal position.

For the sake of a clear understanding of the manipulation and operation of the machine for both multiplying and dividing, an example of these calculations will be assumed. Taking up first the multiplying calculation, it will be supposed that it is desired to multiply the number 369 by 123.

As hereinbefore stated the process or calculation of multiplication is nothing more than a series of additions which will be readily understood from the following set of figures:

```
         369
         123
         ---
         369
         369
         369
         369
         369
         369
         -----
        45387
or
         369
         369
         369
         369
         369
         369
         -----
        45387
```

From the above it will be noticed that there is either first a repetition of the number 369 three times, and then a repetition of that number twice but placed one column toward the left hand side, while the last 369 is spaced one column still farther to the left or first the number is used a single time, then twice one decimal point to the right and finally three times another decimal point to the right. The addition of these numbers will give the result. The same result is obtained by the manipulation of my machine in the following manner: The number 369 is written on the key-board beginning in the fifth column from the right, the machine having been adjusted for adding, and the reference dial case having been pulled outwardly to the right so that the feed hook will, when moved, engage the third lever 355 on the right. In this operation the machine is not set for repeating inasmuch as the number 369 is to be written but once and consequently the dials will be operated immediately after said number is written and a depression of the restoring bail will cause the feed hook to indicate 1 on the hundreds reference dial. The sliding stops of the calculating mechanism having been restored to normal position and the repeat key set, the number 369 is again written on the keyboard by using the second, third and fourth banks of keys counting from the right hand side, the reference dial case having been moved to the left one space by its escapement mechanism. The number 369 is now repeated, the two movements of the restoring bail indicating 2 on the tenths dial of the reference dials. The sliding stops are again restored to normal position, the reference dial case moved another space to the left, and the number 369 again written on the key-board by using the first, second and third banks of keys. The number 369 is now repeated twice, that is the restoring bail is operated three times and until the reference dial, that is, the units dial thereof, indicates the figure 3. The totalizing dials will now show the number 45,387 which is the result or product and the reference dials will show that the proper multiplier has been used in the operation. The reference dials, as well as the totalizing dials, can be cleared in the manner as hereinbefore explained.

While the arrangement here shown and described is such as to provide for multiplying from left to right, it is obvious that the reverse procedure could be followed, the reference dial casing being then movable against spring tension from right to left and moved step by step in the opposite direction.

Now, assuming that it was desired to divide the number 369 by the number 123 and assuming also that the number 369 already appears on the totalizing dials the number 123 is written on the keyboard and the machine is adjusted for repeating and also for subtracting, inasmuch as division is, as hereinbefore stated, a series of subtractions, and the reference dials are put in position so that the feed hook will be adapted to operate the last dial for instance. The number 123 having been written on the keyboard causing the sliding plates and stops to operate as hereinbefore described, the restoring bail is now operated, thereby causing the reference dials to indicate 1 whereas the totalizing dial will then indicate 246 inasmuch as 123 has just been subtracted from 369. The restoring bail is depressed again thereby subtracting 123 a second time from the totalizing dials and causing the reference dials to indicate 2. The restoring bail is operated a third time, whereby the reference dials will indicate 3 and all of the totalizing dials will show their cipher, thus indicating to the operator that the number 123 has gone into the number 369 an even number of times, the product being 3 as indicated by the reference dials. If, however, there had been a fraction left over, it would be indicated on the totalizing dials; for instance, if the number to be divided had been 469 instead of 369, the totalizing dials would have indicated 100 while the reference dials would have indicated 3, but inasmuch as the operator, observing the totalizing dials and seeing that the latter indicated 100, could readily perceive that the number 123 could not again be taken from the totalizing dials, wherefore he would readily know that the calculation was completed, the 100 representing the fraction. The reference dials thus not only indicate to the operator the number of repetitions of a number made in ordinary adding and subtracting but also indicate the product in the calculation of division, the product of multiplication being indicated on the totalizing dials. Besides the above functions, these dials are also capable of registering the number of numbers in a column.

*The spaced key board.*—It is desirable and convenient to the operator to have the key board spaced off or provided with such spacing arrangement as to permit the operator to readily read the key-board when the calculating mechanism is used for regular figuring or for money, and it is also desirable and convenient to likewise space off the dials or other registering mechanism, and to this end I have provided means whereby when the machine is arranged for general figuring, the banks of keys on the key-board will be divided off into banks of three, corresponding to the series of three figures separated by a comma in the usual general figuring, and I have also devised means for spacing the first two banks of keys on the right for cents and then spacing the higher banks of keys into series of three for indicating the dollars. Substantially the same general arrangement is provided for spacing off the dials.

As herein shown, Figs. 42, 43 and 44, the upper plate 15 of the key-board has a slot 383 between the second and third banks of keys, a slot 384 between the third and fourth banks of keys, a slot 385 between the fifth and sixth banks of keys, a slot 386 between the sixth and seventh banks and a slot 387 between the eighth and ninth banks, said banks being read or numbered from the right to the left. Instead of extending the full length of the key-board plate, two slots are provided between said banks of keys so as not to impair the rigidity of the plate, and furthermore, instead of a slot or slots, holes may be provided. Beneath the said top plate 15 of the key-board is a sliding plate or frame consisting in the present instance, of a series of rearwardly extending strips 388 corresponding in number to the number of lines of slots provided in the key board, that is, five in the present instance. These strips are connected by three cross strips 389 so as to form a framework therewith, the middle strip being extended beyond the right hand side of the key board and provided with suitable means whereby it may be moved by hand such as the handle piece 390 which is within easy reach of the operator. These cross strips 389 are provided with longitudinal slots 391 which receive screws or studs 392 fastened or screwing upwardly in the under side of the top plate of the key board. A limited movement of said frame transverse or crosswise with respect to the key-board, that is from left to right or right to left, is thus provided.

The strips 388 are provided on their upper surface with different colors, one color being the same or substantially the same as the color of the top surface of the key-board plate, so that when such color is exposed through the slots, such slots will be practically undistinguishable and consequently the key board will not be spaced at these particular slots, while the other color is distinguishable from the color of the key board so as to contrast strongly therewith, whereby when this contrasting color is exposed through any of the slots, the key board will be divided off into different series of banks of keys, readily distinguishable to the eye of the operator. For regular figuring the said frame is in such position that the bright contrasting colors of said strips will be exposed or shown at these slots located between every series of three banks of keys, that is, through the slots immediately beyond the third and sixth banks of keys, it being unnecessary to provide a slot beyond the ninth bank of keys. The other color on the strips corresponding to the color of the key board will now be exposed through the slots 383, 385 and 387 which are located beyond the second, fifth and eighth banks of keys. Consequently to the eye of the operator the board will now be divided off into banks of keys arranged in series of three. For money calculation the sliding frame is adjusted or moved so as to bring the contrasting color on said strips between the second and third banks of keys counting from the right hand and between each series of three banks of keys therebeyond, that is, in register with the slots 383, 385, and 387, at which time the other color, which corresponds to the key board color is brought into register with the remaining slots 384 and 386 so that to the eye of the operator the key board is spaced off in the same manner as the decimal point and commas space off figures representing money. It will be understood that when the sliding frame is in one position the key board is spaced off for general figuring and when it is in another position it is spaced off for money calculations, and that it is immaterial whether it is inward or outward position of the sliding frame which represents the general figuring and vice versa with respect to money calculations. In order to hold this sliding frame in adjusted positions and in frictional contact with the key board plate, suitable means may be provided such as the spring washer 393 located between the frame or plate and the head of one of the studs 392.

In order to provide for the spacing off of the dials in the same general manner as the keys of the key board, whereby they may be easily read, the strips 388 are extended and curved upwardly and rearwardly just inside of the shield covering the dials. This shield is cut out at certain intervals corresponding substantially to the lines of slots in the key-board and intermediate of the dial openings through said shield. Consequently such dial has the spacing openings 394, 395, 396 and 397 and 398 located respectively after the second, third, fifth, sixth and eighth dial openings. The ends of the extended strips 388 immediately beneath said spacing openings are colored for a portion of their width with a color corresponding to the color of the shield, while the remaining portion is provided with commas, excepting that particular strip, that is the first strip on the right hand side, which coöperates with the spacing opening between the second and third dials, which strip is provided with a period, that is, a decimal point. For money calculations the said frame under the key board plate will be shifted so that the key board will be spaced off in the manner hereinbefore described so that the first two dials on the right will register cents, a decimal point being exposed through the spacing opening 394 in the shield, and commas being exposed through the openings 396 and 398, that is, beyond every third bank of keys or dials counting from said decimal point. For ordinary figuring, the said sliding frame is shifted as hereinbefore described so that commas will be exposed through the openings 395 and 397, that is, beyond every third dial counting from the right hand side, at which time that portion of the strips which corresponds in color to the color of the shield will be exposed through the spacing openings used for general figuring.

In order to provide room for the shifting of the strips between the carriage set keys, which are different from the other keys because of the bushing in which they work, all as hereinbefore described, said strips are recessed or curved at the point 399 immediately adjacent to said bushing so that a sufficient shift of the strips may be had in one direction or the other. By making obvious changes the same results may be obtained by a frame moving forward and back instead of transversely as in the present instance.

*The margin rack mechanism.*—In order to provide for the movement or jumping of the carriage to a fixed stop, the following mechanism may be adopted, such mechanism herein shown being preferable. The parts about to be described are more particularly illustrated in Figs. 4, 41, 51, 52, 53, 54, 56 and 70 of the drawings and are principally located in immediate association with the carriage and its frame. As shown, a bail 400 extending parallel to the carriage is pivoted to the carriage supporting frame by means of studs 401 entering into said frame. The left hand end of the bail has an extension 402 projecting substantially downward beyond the pivotal point and provided with a laterally extending pin or stud 403 which is on the same center or axis as the center or axis on which the carriage carrying frame oscillates, the purpose of which arrangement will be hereinafter made apparent. A lever 404 is pivoted at 405 on one of the side frames of the machine, in the present instance on the left hand side frame, and extends from the key board rearwardly, terminating immediately below and adjacent to said pin 403. The forward end of such lever is provided with a key 406 for convenience termed the margin key, which, when depressed, raises the rear end of the lever 404 upwardly, by whose contact with said pin the bail 400 is moved rearwardly and downwardly into the position indicated by the dotted lines in Figs. 51 and 52. The object of having this pin 403 on the same axis as the carriage carrying frame is to always insure the same throw of the bail, whether the carriage has been shifted to either upper or lower case position.

A strip or rack 407, which will be hereinafter termed the jumper rack, is suitably mounted on the carriage frame, preferably in such manner as to be readily removable and reversible. In the present instance, both ends of the jumper rack are provided with slots 408 to receive studs 409 and 410 screwing into the carriage frame. The right hand stud 410 has extending through it a spring-pressed pin 411 with its head overlapping and bearing against the left hand end of the jumper rack. This construction provides for the ready insertion or removal or even of the reversal of the jumper rack. Both edges of the jumper rack have a series of holes 412 arranged at predetermined or regular intervals and screw-threaded to receive studs or stop pins 413. A less number of these stop pins than the number of holes is used, these stop pins being adapted to be set or changed by the operator to different positions, that is to different holes in the jumper rack according to the amount of jump required by such operator. Substantially at the center point of the length of the margin rack and extending over the top of the jumper rack, is a substantially U-shaped dog 414 adapted to coöperate with the jumper rack in the manner hereinafter stated.

As clearly shown in Fig. 54, substantially one-half of the forward edge of the margin rack is provided with rack teeth 415 corresponding in spacing to the spaces indicated on the paper scale hereinafter described. To coöperate with these rack teeth an adjustable margin stop is provided, such stop consisting, in the present instance, of a substantially rectangular shell 416 having one end of one side bent inward to form a tooth 417 adapted to engage the rack teeth, and with the opposite end bent laterally to form a stop 418. One end of the other side of the shell is bent inwardly at 419 to bear against the smooth rearward side of the margin rack. In order to normally keep the tooth 417 in engagement with the rack, suitable tension may be provided and such tension, in the present instance, is afforded by a leaf spring 420 adapted to bear against said margin rack and thereby normally keep said tooth in engagement with the rack teeth. By pressing upon the stop and slightly twisting the shell against the tension of the spring, the tooth 417 can be released from engagement and the shell or margin stop adjusted along the margin rack to any predetermined point thereon.

When the margin key is depressed the margin rack is thrown rearwardly and downwardly as hereinbefore described, which action swings the upper free end of the jumper dog 414 into the path of movement of the pins on the jumper rack. Simultaneously, the under side of the bail of margin rack presses against an upwardly extending arm 421 (see Figs. 36 and 41) secured to the end of the shaft 85 which carries the finger 88, as hereinbefore explained, operated by the release bail under the carriage for the purpose of throwing the escapement pawls out of engagement with their ratchet wheel. The said arm 421 is therefore used for the same purpose as the arm 87, this purpose being, as stated, to free the ratchet wheel of its pawls. The escapement wheel being now free from its pawls, the carriage is free to jump or move until the jumper dog on the margin rack contacts the first pin or stud on the jumper rack. By merely shifting the positions of these pins or studs, the amount of jump of the carriage and the particular point at which the carriage is to be stopped can be regulated by the operator. Furthermore, for convenience, where the machine is being employed in certain work requiring two different amounts of carriage jump the jumper rack may have the stop pins adjusted on one edge in a certain manner and the stop pins arranged on the opposite edge in a different manner so that when the operator wishes to adjust his machine for a different amount of carriage jumps, all that will be required is simply to reverse the position of the jumper rack.

As hereinbefore stated the margin stop may be set at any desired position on the margin rack and the carriage will stop when it abuts against the stop 418.

*The paper feed mechanism.*—When the machine is used as a combined typewriter and a calculating machine it is desirable to employ mechanism for automatically feeding the paper, a mechanism herein shown and about to be described being preferably used for this purpose. This mechanism, as shown, comprises a substantially vertical plate 422 suitably mounted and arranged so as to slide vertically in a guide 423 at the rear end of the machine frame. The lower end of this plate has a forwardly projecting extension or arm 424 whose extreme forward end has a slot 425, Fig. 41. This slot is adapted to receive the cross shaft 188 of the restoring bail so that such plate 422 will move vertically at every stroke of the main lever or restoring bail. The upper end of the plate also projects into the form of a hook which is adapted to engage the paper feed bail comprising a rod 427 extending parallel to the platen, underneath the paper table 428 and to the rear of the platen. This rod is supported at its ends in arms or brackets 429 and 430 which are pivoted to the carriage frame. As shown on the left hand end of the platen and mounted upon its shaft is a ratchet wheel 431 by which the platen is to be automatically fed a predetermined number of spaces, as for instance, single space, double space, and so on. This ratchet wheel is of course actuated by the paper feed bail just described, provision being made both for the actuation of such bail by hand and by the main lever or restoring bail of the machine. The operating connection between said paper feed bail and the platen ratchet wheel, as well as the means for adjusting the machine from single spacing to any other spacing embodies novel and advantageous features which will now be described. The left hand bracket 430 of the paper feed bail is U-shaped as to its forward end and pivoted at its extreme forward end upon a stud or screw 432 which is secured in a vertical bracket or standard 433 rising from the carriage. Upon this arm or bracket 430 and intermediate of its length is pivoted a pawl 434, the same being pivoted to its arm by means of a stud 435 screwing into said arm. This pawl may be spring pressed in any suitable way so as to normally engage and coöperate with the platen ratchet. In order to restore the paper feed bail to normal position suitable means may be adapted such as the spring 436 bearing against the curved lower edge of the U-shaped part of the arm or bracket 430. On a stud 437 screwing into the end of the carriage is pivoted a shield 438 which has a portion extending laterally and adapted to cover a portion of the teeth of the platen ratchet wheel. This shield is adapted to be shifted by hand and is held in set position and against accidental displacement by any suitable means, such as the spring pressed pin 439 normally projected into any one of a series of holes 440 located at predetermined intervals on the side of the shield. The paper feed bail and consequently its ratchet 434 has a predetermined arc of movement and the shield coöperates with such pawl to determine the extent of movement of the ratchet wheel by said pawl. In one set position of the shield the pawl is permitted to move the ratchet wheel the extent of only one tooth and in the next set position to move the ratchet wheel the extent of two teeth, and so on, according to the particular position of the shield, which serves to keep the pawl out of engagement with the ratchet wheel up to a certain point and then after the pawl, which has been riding upon the shield, comes to the end of the shield it drops into a tooth on the ratchet wheel and moves such wheel until the pawl comes to the limit of its said predetermined arc of movement. In order to operate this paper feed or line spacing mechanism by hand, the arm or bracket 430 is provided with a projection or shoulder 441 contacted and actuated by a bell crank 442 pivoted upon the extension of the carriage frame and which serves both as the means for feeding the paper and also for shifting the carriage back to normal position on the carriage supporting frame.

*The paper feed guide.*—The paper feed guide mechanism herein shown, Figs. 56 to 60 comprises a series of three shafts 444, 445 and 446, the shaft 445 of which bears at its ends in slots 447, at the ends of the carriage so that such shaft is capable of limited movement therein. This particular shaft is the middle or lowermost shaft and acts as a guide for the other shafts. These other shafts 444, and 446 are provided near their ends with circumferential grooves 448 which receive the pairs of slotted plates or links 449 and 450 which are pivoted upon the lowermost shaft 445. All these shafts are provided with rubber coatings except at intervals where the guides are supported and also where the guide clips or strips hereinafter mentioned are located. The lowermost roller is kept up into contact with the platen by means of a spring 451 bearing on the carriage frame and against said shaft while the other shafts are held in contact with the platen by means of a coiled spring 452 interposed between the shafts and connected to their plates or links, the springs tending to draw said shafts together and consequently in contact with the platen. The guides proper of which any desired number may be used are located at suitable intervals along the platen, consist in the present instance of clips or strips 453 from which are stamped tongues 454 bent or curved so as to form bearings for the said three shafts. The rear end of these guide strips project under the paper table, so that the paper will be properly guided onto the roller, the object of the paper guide being to insure the paper curving around the platen when fed thereto and its being held up against the platen. The other or front end of the guides is brought up as far as possible toward the top of the platen without interfering with the printing. When the paper is inserted it forces the first or rear roller away and the strips accordingly. As soon as the paper is fully inserted all of the strips stand at the same distance from the paper as they formerly did with respect to the platen. The paper table hereinbefore described, consists of a curved plate running the full length of the platen and secured at its ends to the carriage frame in any desired way, as for instance by means of the screws 455.

*The type bar hangers.*—As hereinbefore stated the type bar hangers herein shown are of a novel construction which will now be described. The key mechanism proper has been already described in a general way and the type bar hangers have been referred to, but only in detail. As shown, on the arc 32 is secured a series of type bar hangers which are arranged staggered thereon all as clearly shown in Fig. 64 of the drawings. Each hanger may be described as consisting of the plate 456 secured to the arc by means of bolts or screws 457 or in any other suitable way, and having two substantially parallel marginal flanges 458 which extend a considerable length as compared with the size of the flat plate. These two flanges or arms 458 converge slightly and are arranged on the front face of the arm and radiate toward the printing point. These hangers are arranged in staggered relation with spaces between those of the same row or series so that the sides of the upper row will project over the sides of those in the lower row whereby the thickness of two sides of each hanger will be saved. The typebars and hangers can thus be compactly nested or arranged and yet not interfere with each other in any way. Each hanger accommodates two type bars and to this end, each bar has a suitable pivot in the present instance a pivot 459 pointed or cone shaped at its ends and bearing in conical bearings 460 in the inner sides or walls of the arms 458, provision being made for adjusting these bearings by means of the adjusting nut 461 which contains one of said bearings 460. So as not to interfere one with the other the type bars of each hanger are dodged in their relation as clearly shown in Fig. 65. Some of the type bars are straight while others are curved once or more so as to accommodate the type blocks (containing a plurality of characters) of adjacent type bars all as clearly shown in Fig. 64 of the drawings, the curvature being such as to bring the type blocks in general alinement with their bars.

*The ribbon movement.*—The ribbon movement is of novel construction and operation and as shown (Figs. 4, 5, 6, 53 and 55) comprises two ribbon spools 462 and 463 on which the typewriter ribbon is wound, and also consists in mechanism for automatically reversing the direction of movement of the ribbon when it reaches or nears the end on one spool and causes it to wind thereon and take off from the other spool. These spools are mounted on brackets 464 supported in any suitable way on the end of the arc 32 or in any other suitable way. The spools are similar in construction and a description of one will apply to both. The spool is mounted upon a shaft 465 bearing in said bracket and adapted to be fastened to such shaft by the knurled nut 466. Mounted upon the other end of the shaft is a bevel or mitre gear 467 adapted to mesh with a similar but horizontally arranged bevel gear 468 secured to the upper end of a tubular shaft 469 which carries at its lower end a bevel gear 470. This tubular shaft bears at its upper end in suitable bearings in the bracket 464 and within such tubular shaft is arranged a vertical rod 471 to whose upper end is secured a lever arm 472 whose forward end is bent or extended into the path of movement of the ribbon and is provided with a slot 473 into which the ribbon is received and guided. Any suitable projection or clip, not necessary to be shown, is secured to the ribbon near either end and of such size as to be impossible of passage through said slot or guide 473 which may be termed the reversing guide. The object of the clip or projection is to cause a swinging of this lever 472 and a consequent movement of the rod 471 with the result hereinafter made apparent. The lower end of the rod 471 is preferably conical and as shown bears in the upper cross rail 331 of the machine.

Now referring to the mechanism associated with the left hand spool the vertical rod 471 is provided near its lower end with an arm 474 to which is pivotally connected a horizontal link 475 which is itself pivoted at its other end to the downwardly extending arm of a bell crank whose horizontal arm 476 consists of a locking lever for the driving pinion as hereinafter explained. The horizontal arm of this bell crank is downwardly spring pressed by means of a spring 477 whereby the tendency is to hold the hook shaped end of such locking lever in engagement with the shaft 478 of the driving bevel pinion 479. The gear 470 on the tubular shaft meshes with a similar gear 480 mounted on the shaft 481 which is provided with bearings 482 arranged upon said cross bar.

The other end of this shaft 481 has a bevel gear 483 which is adapted to mesh with said driving pinion 479 accordingly as the reversing mechanism shifts such pinion into engagement therewith.

The mechanism associated with the right hand spool is substantially the same in principle as the mechanism just described, but in this case the shaft 484 is longer than the shaft 481, being provided at its right hand end with a gear 485 meshing with its gear 470 and at its other end with a similar gear 486 which is adapted to coöperate with the driving pinion 479. The vertical rod 471 of this right hand spool is adapted to actuate a link or connection 487 which is connected at one end with the upwardly extending arm 488 of a bell crank whose horizontal arm 489 constitutes a locking lever for the driving shaft 478. This particular locking lever is substantially the same as the other locking lever excepting that it is reversed in position being normally upwardly spring pressed by the spring 490 and with the exception also of the bent or angular construction of the extreme free end to form a shoulder 491 which coöperates with the other locking lever in a manner to be explained. The ribbon movement is adapted to be driven or guided by the tension mechanism belonging to the carriage, and to this end the spring barrel shaft 492 is secured to a pinion 493 and also a ratchet wheel 494. This pinion 493 is one of a train of gears, comprising also an intermediate gear 495 and a lowermost gear 496 secured to one end of the driving shaft 478 hereinbefore referred to. This driving shaft as well as the gear 495 bears in a bracket 497 which is pivoted upon the stud 498 on the bracket 499 which extends forwardly from the rear end frame of the machine as clearly shown in Fig. 6. As shown the ratchet wheel 494 may be provided with a suitable pawl 500.

In the position of the parts shown in Fig. 6 the mechanism is arranged to cause the winding of the ribbon upon the right hand spool and its unwinding from the other spool inasmuch as the driving pinion 479 is now in mesh with the bevel gear 486 and is consequently positively rotating the right hand spool. When, however, the ribbon is almost completely run off from the left hand spool its clip or projection coming into contact with the reversing guide 473 will shift such guide laterally with respect to the plane of the ribbon thereby rocking or partially turning the left hand vertical rod 471 and moving the link 475 to the left. This movement also raises the arm 476 of the bell crank and thereby brings a projection 501 thereon in the path of movement of a pin 502, but inasmuch as the pin or projection 501 is practically immovable with respect to the pin 502 the driving pinion 479 will be shifted just as soon as its pin strikes the projection 501 on said rocking lever or bell crank arm. The spring 490 will now move its locking lever 489 upward thereby allowing a bearing notch therein to straddle shaft and lock it. The driving pinion will now be shifted into mesh with the pinion 483 which is associated with the left hand spool mechanism. Consequently the direction of movement of the ribbon will be reversed and the ribbon will now be wound upon the left hand spool and taken off from the right hand spool. This said movement will continue until the clip or projection near the left hand end of the ribbon has operated its reversing guide and has thereby actuated its bell crank lever by rocking the arm 489 downward and thereby permitting the arm 476 of the other bell crank, which has been resting upon the shoulder 491 of the bell crank arm 489, to assume the position indicated in the drawings. At the same time the projection 502 on the driving pinion will contact the projection 503 on the extreme end of the bell crank arm 489 whereby the driving pinion will be bodily shifted from engagement with the gear 483 into engagement with the pinion 486 so that the parts now assume the position shown in the drawings, in which position the ribbon is being wound upon the right hand spool and unwound or taken off from the left hand spool.

*Ribbon and type guide.*—At the printing point the ribbon passes through a guide which also serves as a guide for the type, as well as constituting a pointer corresponding with a paper scale. The guide proper consists of a flat plate 504 having a slot 505 which is beveled on opposite sides. This guide is adjustably secured upon a vertical strip 506, provided intermediate of its length with pivots 507 bearing against adjustable screws 508 on both sides of a vertical frame or bracket 509 which is mounted or secured to the main bracket 57 which extends underneath the carriage mechanism. At its upper end this vertical bracket is open so as to receive the guide proper and prevent any lateral movement thereof. The lower end of the vertical strip which carries the guide piece is connected to the universal bail by means of a link 510 which has a lateral bifurcation so as to engage the bail and be thereby moved at every movement of such bail occasioned by the operation of any of the writing keys. The motion communicated from this universal bail will obviously cause the vertical strip as well as its guide to be rocked back and forth toward and away from the printing point on the platen roller. The ribbon is held in place with respect to the guide piece in the slot 511 formed in the guide and closed underneath by the spring 512. Normally the guide and its ribbon are removed from immediate proximity to the printing point so that the writing is visible to the operator, but just as soon as any writing key, or in the present instance even a spacing key, is depressed, the guide and ribbon will be thrown forward directly over the printing point and in the path of movement of the type. In case any of the type should be somewhat out of alinement the beveled or inclined sides of the slot in the guide will serve to bring such type in alinement and cause printing at the proper printing point. Consequently this guide also serves the purpose of preserving alinement of the type.

The ribbon guide has a plate 513 which is arranged to slide longitudinally of the guide so that when it is desired to calculate without printing, such slide is adjusted rearwardly to close the slot or opening through the guide. In order to hold this slide in its set or adjusted position means may be employed such as a spring pressed pin 514 arranged in the guide and adapted to be projected into any one of two holes 515. This pin, however, will not prevent positive movement of the slide either one way or the other, but will prevent accidental displacement. The top face of this slide where it would be struck by the type when adjusted rearwardly may be provided with a suitable contact piece 516, such as rubber, copper or other similar substance to receive the impact of the type without damage or injury thereto.

I claim:

1. In calculating mechanism, the combination of a series of registering dials having pinions, a corresponding series of independently operative racks adapted to engage said pinions and normally tending to actuate them through longitudinal movement said racks being also movable axially of the pinions and key mechanism for controlling said racks, substantially as described.

2. In calculating mechanism, the combination of a series of registering dials having pinions, a corresponding series of separate and independently operative racks adapted to engage said pinions and normally tending to actuate them through longitudinal movement, said racks being also movable axially of the pinions and a bank of keys and key mechanism for each of such racks, substantially as described.

3. In a calculating mechanism, the combination of a series of registering dials having pinions, a corresponding series of longitudinally moving racks adapted to engage said pinions and normally tending to actuate them through longitudinal movement, said racks being also movable axially of the pinions and a corresponding series of banks of keys and key mechanisms controlling said racks, one bank of keys being provided for each rack, substantially as described.

4. In calculating mechanism, the combination of registering dials having pinions, longitudinally sliding racks adapted to engage said pinions and normally tending to actuate them through longitudinal movement, said racks being also movable axially of the pinions and corresponding number of banks of keys and key mechanism controlling the extent of movement of the racks, each bank having keys of a value or denomination from 1 to 9 and one of such banks of keys being provided for each dial and rack, substantially as described.

5. In calculating mechanism, the combination of a series of registering dials having pinions, a similar series of sliding racks adapted to engage said pinions and normally locked against tension said racks being movable axially of the pinions for engagement therewith and disengagement therefrom and a corresponding series of banks of keys controlling said racks, each bank having keys of a value from 1 to 9 and one bank being provided for each rack, substantially as described.

6. In calculating mechanism, the combination of registering dials having pinions, independently movable racks adapted to engage said pinions and normally under tension and shiftable into and out of engagement therewith axially thereof, means for normally locking said racks against such tension, and key controlled mechanism for unlocking said locking means, there being a separate tension mechanism for each rack, substantially as described.

7. In calculating mechanism, the combination, with registering dials having pinions, of sliding racks shiftable axially of said pinions into and out of engagement therewith and normally under tension, means for normally locking said racks against tension and means for unlocking said locking means; substantially as described.

8. In calculating mechanism, the combination with registering dials having pinions, of movable racks shiftable axially of said pinions into and out of engagement therewith and normally under tension, means for normally locking said racks against such tension, means for determining the extent of movement of such racks, and mechanism for unlocking said locking means; substantially as described.

9. In calculating mechanism, the combination with a registering dial having a pinion of a longitudinally movable rack normally locked against tension, said rack being also movable axially of the pinion into and out of engagement therewith, a bank of keys, means controlled by said keys to determine the extent of movement of such rack according to the number or value of the particular key operated and means for unlocking the rack when a key is operated; substantially as described.

10. In a calculating mechanism, the combination, with a bank of keys numbered from 1 to 9, of a frame having a series of nine sliding stops, each one controlled by its respective key, a longitudinally movable rack adapted to be stopped by the particular stop operated and dials actuated by said rack and registering the amount of the key operated as determined by the extent of movement of the rack; said rack being movable axially of said dial into and out of engagement therewith, substantially as described.

11. In calculating mechanism, the combination with a bank of keys bearing numbers, of a frame having a series of similar sliding stops, each one controlled by its respective key, a longitudinally movable rack normally locked against tension and the extent of whose movement is determined by the particular stop operated, means for unlocking the rack when a stop is operated and a registering dial actuated by said rack for registering the extent of movement of the rack which corresponds to the value of the operated key the rack being movable axially of the dial into and out of engagement therewith; substantially as described.

12. In a calculating mechanism, the combination with a bank of keys bearing numbers, of a frame having a series of sliding stops, each one controlled by its respective key, a longitudinally movable rack normally locked against tension and the extent of whose movement is determined by the particular stop operated, means controlled by said stop when operated for unlocking the rack, and a registering dial actuated by said rack for registering the extent of movement of the rack which corresponds to the value of the operated key the rack being movable axially of the dial into and out of engagement therewith; substantially as described.

13. In calculating mechanism, the combination with a series of keys bearing numbers, of a corresponding series of sliding plates or stops operated by said keys, a longitudinally movable rack having a projection adapted to strike and be stopped by the particular stop operated, and a registering dial operated by said rack, the latter being movable axially of the dial into and out of engagement therewith; substantially as described.

14. In calculating mechanism, the combination with a series of keys bearing numbers, of a corresponding series of spring pressed sliding plates or stops operated by said keys, a longitudinally movable rack normally under but locked against tension, means controlled by said stops for so locking the rack, and a registering dial operated by said rack, the latter being movable axially of the dial into and out of engagement therewith; substantially as described.

15. In calculating mechanism, the combination with a series of keys bearing numbers, of a corresponding series of sliding stops each having a side projection, a rack normally locked against tension, locking mechanism for said rack, a bail operated by said projection and actuating said locking mechanism, and a registering dial operated by said rack; substantially as described.

16. In calculating mechanism the combination with a series of keys bearing numbers, of a corresponding series of similar sliding stops operated by said keys, a longitudinally movable rack whose extent of movement is determined by the particular stop operated, means for locking said stops in operated position, and a dial coöperating with said rack, the latter being movable axially of the dial into and out of engagement therewith; substantially as described.

17. In calculating mechanism, the combination with a series of keys of different denomination or value having a series of movable rods or wires, of a corresponding series of similar sliding stops separate from the said rods or wires but actuated thereby, a longitudinally movable rack whose movement is determined by the particular stop operated, means for moving the rack and a dial coöperating with said rack, the latter being movable axially of the dial into and out of engagement therewith; substantially as described.

18. In calculating mechanism, the combination, with a series of keys of different denomination or value, of a corresponding series of parallel equidistantly spaced movable stops, a longitudinally movable straight rack having a series of rack teeth and whose movement is determined by the particular stop operated, said stops being spaced a distance equal to the space between the teeth and a dial having a pinion driven by said rack teeth, said rack being movable axially of the dial into and out of engagement therewith; substantially as described.

19. In calculating mechanism, the combination, with a series of keys of different denomination or value and having a series of movable rods or wires, projections on said rods, of a corresponding series of similar equidistantly spaced and movable stops having a portion extended into the path of movement of said projections, a longitudinally movable rack whose movement is stopped by the particular stop operated and a dial coöperating with said rack, the latter being movable axially of the dial into and out of engagement therewith; substantially as described.

20. In calculating mechanism, the combination with a series of keys, of a corresponding series of parallel movable stops operated thereby, a rack movable adjacent to said stops at right angles thereto and whose movement is determined by the particular stop operated and a dial coöperating with said rack, the latter being movable axially of the dial into and out of engagement therewith; substantially as described.

21. In calculating mechanism, the combination with a series of keys of different denomination or value, of a corresponding series of stops operated thereby, and a rack movable adjacent to the stops and having a projection, each stop having a projection adapted to be drawn into the path of movement of the projection on the rack, and a dial coöperating with said rack, the latter being movable axially of the dial into and out of engagement therewith.

22. In calculating mechanism, the combination with a series of keys of different denomination or value and having movable rods or wires, a series of stops spring-pressed in one direction and in parallel planes which are themselves parallel to the said wires, means of engagement between the wires and stops for withdrawing the latter against its spring tension, a longitudinally movable rack whose extent of movement is determined by the particular stop operated and a registering dial coöperating with said rack, the latter being movable axially of the dial into and out of engagement therewith; substantially as described.

23. In calculating mechanism, the combination with a series of keys, of different denomination or value and having movable rods or wires, a series of stops arranged in parallel planes and having an extension projecting in proximity to said wires or rods, a projection on the wires or rods to engage said extensions when the former are operated, a longitudinally movable rack whose extent of movement is determined by the particular stop operated and a registering dial coöperating with said rack, the latter being movable axially of the dial into and out of engagement therewith, substantially as described.

24. In calculating mechanism, the combination, with a series of different values, of movable rods or wires operated thereby and having loops, a series of sliding stops corresponding to said keys and each having an extended portion projecting in the path of movement of the loops, a movable member whose extent of movement is determined by the particular wire and its stop operated, and registering mechanism coöperating with said member; substantially as described.

25. In calculating mechanism, the combination with a series of keys of different values, of movable rods or wires operated thereby, a series of sliding stops corresponding to said keys, means of engagement between said rods or wires and said stops, a longitudinally movable rack having a projection and whose extent of movement is determined by the particular stop operated, and a registering dial coöperating with said rack, the latter being movable axially of the dial into and out of engagement therewith; substantially as described.

26. In calculating mechanism the combination with a series of keys, of movable rods or wires operated thereby, a series of equidistantly spaced sliding stops arranged parallel to each other and corresponding to said keys, a longitudinally movable member having a projection with a path of movement intersecting the path of movement of any one of the stops when operated, and a registering dial coöperating with said rack, the latter being movable axially of the dial into and out of engagement therewith; substantially as described.

27. In calculating mechanism, the combination, with a series of keys of different values, of movable rods or wires operated thereby, a series of sliding stops arranged parallel to each other and corresponding to said keys, a member longitudinally movable in a line at right angles to the lines of movement of said stops and laterally shiftable and provided with a lateral projection, each stop having a projecting portion adapted, when operated, to intersect the path of movement of said projection on the movable member, and registering mechanism coöperating with said member; substantially as described.

28. In calculating mechanism, the combination, with a series of keys of different values, of movable rods or wires operated thereby, a series of sliding stops corresponding to said keys, a longitudinally movable member whose extent of movement is determined by the particular stop operated, means for locking said member in normal position and a connection controlled by the movements of the sliding stops and controlling said locking mechanism, and a registering dial coöperating with said rack, the latter being movable axially of the dial into and out of engagement therewith; substantially as described.

29. In calculating mechanism, the combination, with a series of keys of different values, of movable rods or wires operated thereby, a series of sliding stops actuated by said rods and corresponding in value to said keys, a movable member whose extent of movement is determined by the particular stop operated, mechanism for restoring said member to normal position, registering mechanism coöperating with said member and a bail adjacent to said sliding stops and adapted to engage and hold a stop in operative position, and means controlled by the said restoring mechanism for contacting said bail; substantially as described.

30. In calculating mechanism, the combination, with a series of keys of different values, of movable rods or wires operated thereby, a series of sliding stops actuated by said keys and rods, a registering dial, a longitudinally movable rack whose extent of movement is determined by the particular stop operated and adapted to coöperate with said registering dial, said rack having a longitudinal movement, mechanism for normally restoring said member to normal position and locking mechanism controlled by the movement of the said stops and adapted to normally lock said rack in normal position, said rack being movable axially of the dial into and out of engagement therewith, substantially as described.

31. In calculating mechanism, the combination, with a series of keys of different values, of movable rods or wires operated thereby, a series of stops actuated by said rods or wires, registering mechanism, a longitudinally movable member whose extent of movement is determined by interruption from the stop operated and adapted to coöperate with said registering mechanism, locking mechanism for normally locking said member in normal position, each of said stops having on one side an inclined projection, a bail normally resting against said stops in advance of said inclined projection, and adapted to engage behind said projection when any one of the stops is operated, said bail controlling said locking mechanism, substantially as described.

32. In calculating mechanism, the combination, with a series of keys of different values, of movable rods or wires operated thereby, a series of sliding stops corresponding to said keys and each having on one edge an extended portion and also an inclined projection, a member movable at right angles to said stops having a projection extending toward said stops, the movement of which projection on said member is adapted to be interrupted by the said extended portion of any stop operated, a bail normally spring-pressed against said sliding stops in advance of their projections and adapted to engage behind the projection after any stop is operated for holding it in operated position, locking mechanism for normally holding said member in normal position, mechanism for normally restoring said member and also unlocking said bail and registering mechanism coöperating with said member; substantially as described.

33. In a machine of the character described, the combination with parallel rows of denominational keys; of means located between rows and adjustable to indicate subdivision.

34. In a machine of the character described, the combination with parallel rows of denominational keys; of a strip or strips extending between rows and adjustable to indicate subdivision.

35. In calculating mechanism, the combination of a frame, having a series of slots or ways arranged parallel and transversely therein, a series of stops sliding therein, said stops consisting of flat plates having their forward portion turned at an angle, a series of keys having movable rods or wires, said rods or wires having means of engagement with said forward ends of the stops, respectively, a plate arranged to slide longitudinally in said frame and adapted to be stopped in its movements by the particular stop operated, locking mechanism for normally locking said sliding plate in normal position, and mechanism controlled by the movements of the sliding stops for unlocking said locking mechanism, and registering mechanism coöperating with said sliding plate for indicating and recording the extent of its movement in figures; substantially as described.

36. In calculating mechanism, the combination of a series of keys of different values, of movable rods or wires operated thereby, a frame having a series of parallel sliding stops operating transversely thereof, means on said rods or wires for actuating the said stops when the keys are operated, a plate arranged to slide longitudinally on said frame, tension mechanism connected to said sliding plate tending to draw it in one direction with respect to said frame, locking mechanism for locking said sliding plate in normal position against the stress of its tension mechanism, said sliding plate having a projection adapted to strike against and be stopped by the particular stop operated, and means for releasing said locking mechanism when a stop is operated; substantially as described.

37. In calculating mechanism, the combination of a series of keys of different values, movable rods or wires operated thereby, a frame having a series of transversely arranged and parallel sliding stops controlled in their movements by said keys, a plate arranged to slide on said frame and having a projection adapted to strike against any particular stop and thereby cause a stoppage of the movement of the sliding plate, tension mechanism connected to said sliding plate and adapted to draw it longitudinally in one direction, locking mechanism for normally locking said sliding plate in normal position against the stress of its tension mechanism, a bail pivoted on said frame and normally spring-pressed against said sliding stops and having means coöperating with said locking mechanism for unlocking the latter when one of the sliding stops is operated, and registering mechanism coöperating with said sliding plate and adapted to indicate the extent of movement of said plate as expressed in figures; substantially as described.

38. In calculating mechanism, the combination of key mechanism, a frame having a series of transversely parallel sliding stops operated thereby, a plate arranged to slide in said frame and controlled in its extent of movement by said stops, a locking pawl or dog pivoted on said frame and arranged in the path of movement of said sliding plate, and means controlled by said sliding stops for operating said dog; substantially as described.

39. In calculating mechanism, the combination of a frame having a series of key-controlled sliding stops, a plate arranged to slide longitudinally on said frame and controlled in its extent of movement by said sliding stops, a locking dog pivoted on said frame and normally spring-pressed into the path of movement of the said sliding plate, and means controlled by said sliding stops for operating said dog for the purpose of unlocking said sliding plate; substantially as described.

40. In calculating mechanism, the combination of a frame having a series of key-controlled sliding stops and also having a longitudinal bearing, a sliding plate having a curved portion adapted to be received in said bearing and to slide therein, said sliding plate being controlled as to its extent of movement by said stops, a dog pivoted on said frame and normally positioned across the top of said bearing so as to lock said plate in normal position, and means controlled by said stops for shifting said dog thereby permitting said sliding plate to move with respect to its frame, and tension mechanism adapted to draw the said sliding plate longitudinally; substantially as described.

41. In calculating mechanism, the combination of a frame having a series of key-controlled sliding stops and also having a longitudinal bearing, a plate adapted to slide in said bearing and whose extent of movement is controlled by said stops, tension mechanism for normally thrusting said sliding plate longitudinally with respect to its frame, a spring-pressed dog pivoted on said frame and normally projecting across said bearing so as to lock said plate on to its frame, a bail pivoted on said frame and adapted to be moved by the operation of any one of the sliding stops, and an operating connection between said bail and the dog; substantially as described.

42. In calculating mechanism, the combination of a frame having a series of key-controlled sliding stops, and also having a longitudinal bearing, a member sliding in said bearing and whose extent of movement is controlled by said stops, tension mechanism coöperating with said sliding plate, a dog pivoted to said frame and adapted to lock said plate to its frame against the tension of its spring, a bail pivoted to said frame and normally spring-pressed against said stops, and a pin connected to said bail and adapted to contact said dog and move it out of locking position; substantially as described.

43. In calculating mechanism, the combination of a frame having a series of key-controlled sliding stops and also having a longitudinal bearing, a sliding plate engaging said bearing and whose extent of movement is controlled by said sliding stops, said sliding plate carrying rack teeth, tension mechanism normally tending to draw said plate longitudinally of its frame, a dog mounted on said frame and adapted to lock said sliding plate against its tension mechanism, means controlled by said sliding stops for operating said dog, and a dial having a pinion adapted to be engaged by said rack of the sliding plate and to thereby express in figures the extent of movement of said plate; substantially as described.

44. In calculating mechanism, the combination of a fixed frame having a series of key-controlled sliding stops and also having a longitudinal bearing, a plate arranged to slide therein, and whose extent of movement is controlled by said stops, tension mechanism tending to draw the said plate longitudinally in one direction on said frame, locking mechanism controlled by the movements of said stops for unlocking the said plate, mechanism for restoring said plate to normal position and registering mechanism coöperating with said plate for indicating and expressing in numbers the extent of movement of said plate; substantially as described.

45. In calculating mechanism, the combination of a fixed frame having a series of key-controlled sliding stops and also having a longitudinal bearing, a plate arranged to slide therein and whose extent of movement is controlled by said stops, tension mechanism tending to draw the said plate longitudinally in one direction on said frame, locking mechanism controlled by the movements of said stops for unlocking the said plate, mechanism for restoring said plate to normal position, and registering mechanism coöperating with said plate for indicating and expressing in numbers the extent of movement of said plate, and means for adjusting the extent of the return movement of said sliding plate; substantially as described.

46. In calculating mechanism, the combination of a fixed frame having a series of key-controlled sliding stops, and also having a longitudinal bearing, a plate arranged to slide therein and whose extent of movement is controlled by said stops, tension mechanism tending to draw the said plate longitudinally in one direction on said frame, locking mechanism controlled by the movements of said stops for unlocking the said plate, mechanism for restoring said plate to normal position and registering mechanism coöperating with said plate for indicating and expressing in numbers the extent of movement of said plate, means for adjusting the extent of the return movement of said sliding plate comprising a set screw adapted to be contacted by said sliding plate at the full extent of its return movement; substantially as described.

47. In calculating mechanism, the combination of a frame having a series of key controlled stops and also having a longitudinal bearing, a plate arranged to slide in said bearing and whose extent of movement is determined by said stops, tension mechanism coöperating with said sliding plate, locking mechanism controlled by the movements of said stops for normally locking said sliding plate to its frame against the tension of its spring, said sliding plate having at one end a plate or projection, restoring mechanism consisting of a bail adapted to contact and restore said plate to normal position against the tension of its spring and registering mechanism coöperating with said sliding plate to indicate its extent of movement as expressed in figures; substantially as described.

48. In calculating mechanism, the combination of a frame having a series of key-controlled sliding plates, and also having a longitudinal bearing, a plate having at one edge a bearing shaft fitting in said bearing, means whereby said plate is controlled in its extent of movement by said stops, mechanism for normally locking the plate in normal position with respect to its frame, tension mechanism coöperating with said sliding plate, and registering mechanism also coöperating with said plate; substantially as described.

49. In calculating mechanism, the combination of a series of sliding stops arranged parallel to each other, key mechanism for controlling the operation of said stops, a longitudinally movable member whose extent of longitudinal movement is determined by the particular stop operated and provided with a series of rack teeth, registering mechanism provided with a pinion for operating the same and adapted to be engaged by said rack teeth, the distance between said series of stops corresponding to the distance between the rack teeth, and the member having the latter being movable axially of said pinion to carry the rack teeth into and out of engagement therewith; substantially as described.

50. In calculating mechanism, the combination of a series of keys of different values, a series of sliding stops arranged parallel to each other and corresponding to said keys, a frame in which said stops are arranged to slide, a laterally shiftable plate arranged to move longitudinally on said frame and provided with rack teeth, and a registering dial having a pinion adapted to be engaged by said rack teeth, the distance between said slides being equal to the distance between the rack teeth.

51. In calculating mechanism, the combination, with a frame having a longitudinal bearing 110 and also having a series of transverse slots, a series of sliding plates movable in said slots and provided on one edge with an inclined projection 149 and with an extension 159, tension mechanism coöperating with said stops, key mechanism for operating said stops, a bail 141, pivoted on said frame and normally spring-pressed against said sliding stops and adapted to engage behind the projection 149 when a stop is operated, a locking dog 150 pivoted on said frame and normally projected across the top of the socket 110, a sliding plate arranged to move longitudinally in said socket 110 and to be normally locked in normal position by the dog 150, a pin arranged on the bail 141 and adapted when moved by a stop to actuate the dog 150 and thereby release said sliding plate when a stop is operated, and registering mechanism coöperating with said sliding plate for indicating the extent of movement of such plate as expressed in figures; substantially as described.

52. In calculating mechanism, the combination, with keys and a registering pinion, of a longitudinally movable rack controlled by the operation of the keys and also shiftable axially of said pinion and means for so shifting said rack into and out of engagement with said registering pinion, the latter and rack being engaged during movement of the rack in one direction and disengaged during movement of the rack in the opposite direction; substantially as described.

53. In calculating mechanism, the combination, with keys and a registering pinion, of a longitudinally movable rack controlled by the operation of the keys and also shiftable axially of said pinion, a shift bar in coöperating position with respect to said rack, and means for so shifting said bar to move the rack into or out of engagement with said registering pinion, the latter and rack being engaged during movement of the rack in one direction and disengaged during movement of the rack in the opposite direction; substantially as described.

54. In calculating mechanism, the combination, with keys and a registering pinion; of a longitudinally movable rack whose extent of movement is controlled by the particular key operated, said rack being movable axially of the pinion, means for restoring said rack to normal position, and mechanism controlled by said restoring means for shifting said rack into and out of engagement with said registering pinions; substantially as described.

55. In calculating mechanism, the combination, with keys and registering mechanism, of a member coöperating with said registering mechanism and adapted to slide in the plane of said registering mechanism and to swing axially out of such plane, the extent of such sliding movement being controlled by the particular key operated, and means for swinging said member into and out of coöperative relation with the registering mechanism; substantially as described.

56. In calculating mechanism, the combination, with keys and registering mechanism, of a laterally shiftable sliding plate, a rack on such plate adapted to coöperate with the registering mechanism, and means for shifting said plate axially into and out of the plane of the registering mechanism; substantially as described.

57. In calculating mechanism, the combination, with keys and a dial having a pinion, of a laterally and longitudinally movable rack adapted to engage said pinion and to actuate it and its dial to an amount determined by its extent of movement, said rack being arranged to move its pinion upon the operation of one of the keys, means operated by the keys to limit said extent of movement and means for shifting said rack axially into and out of the plane of the dial pinion; substantially as described.

58. In calculating mechanism, the combination, with keys and a dial having a pinion, of a laterally and longitudinally movable rack adapted to engage and actuate said pinion and governed by the keys, said rack being arranged to move its pinion upon the operation of one of the keys, and means for shifting said rack axially into and out of the plane of the dial pinion, the latter and rack being engaged during movement of the rack in one direction and disengaged during movement of the rack in the opposite direction; substantially as described.

59. In calculating mechanism, the combination, with keys and a dial having a pinion, of a laterally and longitudinally movable rack adapted to engage and actuate said pinion and governed by the keys, and a shifting bar or guide coöperating with said rack to move it axially into and out of the plane of said pinion, and means for so shifting such bar or guide, the rack and pinion being engaged during movement of the rack in one direction and disengaged during movement of the rack in the opposite direction; substantially as described.

60. In calculating mechanism, the combination, with keys and a dial having a pinion, of a rack having a sliding movement in the plane of said pinion and a swinging movement in another plane whereby it may be shifted into and out of engagement with its dial pinion, key controlled mechanism for determining the extent of movement of the rack, and means for swinging the rack into or out of engagement with the pinion; substantially as described.

61. In calculating mechanism, the combination, with keys and a dial having a pinion, of a rack having a sliding movement in the plane of said pinion and a swinging movement in another plane whereby it may be shifted into and out of engagement with its dial pinion, key controlled mechanism for determining the extent of movement of the rack, a bar or guide having an opening to receive the rack for shifting said guide and the rack; substantially as described.

62. In calculating mechanism, the combination, with keys and a dial, of a movable plate coöperating with said dial, key-controlled mechanism for determining the extent of movement of such plate, a guide having a recess with a narrow side opening receiving said plate and means for shifting said guide; substantially as described.

63. In calculating mechanism, the combination, with keys and a dial, of a movable plate coöperating with said dial, key-controlled mechanism for determining the extent of movement of such plate, a guide having a substantially circular recess with a narrow side opening to receive said plate and means for shifting said guide; substantially as described.

64. In calculating mechanism, the combination, with keys and a dial having a pinion, of a movable rack having teeth adapted to engage said pinion, key-controlled mechanism determining the extent of movement of the rack and consequently the amount of turning of the dial, mechanism for restoring the rack to normal position, a guide movable at right angles to and adapted to shift said rack into and out of engagement with the pinion, and means actuated by said restoring mechanism to shift said guide; substantially as described.

65. In calculating mechanism, the combination, with keys and a dial having a pinion, of a tension actuated rack having teeth to engage said pinion, and shiftable axially thereof, locking mechanism for holding said rack in normal position against its tension, key-controlled mechanism determining the extent of movement of the rack and actuating said locking mechanism, and means for making and breaking engagement between the rack and pinion; substantially as described.

66. In calculating mechanism, the combination, with keys and a dial having a pinion, of a tension actuated rack having teeth to engage said pinion and shiftable axially thereof, locking mechanism for holding said rack in normal position against its tension, key-controlled mechanism determining the extent of movement of the rack and actuating said locking mechanism, a plate or guide to coöperate with said rack to cause engagement and disengagement between the rack and pinion, and means for operating said plate or guide; substantially as described.

67. In calculating mechanism, the combination of a series of keys, a longitudinally movable plate controlled by the operation of the keys, and a rack mounted on the said plate with provisions for lateral movement, and registering mechanism coöperating with said rack for indicating the extent of longitudinal movement thereof as expressed in figures; substantially as described.

68. In calculating mechanism, the combination of a series of keys, a laterally shiftable sliding plate controlled by the operation of the keys, and a rack mounted on said plate, a frame on which the latter is mounted, tension mechanism coöperating with said sliding plate, locking mechanism for normally locking said plate and rack in normal position against the stress of said tension mechanism, and registering mechanism adapted to indicate the extent of movement of said rack as expressed in figures; substantially as described.

69. In calculating mechanism, the combination of a series of keys, a frame having a series of sliding stops controlled by said keys and also having a longitudinal bearing, a sliding plate engaging said bearing and whose extent of movement is controlled by said stops, locking mechanism for holding said sliding plate in normal position, tension mechanism coöperating with said sliding plate, means controlled by said stops for unlocking said locking mechanism, a rack mounted upon said sliding plate, and having a series of rack teeth and a dial having a pinion engaged by said rack teeth; substantially as described.

70. In calculating mechanism, the combination of a frame having a series of key-controlled sliding stops, and also having a longitudinal bearing, a plate engaging said bearing and capable of both a longitudinal movement and a transverse movement on its frame, means controlled by said stops for determining the extent of longitudinal movement of said plate, registering mechanism coöperating with said sliding plate and means for moving or swinging said plate transversely of its axis for engagement or disengagement with the registering mechanism, substantially as described.

71. In calculating mechanism, the combination of a frame having a longitudinal bearing, a plate having one edge or end engaging said bearing and adapted to move longitudinally of its frame and also to swing thereon, a rack mounted in said sliding plate and having rack teeth, key-controlled mechanism for determining the extent of longitudinal movement of said plate, tension mechanism coöperating with said plate, a dial having a pinion adapted to be engaged by said rack teeth, locking mechanism for said plate comprising a locking dog pivoted on the frame, and normally spring-pressed across the socket or bearing and locking said plate against its tension, and means for unlocking said dog when a key is operated; substantially as described.

72. In calculating mechanism, the combination of a frame having a longitudinal bearing, a plate adapted to slide in said bearing, key-controlled mechanism for determining the extent of movement of said plate, tension mechanism coöperating with said plate, mechanism for normally locking said plate upon its frame, a rack mounted upon said plate and provided with rack teeth and a dial and a pinion thereon adapted to be engaged by said rack teeth, both the rack and plate being provided with laterally extending feet; substantially as described.

73. In calculating mechanism, the combination of a frame having a series of key-controlled sliding stops of different values from 1 to 9, said frame also having a longitudinal bearing, a sliding plate engaging said bearing, tension mechanism coöperating with said plate, a rack mounted on said plate and having nine or a greater number of teeth, a dial having a pinion engaged by said rack teeth, means controlled by said stops for determining the amount of movement of said plate and rack, means for locking said plate in normal position, and means controlled by the movements of said stops for unlocking said mechanism; substantially as described.

74. In calculating mechanism, the combination of a movable plate, means for operating said plate, and a second plate coöperating with the first plate but having a movement independent thereof in both directions from normal, and registering mechanism coöperating with said second plate; substantially as described.

75. In calculating mechanism, the combination of a movable plate, means for operating said plate and a second plate connected to but movable longitudinally on said first plate in both directions from normal, and registering mechanism coöperating with said second plate; substantially as described.

76. In calculating mechanism, the combination of a movable plate, means for operating said plate and a second plate connected to but movable longitudinally on said first plate to a position on either side of a normal position, and registering mechanism coöperating with said second plate; substantially as described.

77. In calculating mechanism, the combination of a movable plate, key-controlled mechanism for determining the extent of movement of such plate according to the value of the key operated, a second plate mounted on said plate and having a movement independent thereof in both directions from normal, and registering mechanism coöperating with said second plate, substantially as described.

78. In calculating mechanism, the combination of a movable plate, key-controlled mechanism for determining the extent of movement of such plate according to the value of the key operated and a second plate mounted on said first plate and partaking of its sliding movement, said second plate having a sliding movement independent of said sliding plate in both directions from normal and registering mechanism coöperating with said second plate; substantially as described.

79. In calculating mechanism, the combination of a movable plate, key-controlled mechanism for determining the extent of movement of such plate according to the value of the key operated, a second plate mounted on said sliding plate and having a movement independent thereof in both directions from normal, means for normally locking said plates together, and registering mechanism coöperating with said second plate; substantially as described.

80. In calculating mechanism, the combination of a movable plate, key-controlled mechanism for determining the extent of movement of such plate according to the value of the key operated, a second plate mounted on said sliding plate and having a movement independent thereof in both directions from normal, and a catch mounted on one of said plates and adapted to engage the other plate, whereby such plates are normally held together, and registering mechanism coöperating with said plates; substantially as described.

81. In calculating mechanism, the combination of a movable plate, key-controlled mechanism for determining the extent of movement of such plate according to the value of the key operated, a second plate mounted on said sliding plate and having a movement independent thereof in both directions from normal, tension mechanism tending to cause said second plate to move upon said sliding plate and a lock adapted to hold said second plate in normal position on said sliding plate and against the stress of such tension mechanism, and registering mechanism coöperating with said second plate; substantially as described.

82. In calculating mechanism, the combination of a movable plate, key-controlled mechanism for determining the extent of movement of such plate according to the value of the key operated, a second plate arranged to slide on said sliding plate, means for normally locking said plates together, means whereby said second plate may be moved either in one direction or the other when the lock is unlocked, and registering mechanism coöperating with said second plate; substantially as described.

83. In calculating mechanism, the combination of a movable plate, key-controlled mechanism for determining the extent of movement of such plate according to the value of the key operated, a second plate arranged to slide on said sliding plate and having an independent sliding movement, means for normally locking said plates in normal position, tension mechanism adapted to exert its stress in one direction or the other on said second plate and registering mechanism coöperating with the latter; substantially as described.

84. In calculating mechanism, the combination of a movable plate, key-controlled mechanism for determining the extent of movement of such plate according to the value of the key operated, a second plate arranged to slide on said sliding plate and having an independent sliding movement thereon, tension mechanism coöperating with said second plate, means whereby the stress of such tension mechanism may be adjusted or shifted from one direction to another to cause the plate to move in one direction or the other, locking mechanism holding said plates together against the stress of said tension mechanism, and registering mechanism coöperating with the second plate; substantially as described.

85. In calculating mechanism, the combination of a movable plate, key-controlled mechanism for determining the extent of movement of such plate according to the value of the key operated, a second plate arranged to slide on the sliding plate and having an independent sliding movement thereon in both directions from normal and also provided with a notch, a lock pivoted upon the sliding plate and adapted to engage in said notch to lock the second plate against its independent movement, tension means coöperating with the second plate and registering mechanism also coöperating therewith; substantially as described.

86. In calculating mechanism, the combination of a movable plate, key-controlled mechanism for determining the extent of movement of such plate according to the value of the key operated, a second plate arranged to slide on a sliding plate in both directions from normal and provided with longitudinal slots, studs for holding said rack and plate in slidable condition, means for normally locking said plates together in normal position, tension mechanism coöperating with the second plate, and registering mechanism also coöperating therewith; substantially as described.

87. In calculating mechanism, the combination of a movable plate, key-controlled mechanism for determining the extent of movement of such plate according to the value of the key operated, a second plate arranged to slide longitudinally on said plate and having longitudinal slots, studs in such slots for holding the plates in slidable relation to each other, locking mechanism for normally locking said plates in normal position with the said studs occupying a central position in said slots, tension mechanism coöperating with said second plate and adapted to be adjusted to exert its stress either in one direction or the other with respect to the plate whereby when the latter is unlocked it will have an independent movement in one direction or the other according to the direction of stress of the tension mechanism, and the registering mechanism coöperating with the second plate; substantially as described.

88. In calculating mechanism, the combination of a movable plate, key-controlled mechanism for determining the extent of movement of such plate according to the value of the key operated, a second plate arranged to slide on the said sliding plate and having an independent movement thereon, means for normally locking said plates together, tension mechanism coöperating with said second plate and comprising a swinging arm pivoted on the sliding plate, a spring whose one end is anchored in said arm, and whose other end coöperates with the second plate, means for holding said arm in different adjusted positions and registering mechanism coöperating with the second plate; substantially as described.

89. In calculating mechanism, the combination of a movable plate, key-controlled mechanism for determining the extent of movement of such plate according to the value of the key operated, a second plate arranged to slide on said sliding plate and having a movement independent thereof, and means for locking said plates and in normal position, tension mechanism coöperating with said second plate and comprising an arm pivoted on said sliding plate, a spring, one of whose ends is anchored in said arm and whose other end is anchored or connected to the second plate and locking dogs pivoted on said arm and adapted to engage the sliding plate, and registering mechanism coöperating with the second plate; substantially as described.

90. In calculating mechanism, the combination of a movable plate, key-controlled mechanism for determining the extent of movement of such plate according to the value of the key operated, a second plate arranged to slide on the sliding plate and having a movement independent thereof, means for locking the second plate in the center of its said independent movement, tension mechanism adapted to exert its stress in either one direction or the other on said plate according to adjustment and comprising an arm pivoted on the sliding plate, a spring, one of whose ends is anchored in the arm and whose other end coöperates with the rack, spring-pressed locking dogs pivoted on said arm, said sliding plate having two notches, one for each dog, into which said dogs engage and hold said arm when adjusted, and registering mechanism coöperating with the rack; substantially as described.

91. In calculating mechanism, the combination of a movable plate, key-controlled mechanism for determining the extent of movement of such plate according to the value of the key operated, a second plate arranged to slide on said sliding plate and having a movement independent thereof, said second plate having longitudinal slots and also having a notch on one edge, studs passing through said slots and secured to the sliding plate for holding said parts in slidable relation to each other, a spring-pressed locking dog adapted to engage in said notch when said studs occupy the central portion of the slots, tension mechanism adapted to be adjusted to exert tension upon the second plate in one direction or the other, and registering mechanism coöperating with said second plate; substantially as described.

92. In calculating mechanism, the combination of a movable plate, key-controlled mechanism for determining the extent of movement of such plate according to the value of the key operated, a second plate arranged to slide on the sliding plate, and having an independent movement thereon, means for normally locking the second plate to the sliding plate and holding the second plate against its independent movement adjustable tension mechanism adapted to be adjusted to exert its tension in one direction or the other upon the plate, means controlled by the operator for adjusting said tension mechanism, and registering mechanism coöperating with the second plate; substantially as described.

93. In calculating mechanism, the combination of a movable plate, key-controlled mechanism for determining the movement of such plate according to the value of the key operated, a second plate arranged to slide on such sliding plate and having an independent movement thereon and also having a series of rack teeth, a pinion provided with a dial coöperating with said rack teeth, said rack having longitudinal slots, studs entering said slots and secured to the sliding plate, said studs having a movement in said slots equal to the distance between two rack teeth, means for normally locking said plates together with the studs occupying the center of said slots, and tension mechanism coöperating with said rack plate and adjustable as to direction of thrust; substantially as described.

94. In calculating mechanism, the combination of a series of sliding plates and a corresponding series of dials, each plate having slidably arranged thereon a rack having a limited independent movement in both directions from normal and coöperating with said dials, means for normally locking each rack and its plate together against independent movement, tension mechanism coöperating with each rack to give it its independent movement, and means communicating between the adjacent members of said series for unlocking said mechanism when the dial on the right hand side requires or carries 1, whereby the rack will have its independent movement; substantially as described.

95. In calculating mechanism, the combination, with a series of dials, a corresponding series of sliding plates, a series of sliding racks coöperating with the dials and having an independent movement in both directions from normal on their sliding plates, means for normally holding said racks in normal position against said independent movement, tension mechanism coöperating with said racks and adapted to give them their independent movement when the latter is unlocked, and means operated by one dial for unlocking the locking mechanism of the rack corresponding to the dial on the left hand side; substantially as described.

96. In calculating mechanism, the combination of a series of dials, a corresponding series of sliding plates, a series of sliding racks coöperating with the dials and having an independent movement in both directions from normal on their sliding plates, means for normally holding said racks in normal position against said independent movement, tension mechanism coöperating with said racks and adapted to give them their independent movement when the latter is unlocked, and means operated by one dial for unlocking the locking mechanism of the rack corresponding to the dial on its left hand side, said means comprising bails normally arranged adjacent to said locking mechanism and each having an end extended into proximity to the dial on the right hand side of the dial with which its locking mechanism is associated, and means on the dials for actuating said bails and thereby causing an unlocking of said locking mechanism; substantially as described.

97. In calculating mechanism, the combination of a series of dials, a corresponding series of sliding plates, a series of sliding racks coöperating with the dials and having an independent movement in both directions from normal on their sliding plates, means for holding said racks in normal position against said independent movement, tension mechanism coöperating with said racks and adapted to give them their independent movement when unlocked, and means operated by one dial for unlocking the locking mechanism of the rack corresponding to the dial on the left hand side, said means comprising bails arranged in proximity to said locking mechanism, each bail having an end extended into proximity to the dial on the right hand of that dial with which it is more directly associated, and projections on said dials adapted to contact and move said bails and bring them into engagement with said locking mechanism and thereby unlock the racks; substantially as described.

98. In calculating mechanism, the combination of a series of dials, a corresponding series of sliding plates, a series of sliding racks coöperating with the dials and having an independent movement on their sliding plates, means for normally holding said racks in normal position against said independent movement, tension mechanism coöperating with said racks and adapted to give them their independent movement when the latter is unlocked, and means operated by one dial for unlocking the locking mechanism of the rack corresponding to the dial on the left hand side, said means comprising a series of bails coöperating with said locking mechanism, and spring-pressed toward said mechanisms, means for normally holding said bails against their tension, and means on said dials for releasing said bail holding means, substantially as described.

99. In calculating mechanism, the combination of a series of dials, a corresponding series of sliding plates, a series of sliding racks coöperating with the dials and having an independent movement on their sliding plates, means for normally holding said racks in normal position against said independent movement, tension mechanism coöperating with said racks and adapted to give them their independent movement when the latter is unlocked, and means operated by one dial for unlocking the locking mechanism of the rack corresponding to the dial on the left hand side, said means comprising a series of bails coöperating with said locking mechanisms and normally spring-pressed in the direction of said mechanisms to unlock the latter, mechanism for normally holding said bails against their spring tension, and projections adapted to operate said holding mechanism after the dials indicate ciphers; substantially as described.

100. In calculating mechanism, the combination of a series of dials, a corresponding series of sliding plates, a series of sliding racks coöperating with the dials and having an independent movement on their sliding plates, means for normally holding said racks in normal position against said independent movement, tension mechanism coöperating with said racks and adapted to give them their independent movement when the latter is unlocked, and means operated by one dial for unlocking the locking mechanism of the rack corresponding to the dial on the left hand side, said means comprising a series of bails, coöperating with said locking mechanisms and normally spring-pressed toward the same to unlock the latter, mechanism for normally holding said bails against their tension, and projections on said dials for actuating said holding mechanism, each bail being controlled and actuated by the dial to the left of the one with which it is more directly associated and whose locking mechanism it governs; substantially as described.

101. In calculating mechanism, the combination with a series of keys and dials, of intermediately arranged mechanism for transferring the value of the keys to or subtracting the same from the dials by movement thereof in one direction or the other comprising a series of key-operated stop-plates and racks at right-angles thereto and coöperating with the dials, and means for repeating any number indicated on the keys under a single manipulation of such keys; substantially as described.

102. In calculating mechanism, the combination, with a series of keys and dials, of intermediately arranged mechanism adapted to transfer the value of the keys to or subtract the same from the dials, said mechanism set to a certain position by the particular key operated and comprising longitudinally movable bars and a series of stop plates, means for restoring the said means after actuation of the dials and mechanism for locking said restoring means for repeating purposes; substantially as described.

103. In calculating mechanism, the combination, with a series of keys and dials, of sliding members movable longitudinally and adapted to actuate said dials in one direction for addition and the opposite direction for subtraction, stop mechanism actuated by the keys and controlling the extent of movement of said members, means for restoring said stop mechanism to normal position after actuation of the dials, and means for preventing the operation of said restoring means whereby the number indicated by the operated keys may be repeated without further operation of such keys; substantially as described.

104. In calculating mechanism, the combination, with a series of keys and registering devices, of longitudinally sliding members adapted to coöperate with said devices, a series of stops located adjacent to each sliding member and actuated by the keys to a position in the path of the member, a lock to hold a stop in operated position, a second lock to hold the members in normal position, a restoring device normally adapted to operate the locks and restore said members, and means for preventing the unlocking of the first named lock when it is desired to repeat numbers; substantially as described.

105. In calculating mechanism, the combination, with a series of keys and registering devices, of movable members adapted to coöperate with said devices, a series of stops located adjacent to each sliding member and actuated by the keys to a position in the path of the members, a lock to hold any operated stop in operated position, a second lock normally operated by the first named lock and adapted to prevent movement of said members, means for disabling said first named lock to release the stop, means for preventing the operation of said disabling means, and means of disabling the first lock and for unlocking the second lock independently of the first lock; in repeating an operation with the same stops set; substantially as described.

106. In calculating mechanism, the combination, with a series of keys and registering mechanism, of stops controlled by said keys, movable members controlled by said stops as to extent of movement corresponding to the value of the key operated, means for locking said movable members in normal position, means for locking said stops in operated position, and simultaneously releasing the said movable members, means for displacing said stop locking means, and means for repeating by disabling said displacing means and also said means for locking the movable members; substantially as described.

107. In calculating mechanism, the combination with a series of keys and registering devices, of members adapted to coöperate with said registering devices, means for locking said members in normal position, mechanism actuated by the keys and controlling the extent of movement of the said members, locking means for said mechanism to sustain it in operated condition, means for repeating by preventing the unlocking of said last named locking means and by unlocking the other locking means; substantially as described.

108. In calculating mechanism, the combination, with a series of keys and dials, of a plurality of racks actuating said dials according to the permitted extent of movement of the rods, a series of stops operated by the keys for limiting the extent of movement of said racks, tension mechanism for operating the racks, a lock normally holding said racks against the stress of their tension mechanism, a series of bails, one for each rack, controlled by the movements of said stops and controlling said locks, and means for rendering said lock inactive when it is desired to repeat any number written on the key-board; substantially as described.

109. In calculating mechanism, the combination, with a series of keys and dials, of a plurality of racks adapted to actuate said dials according to the permitted extent of movement of the racks, a series of stops operated by the keys for limiting the extent of movement of said racks, bails for holding said stops in operated position, a lock for normally holding said racks in normal position and actuated by said bails, mechanism for restoring the operated racks to normal position and also for actuating said bails, and means for preventing said actuation of the bails in the repeating operation; substantially as described.

110. In calculating mechanism, the combination, with a series of keys and dials, of a plurality of racks adapted to actuate said dials according to the permitted extent of movement of the racks, a series of stops operated by the keys for limiting the extent of movement of said racks, bails for holding said stops in operated position, locks for normally holding said racks in normal position and actuated by said bails, mechanism for restoring the operated racks to normal position, a rock shaft normally operated by said restoring mechanism and controlling said bails, and means for preventing said actuation of the rock shaft in the repeating operation; substantially as described.

111. In calculating mechanism, the combination, with a series of keys and dials, of a plurality of racks adapted to actuate said dials according to the permitted extent of movement of the racks, a series of stops operated by the keys for limiting the extent of movement of said racks, bails for holding said stops in operated position, locks for normally holding said racks in normal position and actuated by said bails, mechanism for restoring the operated racks to normal position, a rock shaft normally operated by said restoring mechanism and having a series of projections adapted, when rocked, to operate said bails, and means for preventing said operation of the bails substantially as described.

112. In calculating mechanism, the combination of a key-controlled movable member, registering mechanism actuated by the movements of said member, locking mechanism normally locking said member in normal position, a shaft or rod adapted to be moved longitudinally and having means thereon when so moved for coöperating with said locking mechanism and rendering it inoperative; substantially as described.

113. In calculating mechanism, the combination of a key-controlled movable member, registering mechanism coöperating with said member, locking mechanism for normally holding said member in normal position, a rock shaft normally adapted to unlock said mechanism, and means whereby said shaft may be moved longitudinally and the said locking mechanism rendered inoperative; substantially as described.

114. In calculating mechanism, the combination, with series of keys, of a movable member controlled by said keys, registering mechanism coöperating with said member, locking mechanism for normally holding said member in normal position, a longitudinally movable shaft or rod having means for engaging said locking mechanism and rendering it inoperative when moved or shifted, and means for holding said rod or shaft in shifted position; substantially as described.

115. In calculating mechanism, the combination, with a series of keys, of a movable member controlled by said keys, registering mechanism coöperating with said movable member, locking mechanism for normally holding said member in normal position, a shaft having means for normally unlocking said locking mechanism, means whereby said shaft may be moved or shifted longitudinally, and means for preventing rocking of the shaft when so shifted; substantially as described.

116. In calculating mechanism, the combination, with a series of keys, of a movable member controlled by said keys, registering mechanism coöperating with said movable member, locking mechanism for normally holding said member in normal position, a shaft having means for normally unlocking said locking mechanism and adapted to be moved or shifted longitudinally, a projection on said shaft arranged to coöperate with said locking mechanism and render it inoperative when such shaft is shifted; substantially as described.

117. In calculating mechanism, the combination, with a series of keys, of a movable member controlled by said keys, registering mechanism coöperating with said movable member, locking mechanism for normally holding said member in normal position, a shaft having means for normally unlocking said locking mechanism and adapted to be moved or shifted longitudinally, a projection on said shaft arranged to coöperate with said locking mechanism and render it inoperative when such shaft is shifted, and a catch device adapted to engage and retain the said shaft in shifted position; substantially as described.

118. In calculating mechanism, the combination, with a series of keys, of a movable member controlled by said keys, registering mechanism coöperating with said movable member, locking mechanism for normally holding said member in normal position, a rock shaft having means for normally unlocking said locking mechanism, means whereby said shaft may be moved or shifted longitudinally, means on such shaft to coöperate with said locking mechanism for rendering it inoperative when the shaft is shifted, restoring mechanism for restoring said movable member to normal position, and a connection between said shaft and said restoring mechanism, substantially as described.

119. In calculating mechanism, the combination, with a series of keys, of a movable member coöperating with said keys, locking mechanism for normally holding said member in normal position, a rock shaft having means for normally unlocking said locking mechanism, means whereby said shaft may be moved or shifted longitudinally, means on such shaft to coöperate with said locking mechanism for rendering it inoperative when the shaft is shifted, restoring mechanism for restoring the movable member to normal position, and a connection between said shaft and the said restoring mechanism, adapted to engage and rock said shaft when the latter is in normal position but adapted to be rendered inoperative when said shaft is shifted; substantially as described.

120. In calculating mechanism, the combination, with a series of keys, of a movable member controlled by said keys, registering mechanism coöperating with said movable member, locking mechanism for normally holding said member in normal position, a rock shaft having means for normally unlocking said locking mechanism, means whereby said shaft may be moved or shifted longitudinally, means on such shaft to coöperate with said locking mechanism for rendering it inoperative when the shaft is shifted, restoring mechanism for restoring the said member to normal position and connection between said restoring member and said shaft consisting of a sleeve or bushing around the shaft, means of normal engagement between said bushing and shaft, an arm connected to said bushing and a link connecting said arm with the restoring mechanism; substantially as described.

121. In calculating mechanism, the combination, with a series of keys, of a movable member controlled by said keys, registering mechanism coöperating with said movable member, locking mechanism for normally holding said member in normal position, a rock shaft means for normally unlocking said locking mechanism, means whereby said shaft may be moved or shifted longitudinally, means on such shaft to coöperate with said locking mechanism for rendering it inoperative when the shaft is shifted, restoring mechanism for restoring the said member to normal position and a connection between said restoring mechanism and said shaft comprising a bushing around the latter, an arm connected with the bushing, a link or strip connected to said arm and adapted to be operated by said restoring mechanism, said shaft having a longitudinal groove and an intersecting transverse groove, a pin in said bushing, which pin enters the longitudinal groove in normal position and the transverse groove when said shaft is shifted; substantially as described.

122. In calculating mechanism, the combination, with a series of keys, of a movable member controlled by said keys, registering mechanism coöperating with said movable member, locking mechanism for normally holding said member in normal position, a rock shaft having means for normally unlocking said locking mechanism, means whereby said shaft may be moved or shifted longitudinally, means on such shaft to coöperate with said locking mechanism for rendering it inoperative when the shaft is shifted, restoring mechanism for restoring the said member to normal position and a connection between said restoring mechanism and said shaft comprising a bushing around the latter, an arm connected with the bushing, a link or strip connected to said arm and adapted to be operated by said restoring mechanism, said shaft having a longitudinal groove and an intersecting transverse groove, a pin in said bushing, which pin enters the longitudinal groove in normal position and the transverse groove when said shaft is shifted, a second bushing or bearing on the shaft provided with a pin normally entering said transverse groove but adapted to enter the longitudinal groove when the shaft is shifted so that such shaft will then be locked against rotation and the said first bushing will be free to rock on the shaft without imparting movement thereto; substantially as described.

123. In calculating mechanism, the combination, with a series of keys, of a movable member controlled by said keys, registering mechanism actuated by said movable member, locking mechanism for normally locking said member in normal position, a rock shaft normally governing the locking and unlocking of said mechanism and adapted to be moved or shifted longitudinally, means for preventing rotation thereof when shifted, and means on said shaft for coöperating with said locking mechanism and rendering it inoperative when the shaft is shifted; substantially as described.

124. In calculating mechanism, the combination, with a series of keys, of a movable member controlled by said keys, registering mechanism actuated by said movable member, locking mechanism for normally locking said member in normal position, a rock shaft normally governing the locking and unlocking of said mechanism, and adapted to be moved or shifted longitudinally, means for preventing the rotation thereof when shifted, and means on said shaft for coöperating with said locking mechanism and rendering it inoperative when the shaft is shifted, and means for locking said shaft in normal position comprising a plate normally spring-pressed against the shaft and adapted to engage a groove on said shaft when the lock is shifted; substantially as described.

125. In calculating mechanism, the combination of registering mechanism, a series of key-controlled movable members coöperating therewith, a shiftable plate engaging said members to shift them into and out of coöperative relation with the registering mechanism, a movable frame having a cam face coöperating with the end of said plate to shift it longitudinally, means for locking the plate in shifted position and means for operating the movable frame, substantially as described.

126. In calculating mechanism, the combination of registering mechanism, a series of key-controlled movable members coöperating therewith, a shiftable plate engaging said members to shift them into and out of coöperative relation with the registering mechanism, a movable frame having a cam face coöperating with the end of said plate to shift it longitudinally, a catch adapted to engage said plate when shifted, and means on the frame for releasing said catch; substantially as described.

127. In calculating mechanism, the combination of registering mechanism, a series of key-controlled movable members coöperating therewith, a shiftable plate engaging said members to shift them into and out of coöperative relation with the registering mechanism, a movable frame having a cam face coöperating with the end of said plate to shift it longitudinally upon one movement thereof, a catch adapted to lock the plate in shifted position, and means on said frame for releasing said catch on its return movement; substantially as described.

128. In calculating mechanism, the combination of registering mechanism, movable members coöperating therewith, means for shifting said members into and out of coöperative relation with the registering mechanism and comprising a shiftable plate, a lever pivoted on one end of said plate and having a roller at its outer end and a movable frame having a cam face contacting said roller and adapted to shift the plate longitudinally; substantially as described.

129. In calculating mechanism, the combination of registering mechanism, movable members coöperating therewith, means for shifting said members into and out of coöperative relation with the registering mechanism and comprising a shiftable plate, a lever pivoted on one end of said plate and having a roller at its outer end, a pin on said lever, a catch adapted to engage and lock said plate in shifted position, a movable frame having a cam face adapted in the movement in one direction to contact the roller and shift the plate longitudinally and having means thereon to engage and lift said roller and pin on its lever and thereby release said catch; substantially as described.

130. In calculating mechanism, the combination of registering mechanism, key-controlled movable members coöperating therewith, a plate adapted to engage and shift said members into and out of engagement with the registering mechanism, mechanism for controlling said shifting movement of the plate, a movable frame controlling the operation of said mechanism, and means for compelling a full stroke or movement of said frame; substantially as described.

131. In calculating mechanism, the combination of registering mechanism, key-controlled movable members coöperating therewith, a plate to engage and shift said members into and out of engagement with the registering mechanism, mechanism for controlling said shifting movement of the plate, a movable frame controlling the operation of said mechanism, and means for compelling a full stroke of movement of said frame, said means comprising a series of rack teeth on said frame, and a pivoted pawl adapted to engage with said rack teeth and capable of oscillating in two directions; substantially as described.

132. In calculating mechanism, the combination of registering pinions, a series of key-controlled movable racks coöperating therewith, means for shifting said racks axially of said pinions into and out of coöperative relation therewith, a plate adapted to engage said racks, a bell crank adapted to engage and shift the plate and means for operating the bell crank; substantially as described.

133. In calculating mechanism, the combination of registering mechanism, a series of key-controlled movable members coöperating therewith, means for shifting said members into and out of coöperative relation with the registering mechanism, a plate adapted to engage said members, a bell crank adapted to engage and shift the plate, means for operating the bell crank, and means for locking the bell crank and plate in shifted position; substantially as described.

134. In calculating mechanism, the combination of registering mechanism, a series of key-controlled movable members coöperating therewith, means for shifting said members into and out of coöperative relation with the registering mechanism, a plate adapted to engage said members, a bell crank adapted to engage and shift the plate, means for operating the bell crank, and mechanism for locking the bell crank and plate in shifted position, and means for unlocking the said locking mechanism; substantially as described.

135. In calculating mechanism, the combination of registering pinions, a series of key-controlled movable racks coöperating therewith, means for shifting said racks axially of said pinions into and out of coöperative relation therewith, a plate adapted to engage said racks, a bell crank adapted to engage and shift the plate, and means for operating the bell crank, said means comprising a link connected to the bell crank, and an operating lever having means of engagement with said link for moving the latter and thereby rocking the bell crank, substantially as described.

136. In calculating mechanism, the combination of registering mechanism, a series of key-controlled movable members coöperating therewith, means for shifting said members into and out of coöperative relation with the registering mechanism, a plate adapted to engage said members, a bell crank adapted to engage and shift the plate and means for operating the bell crank, said means comprising a link connection to the bell crank, an operating lever having means of engagement with said link for moving the latter and thereby rocking the bell crank, and a locking finger coöperating with the bell crank to lock it in said operated position: substantially as described.

137. In calculating mechanism, the combination of registering mechanism, movable members coöperating therewith, a rack shifting plate for said members, and means for shifting said rack comprising a bell crank, one of whose arms is adapted to engage the plate, a link on the other arm, a sliding frame adapted to actuate said link and bell crank, a locking dog adapted to lock the bell crank in operated position and means on said sliding frame for unlocking said locking dog; substantially as described.

138. In calculating mechanism, the combination of registering mechanism, movable members coöperating therewith, a rack shifting plate for said members and means for shifting said rack comprising a bell crank, one of whose arms is adapted to engage the plate, a link on the other arm, a sliding frame adapted to actuate said link and bell crank, a locking dog adapted to lock the bell crank in operated position, and a pin carried by said sliding frame adapted to contact and throw the locking dog out of locking position; substantially as described.

139. In calculating mechanism, the combination of registering mechanism, movable members coöperating therewith, a rack shifting plate for said members and means for shifting said rack comprising a bell crank, one of whose arms is adapted to engage the plate, a link on the other arm, a sliding frame adapted to actuate said link and bell crank, a locking dog adapted to lock the bell crank in operated position, a pawl pivoted on the locking dog and a pin on the sliding frame adapted to contact said pawl and thereby throw the locking dog out of engagement with the bell crank; substantially as described.

140. In calculating mechanism, the combination of registering mechanism, movable members adapted to coöperate with said registering mechanism, a bar or plate adapted to shift said member into and out of engagement with said registering mechanism, devices employed in the adding calculation for operating said bar or plate, separate devices used in the subtracting operation for also shifting said bar or plate, and means for rendering inoperative one or the other of said devices used in the adding and subtracting calculations; substantially as described.

141. In calculating mechanism, the combination, with registering mechanism, of a series of sliding plates, a series of racks coöperating with the registering mechanism and having a movement on said plates independent thereof, tension mechanism coöperating with the racks and adjustable so as to move the racks in one direction or the other, means for adjusting said tension, a rack shifting plate for shifting the racks into and out of engagement with the registering mechanism, mechanism for shifting said plate, and means for simultaneously adjusting said rack shifting mechanism and said rack tension mechanism; substantially as described.

142. In calculating mechanism, the combination of registering mechanism, a series of movable members coöperating with said registering mechanism, means for shifting said members into and out of engagement with their registering mechanism, operating mechanism controlling said means and error correcting mechanism adapted to render said operating mechanism inoperative; substantially as described.

143. In calculating mechanism, the combination of registering mechanism, movable members adapted to coöperate with said registering mechanism, means for shifting said members into or out of engagement with the registering mechanism and error correcting mechanism adapted to render such shifting means inoperative; substantially as described.

144. In calculating mechanism, the combination of registering mechanism, of movable members adapted to coöperate with said registering mechanism, means for shifting said members into and out of coöperative relation with the registering mechanism, and key-controlled error correcting mechanism for rendering said shifting means inoperative; substantially as described.

145. In calculating mechanism, the combination of registering mechanism, a series of movable members adapted to coöperate with said registering mechanism, a movable bar or guide coöperating with said members and to shift them into or out of engagement with the registering mechanism, means for shifting said guide for both adding and subtracting calculations, and key-controlled error correcting mechanism adapted to render said shifting means inoperative; substantially as described.

146. In calculating mechanism, the combination of registering mechanism, of independent movable members adapted to coöperate with said registering mechanism, means for shifting said members into and out of engagement with the registering mechanism, and error correcting mechanism adapted to render the said shifting means inoperative and comprising a movable frame or arm which, when moved, is adapted to coöperate with said shifting means and render the latter inoperative; substantially as described.

147. In calculating mechanism, the combination of registering mechanism, of independent movable members adapted to coöperate with said registering mechanism, means for shifting said members into and out of engagement with the registering mechanism, and error correcting mechanism adapted to render the said shifting means inoperative and comprising a movable frame or arm which, when moved, is adapted to coöperate with said shifting means and render the latter inoperative, and a key-controlled error lever adapted to move said frame or arm; substantially as described.

148. In calculating mechanism, the combination of registering mechanism, independently movable members adapted to coöperate with the registering mechanism, means for shifting said members into and out of engagement with the registering mechanism, a sliding frame controlling the movement of said shifting means, and error correcting mechanism adapted to throw said shifting means out of coöperative relation with said sliding frame; substantially as described.

149. In calculating mechanism, the combination of registering mechanism, of movable members adapted to coöperate with said registering mechanism, a sliding guide coöperating with said members to shift them into and out of engagement with the registering mechanism, a sliding frame, a main lever or restoring bail for operating said sliding frame, a lever pivoted on said guide, said sliding frame having a cam face to contact said pivoted lever and thereby shift it and its guide, an error correcting mechanism adapted to contact said pivoted lever and throw the latter out of the path of movement of said cam face; substantially as described.

150. In calculating mechanism, the combination of registering mechanism, movable members adapted to coöperate with said registering mechanism, a sliding guide coöperating with said members to shift them into or out of engagement with the registering mechanism, a main lever or restoring bail, a bell crank adapted to engage and shift said guide, a link connected to said bell crank, and adapted to be actuated by said restoring bail, means for locking said bell crank when operated to shift the guide, and error correcting mechanism adapted to prevent the unlocking of said bell crank when said restoring bail is operated; substantially as described.

151. In calculating mechanism, the combination of registering mechanism, movable members adapted to coöperate with said registering mechanism, a sliding guide coöperating with said members to shift them into and out of engagement with the registering mechanism, means for locking said guide when shifted, and error correcting mechanism comprising a key-controlled movable plate having a projecting finger coöperating with said locking means to prevent unlocking thereof; substantially as described.

152. In calculating mechanism, the combination, with registering mechanism, of a series of key-controlled movable members adapted to coöperate therewith, means for shifting said members laterally into and out of the plane of the registering mechanism, and means for locking said registering mechanism against displacement when said members are so shifted; substantially as described.

153. In calculating mechanism, the combination, with registering mechanism, of a series of key-controlled movable members adapted to coöperate therewith, means for shifting said members into and out of coöperative relation with the registering mechanism, and means controlled by the shifting movements of said members for locking said registering mechanism against displacement when said members are shifted out of their coöperation; substantially as described.

154. In calculating mechanism, the combination, with registering pinions, of a series of key-controlled movable racks adapted to coöperate therewith, means for shifting said racks axially of said pinions into and out of engagement therewith, and tension controlled fingers adapted to engage the registering mechanism when the said members are shifted out of engagement therewith; substantially as described.

155. In calculating mechanism, the combination of a dial having an actuating pinion, a key-controlled longitudinally movable rack shiftable axially of said pinion into and out of engagement therewith and means adapted to engage said pinion when the rack is shifted out of engagement; substantially as described.

156. In calculating mechanism, the combination of a series of dials having actuating pinions, a series of key-controlled longitudinally movable racks adapted to engage said pinions, means for shifting said racks axially of the pinions into and out of engagement therewith, and means adapted to engage said pinions when the racks are so shifted out of engagement; substantially as described.

157. In calculating mechanism, the combination of a series of dials having actuating pinions, a series of key-controlled laterally and longitudinally movable racks adapted to engage said pinions, means for shifting said racks into and out of engagement with their pinions, and a series of locking fingers always bearing against the sides of their respective racks and adapted to engage the pinions as the racks are disengaged therefrom by lateral movement; substantially as described.

158. In calculating mechanism, the combination of a series of dials having actuating pinions, a series of key-controlled laterally and longitudinally movable racks adapted to engage said pinions, means for shifting said racks into and out of engagement with the pinions, and a series of locking fingers always spring-pressed against the sides of the racks and entering the pinions as the racks are disengaged therefrom by lateral movement; substantially as described.

159. In calculating mechanism, the combination of a series of dials having actuating pinions, a series of key-controlled laterally and longitudinally movable racks adapted to engage said pinions, means for shifting said racks into and out of engagement with the pinions, and a series of spring-pressed locking fingers pivoted at one end and having a projection bearing against the sides of the racks, the free end of such fingers being out of engagement with the pinions when the racks are in engagement, and being in engagement therewith when the racks are shifted laterally out of engagement therewith; substantially as described.

160. In calculating mechanism, the combination of a series of dials having actuating pinions, a corresponding series of longitudinally and laterally movable racks adapted to engage said pinions, a corresponding series of locking fingers pivoted at one end and always spring-pressed against the sides of the racks to follow them in their shifting movements and to engage the pinions to prevent rotation when the racks are shifted laterally out of engagement, and means for shifting the racks into and out of engagement with their dial pinions; substantially as described.

161. In calculating mechanism, the combination of registering mechanism, movable members coöperating therewith, key-controlled mechanism for said members, locking mechanism normally locking said members against movement, and means for unlocking the locking mechanism and for stopping the registering mechanism when all ciphers are indicated through movement thereof in the same direction as when under control of said key mechanism; substantially as described.

162. In calculating mechanism, the combination of registering mechanism, a series of movable members coöperating therewith, key-controlled mechanism for said members, locking mechanism normally locking said members against movement, and means for simultaneously unlocking all said members for actuation of the registering mechanism in the same direction as when controlled by said key mechanism; substantially as described.

163. In calculating mechanism, the combination of registering mechanism, a series of independently movable members coöperating therewith, key-controlled mechanism for said members, separate locking mechanism for each member normally locking it against movement, and means for simultaneously unlocking all of said locking mechanisms for actuation of the registering mechanism in the same direction as when controlled by said key mechanism; substantially as described.

164. In calculating mechanism, the combination of registering mechanism, a series of independently movable members coöperating therewith, key-controlled mechanism for said members, separate locking mechanism for each member normally locking it against movement, means for simultaneously unlocking all of said locking mechanism, and means for stopping the registering 165. In calculating mechanism, the combination of registering mechanism, movable members adapted to coöperate with said registering mechanism, key-controlled mechanism for operating said members and clearing mechanism for said members and the registering mechanism, said clearing mechanism comprising a bail adapted to operate said members independently of said key-controlled mechanism and permitting said members to move to their full extent, said bail also having means engaging with the registering mechanism for stopping the same when its ciphers are indicated; substantially as described.

166. In calculating mechanism, the combination of registering dials having pinions, movable racks adapted to engage said pinions, locking mechanism for normally locking said racks against tension, tension mechanism for said racks, and a clearing device adapted to unlock said locking mechanism and permit said racks to move until their respective dials indicate ciphers, said clearing device having means for stopping the dials when ciphers are indicated thereon; substantially as described.

167. In calculating mechanism, the combination of registering dials having pinions, independently movable racks adapted to engage said pinions, tension mechanism for said racks, locking mechanism for locking the racks against said tension, a clearing bail adapted to operate said locking mechanism, and thereby unlock the racks, and also having a finger projecting adjacent to the dials and a pin or projection on said dials adapted to be stopped by said finger when the dials indicate ciphers; substantially as described.

168. In calculating mechanism, the combination of a series of registering dials having pinions, independently movable racks adapted to engage said pinions, tension mechanism for the racks, locking mechanism for normally locking said racks against such tension, a pivoted bail having a series of projecting arms adapted to unlock said locking mechanism and having a series of projecting fingers adapted to be moved adjacent to said dials and a projection on said dials adapted to contact said fingers when the dials indicate ciphers; substantially as described.

169. In calculating mechanism, the combination of a series of registering dials having pinions, independently movable racks adapted to engage said pinions, tension mechanism for the racks, locking mechanism for normally locking said racks against such tension, a pivoted bail having a series of projecting arms adapted to unlock said locking mechanism, and having a series of projecting fingers adapted to be moved adjacent to said dials and a projection on said dials adapted to contact said fingers when the dials indicate ciphers, and a pivoted finger piece for operating the said clearing bail; substantially as described.

170. In calculating mechanism, the combination of a series of registering dials, a corresponding series of key-controlled and independently movable racks coöperating with the dials, independent locking mechanisms for said racks, and a clearing device having means for simultaneously unlocking all of said locking mechanisms and also having means for stopping all the dials when they indicate ciphers through movement thereof in the same direction as when under key-control; substantially as described.

171. In calculating mechanism, the combination of a series of dials having actuating pinions, a corresponding series of sliding racks adapted to engage the pinions, means for normally locking the racks against movement and a clearing device for simultaneously unlocking all of said racks and permit them to actuate their dial pinions in the same direction as when accumulating items; substantially as described.

172. In calculating mechanism, the combination of a series of dials having actuating pinions, a corresponding series of sliding racks adapted to engage the pinions, means for normally locking the racks against movement, and a clearing device for simultaneously unlocking all of said racks and permit them to actuate their dial pinions in the same direction as when accumulating items, and means for stopping the rotation of all dials when ciphers are indicated, substantially as described.

173. In combination with calculating mechanism having an operating lever and with a typewriter carriage, means actuated by said lever for setting back the carriage from a fixed stop or predetermined point; substantially as described.

174. In combination with calculating mechanism having an operating lever and with a typewriter carriage, key controlled means, actuated by said lever for setting back the carriage from a fixed point or stop; substantially as described.

175. In combination with calculating mechanism having an operating lever and with a typewriter carriage, key controlled means actuated by said lever for setting back the carriage from a fixed stop or point the number of spaces indicated by the operated key; substantially as described.

176. In combination with calculating mechanism having an operating lever and with a typewriter carriage, a series of keys of different space values and mechanism actuated by said lever and coöperating with the carriage to set back the latter and actuated by any one of the keys operated and to a degree represented by the particular key so operated; substantially as described.

177. In combination with calculating mechanism having an operating lever and with a typewriter carriage having the ordinary escapement, a series of keys, mechanism actuated by said lever and controlled by any of said keys for setting back the carriage the number of spaces indicated by the value of the key operated, and means for rendering the escapement inoperative substantially as described.

178. In combination with calculating mechanism having an operating lever and with a typewriter carriage and its escapement mechanism for permitting the carriage to move space by space in one direction and key-controlled means actuated by said lever for moving the carriage in the opposite direction a number of spaces determined by the particular key operated; substantially as described.

179. In combination with calculating mechanism having an operating lever and with a typewriter carriage, means actuated by said lever for setting the carriage back a predetermined number of spaces, a movable bar, a connection between said bar and means for moving the bar predetermined distances according to the number of spaces it is desired to shift the carriage; substantially as described.

180. In combination with calculating mechanism having an operating lever and with a typewriter carriage, means coöperating therewith and actuated by said lever for setting the carriage back, a movable bar, a series of keys coöperating with said bar to move it different distances and a connection between said bar and said means; substantially as described.

181. In combination with calculating mechanism having an operating lever and with a typewriter carriage, means coöperating therewith and actuated by said lever for setting the carriage back, a movable bar, a series of keys, means on the keys for engaging and moving the bar different distances according to the particular key operated and a connection between said bar and said means; substantially as described.

182. In combination with calculating mechanism having an operating lever and with a typewriter carriage, means coöperating therewith and actuated by said lever for setting the carriage back, a movable bar, a row of keys adapted to engage said bar and move it increasing distances from the first to the last key and a connection between said means and bar; substantially as described.

183. In combination with calculating mechanism having an operating lever and with a typewriter carriage, means coöperating therewith and actuated by said lever for setting the carriage back, a connection between said bar and said means and a row of keys having plates of gradually increasing obliquity from one side of the row to the other, which plates are adapted to engage said bar and move it distances corresponding to the particular key operated; substantially as described.

184. In combination with calculating mechanism having an operating lever and with a typewriter carriage, means coöperating therewith and actuated by said lever for setting the carriage back, a movable bar having a series of slots, a connection between said bar and said means, and a row of keys having plates adapted to engage in said slots and move the bar different distances; substantially as described.

185. In combination with calculating mechanism having an operating lever and with a typewriter carriage, means coöperating therewith and actuated by said lever for setting the carriage back, a spring-pressed movable bar having a series of slots, a connection between said bar and said means, and a row of keys having plates adapted to engage in said slots and move the bar different distances against the spring tension; substantially as described.

186. In combination with calculating mechanism having an operating lever and with a typewriter carriage, mechanism actuated by said lever for setting the carriage back a predetermined number of spaces, a movable bar, a connection between said bar and said mechanism, keys adapted to control the movements of the bar and to become locked therewith when operated and means for unlocking the keys; substantially as described.

187. In combination with calculating mechanism having an operating lever and with typewriter carriage mechanism actuated by said lever for setting the carriage back a predetermined number of spaces from a fixed point, a movable bar, a connection between said bar and said mechanism and a row of keys adapted to control the movements of the bar and having stems provided with means engaging said bar for moving it different distances according to the number or value of the particular key operated; substantially as described.

188. In combination with calculating mechanism having an operating lever and with a typewriter carriage, mechanism actuated by said lever for setting the carriage back a predetermined number of spaces, a movable bar, and an operating connection between said bar and said mechanism and a row of keys adapted to control the movements of the bar and having stems provided with bevels or wedges of gradually increasing degree of obliquity adapted to engage and move said bar; substantially as described.

189. In combination with calculating mechanism having an operating lever and with a typewriter carriage, mechanism actuated by said lever for setting the carriage back a predetermined number of spaces, a movable bar, an operating connection between said bar and said mechanism, a row of keys adapted to control the movements of the bar and having means adapted to engage said bar and move it different distances according to the particular key operated, and means for locking and unlocking said bar; substantially as described.

190. In combination with calculating mechanism and with a typewriter carriage, mechanism coöperating therewith for setting the carriage back a predetermined number of spaces, a movable bar, an operating connection between said bar and mechanism, a row of keys adapted to control the movements of the bar and having means adapted to coöperate with said bar and move it different distances, means for locking the bar and any key operated, a main operating lever or bail for the calculating mechanism, and mechanism controlled by the said lever for unlocking the bar; substantially as described.

191. In combination with calculating mechanism having an operating lever and with a typewriter carriage, mechanism coöperating therewith and actuated by said lever for setting the carriage back a predetermined number of spaces, a movable bar, a connection between said bar and mechanism, a row of keys adapted to control the movements of the bar, and having means for moving said bar different distances according to the particular key operated, and also having means whereby any operated key is locked to the bar after movement thereof, and means for unlocking said bar and operated key; substantially as described.

192. In combination with calculating mechanism and with a typewriter carriage, mechanism coöperating therewith for setting the carriage back a predetermined number of spaces, a movable bar, an operating connection between said bar and said mechanism, a series of spring-pressed keys having means for actuating the bar different distances according to the particular key operated and also having means whereby the operated key and bar are locked together, a main lever for actuating the calculating mechanism and said carriage setting mechanism, and means carried thereby for unlocking the operated key and the bar; substantially as described.

193. In combination with calculating mechanism having an operating lever and with a typewriter carriage, mechanism coöperating therewith, and actuated by said lever for setting the carriage back a predetermined number of spaces, a longitudinally movable bar having a series of longitudinal slots a corresponding series of keys having inclined or wedge shaped ends of gradually varying degrees of obliquity and adapted to enter their respective slots, each of said keys having a shoulder adapted to engage the bar after moving the same the distance determined by its particular wedge, and means for unlocking the bar after the carriage is set; substantially as described.

194. In combination with calculating mechanism having an operating lever and with a typewriter carriage, mechanism coöperating therewith and actuated by said lever for setting the carriage back a predetermined number of spaces, a longitudinally movable bar having a series of longitudinal slots, a corresponding series of keys having inclined or wedge shaped ends of gradually varying degrees of obliquity and adapted to enter their respective slots, each of said keys having a shoulder adapted to engage the bar after moving the same the distance determined by its particular wedge, said locking means comprising in combination with the main locking lever a strip or rod 333 actuated by said operating lever and movable at right angles to said bar, said strip having a pivoted dog projecting in the plane of said bar whereby any one movement of said strip the said bar will be thrust in the same direction it was moved by the operated key and thereby release such key from the bar; substantially as described.

195. In combination with calculating mechanism having an operating lever and with a typewriter frame and its carriage, mechanism coöperating with the carriage and actuated by said lever for setting the same back a predetermined number of spaces, brackets 306, and 307 on the frame, a bar arranged to slide on said brackets and provided with a series of longitudinally arranged slots 308, a connection between said bar and said mechanism, a row of spring-pressed keys having wedge shaped ends or stems of different degrees of obliquity and adapted to enter their respective slots and when depressed to move such bar different distances according to the particular key operated, means whereby the keys when operated become locked to the bar, a main lever 333, actuated by said operating lever and movable at right angles to said bar and near one end thereof, and a spring-pressed dog 334 on said strip and adapted, in one of its movements, to contact and thrust the bar in a direction to release the operated key from engagement with its bar; substantially as described.

196. In combination with calculating mechanism having an operating lever and with a typewriter carriage, mechanism coöperating therewith and actuated by said lever for setting the carriage back a predetermined number of spaces, a movable bar, a connection between said bar and mechanism, a key-board comprising two parallel plates 15 and 16, a series of bushings 301 secured between said plates, a series of spring-pressed keys operating in said bushings and adapted to control the movements of the bar; substantially as described.

197. In combination with calculating mechanism having an operating lever and with a typewriter carriage, mechanism actuated by said lever for setting the carriage back a predetermined number of spaces, comprising a ratchet wheel, a pawl adapted to operate therewith, means for normally keeping said pawl out of coöperating relation with its ratchet wheel but adapted under certain conditions to permit coöperation, means for swinging said pawl, and means for communicating the movement of the ratchet wheel to the carriage; substantially as described.

198. In combination with calculating mechanism having an operating lever and with a typewriter carriage, mechanism actuated by said lever for setting the carriage back a predetermined number of spaces comprising a ratchet wheel, a movable shield adapted to cover a portion of the ratchet wheel, means for moving the shield, a swinging pawl normally pressing upon the shield but adapted to engage the ratchet wheel when the shield is moved to expose ratchet teeth theretofore concealed, means for swinging said pawl and an operating connection between said ratchet wheel and the carriage; substantially as described.

199. In combination with calculating mechanism having an operating lever and with a typewriter carriage, mechanism actuated by said lever for setting the carriage back a predetermined number of spaces comprising a movable shield, means for moving said shield to expose a predetermined number of ratchet teeth, a swinging pawl adapted to coöperate with said ratchet wheel, means for swinging said pawl through the same arc at every movement thereof and an operative connection between the ratchet wheel and carriage; substantially as described.

200. In combination with calculating mechanism having an operating lever and with a typewriter carriage, mechanism actuated by said lever for setting the carriage back a predetermined number of spaces, comprising a ratchet wheel, a swinging pawl adapted to coöperate with said ratchet wheel and having a predetermined arc of movement, a shield covering a portion of the ratchet teeth and normally keeping said pawl out of coöperative relation with the wheel, means for moving said shield different predetermined distances to expose a predetermined number of ratchet teeth theretofore uncovered, and an operating connection between said wheel and the carriage, said ratchet teeth having correspondence with the spacing of the carriage, substantially as described.

201. In combination with calculating mechanism having an operating lever and with a typewriter carriage, mechanism actuated by said lever for setting the carriage back a predetermined number of spaces comprising a ratchet wheel, a pawl adapted to coöperate therewith and having a swinging movement whose arc is predetermined, means for so swinging the pawl, a shield movable over the ratchet teeth and covering a part thereof, and normally holding said pawl from operative relation with its ratchet wheel, means for moving said shield to uncover the number of teeth theretofore exposed, corresponding to the number of spaces it is desired to set back the carriage, a pinion operated by the ratchet wheel and a rack arranged on the typewriter carriage mechanism and adapted to coöperate with said pinion; substantially as described.

202. In combination with calculating mechanism having an operating lever and with a typewriter carriage, mechanism actuated by said lever for setting the carriage back a predetermined number of spaces comprising a ratchet wheel having a shaft, a dial adapted to coöperate with said ratchet wheel and to have an arc of movement of predetermined length, a shield pivoted on said shaft and having a flange portion covering a part of said ratchet teeth and adapted to normally keep the pawl from coöperative relation with the ratchet wheel, means for moving said shield, a pinion mounted on said shaft, a rack on the carriage mechanism and adapted to coöperate with said pinion; substantially as described.

203. In combination with calculating mechanism having an operating lever and with the typewriter carriage, mechanism actuated by said lever for setting the carriage back a predetermined number of spaces comprising a ratchet wheel having a shaft, a swinging plate pivoted on said shaft and having at one end a pivoted pawl adapted to coöperate with said ratchet wheel and having an arc of movement of predetermined length, a movable shield holding said pawl out of coöperative relation with the ratchet wheel but adapted to engage said wheel and move it the number of teeth determined by the particular movement of the shield and an operative connection between said shaft and the carriage; substantially as described.

204. In combination with calculating mechanism having an operating lever and with the typewriter carriage, mechanism actuated by said lever for setting the carriage back a predetermined number of spaces comprising a ratchet wheel having a shaft, a swinging plate loosely pivoted on said shaft adjacent to the ratchet wheel and carrying a spring-pressed pivoted pawl adapted to engage with said ratchet wheel, a shield also loosely pivoted on the shaft and adapted to cover a certain number of ratchet teeth and to normally hold the pawl from engagement therewith, means for swinging the shield to expose a predetermined number of ratchet teeth theretofore concealed, a pinion on said shaft, a rack arranged on the carriage and adapted to engage with said pinion, and means for operating said swinging plate; substantially as described.

205. In combination with calculating mechanism having an operating lever and with the typewriter carriage, mechanism actuated by said lever for setting the carriage back a predetermined number of spaces comprising a ratchet wheel, a pawl adapted to engage said ratchet wheel, and to swing in an arc of a predetermined length, means for swinging said pawl, a shield adapted to cover a part of the ratchet teeth and to hold said pawl from engagement with the teeth, and key-controlled mechanism adapted to move said shield distances predetermined by the particular keys operated; substantially as described.

206. In combination with calculating mechanism, having an operating lever and with a typewriter carriage, mechanism actuated by said lever for setting the carriage back a predetermined number of spaces, comprising a ratchet wheel, a pawl adapted to coöperate therewith and having an arc of movement of predetermined length, means for so operating the pawl, a shield adapted to cover a certain number of teeth and normally keeping the pawl from engagement therewith, a movable bar, a series of keys coöperating with said bar to move it different distances according to the particular key operated, and means for communicating the movement of said bar to the shield, and an operating connection between the ratchet wheel and the carriage, substantially as described.

207. In combination with calculating mechanism, and with a typewriter carriage, mechanism for setting the carriage back a predetermined number of spaces comprising a ratchet wheel having a shaft, a swinging plate loosely mounted on said shaft and covering a pivoted pawl adapted to engage with ratchet wheel, said pivoted pawl, a shield also pivoted on said shaft and adapted to cover a certain part of the teeth and to normally hold the pawl out of engagement with said teeth, means for moving said shield to expose any predetermined number of ratchet teeth theretofore covered, a main operating lever or bail for said calculating mechanism, a connection between said lever and said pivoted plate and a connection between said ratchet wheel and the carriage; substantially as described.

208. The combination with calculating mechanism having an operating lever and with a typewriter frame and its carriage mechanism, of a bracket mounted upon said frame and having projecting lugs 319, a shaft 320 bearing in said lugs, a ratchet wheel 321 mounted at one end of said shaft, a pinion 322 mounted on the other end thereof, a shield having a flat portion 323 pivoted on the end of said shaft adjacent to the ratchet wheel and having a flange portion 324 of arc form and adapted to cover a certain number of the ratchet teeth, means for swinging said shield consisting of a connection with said operating lever, a swinging plate 326 loosely mounted on the shaft 320, a spring-pressed pawl 327 pivoted on said plate, means for operating said plate, and a carriage rack on the carriage mechanism with which rack the pinion 322 coöperates; substantially as described.

209. In calculating mechanism, the combination of registering devices, key-controlled mechanism coöperating therewith comprising a series of similar stop bars controlled by the keys, and rack plates governed as to degree of movement by the bars, and means for indicating the number of times the said mechanism is actuated said means being denominationally adjustable independently of the registering devices; substantially as described.

210. In calculating mechanism, the combination of registering devices, key-controlled mechanism coöperating therewith comprising a series of similar stop bars controlled by the keys, and rack plates governed as to degree of movement by the bars, and means, operative or inoperative at the will of the operator, for indicating the number of times the said mechanism is actuated said means being denominationally adjustable independently of the registering devices; substantially as described.

211. In calculating mechanism, the combination of registering devices, mechanism coöperating therewith, comprising a series of similar stop bars controlled by the keys, and rack plates governed as to degree of movement by the bars, and a series of reference dials adapted to be put into operative or inoperative condition to indicate the number of times of operation of said mechanism said series of dials being denominationally adjustable independently of the registering devices; substantially as described.

212. In calculating mechanism, the combination of registering devices, key-controlled mechanism coöperating with said registering devices comprising a series of similar stop bars controlled by the keys, and rack plates governed as to degree of movement by the bars, means for operating said mechanism and means for indicating the number of times of operation of said mechanism said series of dials being denominationally adjustable independently of the registering devices; substantially as described.

213. In calculating mechanism, the combination of registering devices, key-controlled mechanism coöperating with said registering devices comprising a series of similar stop bars controlled by the keys, and rack plates governed as to degree of movement by the bars, a main restoring bail for operating said mechanism and reference dials actuated denominationally by said lever or bail; substantially as described.

214. In calculating mechanism, the combination of registering devices, key-controlled mechanism coöperating with said registering devices comprising a series of similar stop bars controlled by the keys, and rack plates governed as to degree of movement by the bars, a main restoring bail for operating said mechanism, indicating mechanism and an operating member between said bail and the said indicating mechanism for denominationally actuating the latter; substantially as described.

215. In calculating mechanism, the combination of registering devices, key-controlled mechanism coöperating with said registering devices comprising a series of stop bars controlled by the keys, and rack plates governed as to degree of movement by the bars, a restoring bail for operating said mechanism, reference dials and an operating member between said bail and dials for denominationally actuating the latter; substantially as described.

216. In calculating mechanism, the combination of registering devices, key-controlled mechanism coöperating with said registering devices, a restoring bail for operating said mechanism, a series of reference dials, a connection between said bail and dials and means for shifting said dials to be separately operated at separate operations; substantially as described.

217. In calculating mechanism, the combination of registering devices, key-controlled mechanism coöperating with said registering devices, a restoring bail for operating said mechanism, a series of reference dials having independent actuating levers, a projection on said bail adapted to actuate any one of said dial levers and means for shifting said dials and levers in the path of movement of the said projection substantially as described.

218. In calculating mechanism, the combination of registering devices, key-controlled mechanism coöperating with said registering devices, a restoring bail for operating said mechanism, a series of reference dials, an operating member between said bail and dials, and means whereby the dials may be shifted into the path of movement of said member and be returned by a step by step movement; substantially as described.

219. In calculating mechanism, the combination of registering devices, key-controlled mechanism coöperating with said registering devices, a restoring bail for operating said mechanism, a series of reference dials, a feed hook operated by said bail, and means for shifting the dials in operative relation with the dials and for returning the dials by a step by step movement; substantially as described.

220. In calculating mechanism, the combination of registering devices, key-controlled mechanism coöperating with said registering devices, a restoring bail for operating said mechanism, a series of registering dials having independent actuating levers, a feed hook on said bail adapted to actuate any one of said levers, means for shifting said levers into the path of movement of the feed hook; substantially as described.

221. In calculating mechanism, the combination with a frame, key-controlled registering devices therein, a restoring bail therefor, a dial supported on said frame and bodily removable on its supports, actuating levers connected to said dials, and a feed hook operated by the restoring bail and operating any one of said levers presented to it; substantially as described.

222. In calculating mechanism, the combination of registering devices, key-controlled mechanism coöperating with said registering devices, a restoring bail for operating said mechanism, a series of reference dials, an operating member between said bail and dials, means whereby the dials may be bodily shifted and locked in its shifted position and be returned by a step by step movement, said means comprising, in combination with the machine frame or structure and a case in which the dials are arranged, a shaft 341 projecting from said frame and passing through said dial case, a bushing on said shaft and also extending through the dial case and escapement mechanism coöperating between said case and said bushing; substantially as described.

223. In calculating mechanism, the combination of a dial case, a series of dials operatively arranged therein, a main frame having a shaft 341 on which the dial case is mounted means whereby said dial case may be moved longitudinally on said shaft against tension, a bushing on said shaft, a finger lever for operating said bushing, said bushing having on opposite sides a series of notches, and a pair of dogs coöperating with said notches and adapted to permit the dial case to return with a step by step movement when such finger lever is operated; substantially as described.

224. In calculating mechanism, a keyboard having banks of operating keys thereon and movable means independent of the keys for indicating the spacing of the banks of keys whereby they may be easily read; substantially as described.

225. In calculating mechanism, a keyboard having banks of operating keys thereon and means for indicating at the will of the operator spacing of the banks of keys either for general calculations and for money calculations; substantially as described.

226. In calculating mechanism, the combination, with a series of totalizing dials, a keyboard having banks of operating keys comprising units bank, tens bank, and so on, and movable means for indicating spacing for the banks of keys and also for the dials; substantially as described.

227. In calculating mechanism, in combination with a series of totalizing dials, a keyboard having banks of operating keys and movable means for indicating, in connection with both the dials and the banks of keys, the necessary spacing marks; substantially as described.

228. In calculating mechanism, in combination with a series of totalizing dials, a keyboard having banks of operating keys, and movable means coöperating with both the dials and banks of keys for indicating spacing or division markings for the dials and banks of keys; substantially as described.

229. In calculating mechanism, a keyboard having a plate with banks of keys operating therein in combination with movable means on the keyboard plate for indicating spacing between the different banks; substantially as described.

230. In calculating mechanism, a keyboard having a plate with banks of keys operating therein, in combination with adjustable means on the keyboard plate for indicating different kinds of spacing for the banks of keys, substantially as described.

231. In calculating mechanism, a keyboard having banks of operating keys numbered 1 to 9 in each bank, and movable means coöperating with the keyboard for indicating spacing marks between said banks of keys whereby the banks and keys may be easily read or distinguished by the operator; substantially as described.

232. In calculating mechanism, the combination with registering mechanism, a keyboard having a series of banks of operating keys numbered 1 to 9 in each bank, and movable means on the keyboard and also in coöperation with the registering mechanism for providing spacing indications for both the banks of keys on the keyboard and the figures on the registering mechanism whereby the banks of keys and the figures on the registering mechanism may be easily read or distinguished by the operator; substantially as described.

233. In calculating mechanism, in combination with a series of totalizing dials, a keyboard having banks of operating keys numbered 1 to 9 and corresponding in number to the number of dials, said keyboard having a slot between every third bank of keys where the division marks usual in general figuring would occur, and a frame adapted to be moved adjacent to said slots and when moved showing a color different from the color of the keyboard, whereby the spacing between the banks of keys will be marked; substantially as described.

234. In calculating mechanism, a keyboard having banks of operating keys thereon and provided with slots between every third bank of keys, in combination with a frame arranged to move beneath the keyboard provided with a color distinguishable from the color of the keyboard, so that when such frame is moved such color will be exposed through said slots for the purpose of marking the spaces between the banks of keys; substantially as described.

235. In calculating mechanism, a keyboard comprising a plate and a series of banks of operating keys working therein, said plate having a slot between every third bank of keys in combination with a frame or plate secured to the under side of said keyboard plate and adapted to slide thereon, said sliding plate bearing a color distinguishable from the color of the keyboard and which is exposed through said slots when the sliding plate is shifted to a certain position; substantially as described.

236. In calculating mechanism, a keyboard comprising a plate and a series of banks of keys operating therein in combination with means for indicating spacing between the banks of keys comprising a plate or frame, arranged to slide underneath the keyboard plate and bearing a color distinguishable from that of the keyboard, which color is exposed through said slots when said frame is in a certain position, and means for holding said sliding frame in frictional contact with the keyboard plate; substantially as described.

237. In calculating mechanism, a key-board having a plate and a series of banks of keys operating therein and provided with a slot between every third bank of keys, in combination with means for indicating spacing between the banks of keys and coöperating with said slots, which means comprises a plate or frame transversely movable underneath the keyboard plate and bearing a color distinguishable from that of the key-board plate and exposable through said slots; substantially as described.

238. In calculating mechanism, a key-board having a plate and a series of banks of keys operating therein, in combination with means for indicating spacing between the banks of keys comprising a frame or plate movable transversely of the keyboard and having transverse slots and studs or screws passing through said slots and screwing into the under side of the keyboard plate; substantially as described.

239. In calculating mechanism, a key-board having a plate and a series of banks of keys operating therein and means for indicating spacing between the banks of keys comprising a plate or frame movable transversely of the keyboard and underneath its plate and having transverse slots, a stud or screw passing through said slots and entering the underside of the keyboard plate and means for holding said frame or plate in frictional contact with the keyboard plate; substantially as described.

240. In calculating mechanism, the combination of a keyboard having a plate and a series of banks of keys operating therein, said keyboard plate having a slot between every third bank of keys, and means for indicating spacing between the banks of keys comprising a frame or plate arranged beneath the keyboard plate and bearing a color distinguishable from that of the keyboard and exposable through said slots, and means whereby said plate or frame is held in slidable relation with the keyboard plate; substantially as described.

241. In calculating mechanism, the combination of a key-board having a plate and a series of banks of keys operating therein, said key-board plate having a slot between every third bank of keys, and means for indicating spacing between the banks of keys comprising a plate movable transversely of the key-board beneath its plate and provided with transverse slots, screws or studs entering said slots and screwing into the under side of the key-board plate, one of said studs being provided with a spring washer for holding said movable plate in contact with the key-board plate, said movable plate being provided on its upper face with a color distinguishable from that of the keyboard plate and exposable through said slots; substantially as described.

242. In calculating mechanism, the combination of a key-board having a plate and a series of banks of keys operating therein, said key-board plate having a slot between every third bank of keys, and means for indicating spacing between the banks of keys and comprising a frame or plate arranged to move on the under side of the key-board plate and bearing a color distinguishable from that of the key-board plate, which color is exposable through said slots, and means extending to a side of the machine and in reach of the operator for shifting or moving said colored plate; substantially as described.

243. In calculating mechanism, the combination of a key-board having a plate and a series of banks of keys operating therein, said key-board plate having a slot between every third bank of keys, and means for indicating spacing between the banks of keys and comprising a frame or plate arranged to move transversely of the key-board underneath its plate and having two colored surfaces arranged parallel to said slots, one of said colors being the same as the keyboard plate and the other color being distinguishable therefrom, whereby, when the frame is in one position with said distinguishable color exposed through the slots, spacing marks will be thereby provided and when such frame is moved the other colored surface will be exposed through said slots without giving any distinguishing effect; substantially as described.

244. In calculating mechanism, the combination of a key-board having a plate and a series of banks of keys operated therein, said key-board plate having a slot between every third bank of keys, and means for indicating spacing between the banks of keys comprising a frame composed of a series of strips extending longitudinally of the keyboard and equal in number to the number of said slots, each strip having two colored surfaces extending parallel with the slots, one of the colors being substantially the same as that of the key-board plate and the other distinguishable therefrom, one or the other of the said colored surfaces being adapted to be exposed through said slots, and means whereby said frame may be shifted from one position to the other; substantially as described.

245. In calculating mechanism, the combination of a key-board having a plate and a series of banks of keys operating therein, said plate having a slot between every third bank of keys corresponding to the position of indicating or division marks in general figuring and also having a slot between the second and third banks of keys and after every third subsequent or higher bank of keys therein corresponding respectively to the decimal point and to the usual division or indicating marks for money calculations, and a frame or plate arranged beneath the key-board plate and having two differently colored portions, one colored portion being adapted to be exposed through one set of slots and the other color portion being exposed at that time through the other slots; substantially as described.

246. In calculating mechanism, the combination of a key-board having a plate and a series of banks of keys operating therein, said plate having a slot between every third bank of keys corresponding to the position of indicating or division marks in general figuring and also having a slot between the second and third banks of keys and after every third subsequent or higher bank of keys therein corresponding respectively to the decimal point and to the usual division or indicating marks for money calculations, and a frame or plate movably arranged beneath the key-board plate having two colored surfaces arranged parallel to all of said slots, and adjacent thereto, one of said colors being distinguishable from the color of the keyboard plate and the other being the same or similar thereto, said distinguishing color being exposed through one of said sets of slots, and the other of said colors being exposed through the other set of slots, and means for shifting or moving said colored plate; substantially as described.

247. In calculating mechanism, in combination with a series of totalizing dials, a plate or shield in front thereof and having dial openings to expose one figure of each dial, a key-board having a plate and a series of banks of keys operating therein, said shield being provided with an opening after every third dial opening, and said key-board plate being provided with a slot after each third bank of keys, and means for indicating spacing marks for both the dials and banks of keys comprising a frame or plate movable beneath the key-board plate and beneath the shield, said frame having means for indicating, through said slots and through said shield opening, spacing marks between the dial figures and between the banks of keys; substantially as described.

248. In calculating mechanism, in combination with a series of totalizing dials, means for displaying spacing or division marks therebetween with provisions for concealing the same; substantially as described.

249. In calculating mechanism, in combination with a series of totalizing dials, a plate arranged in front thereof and having a series of dial openings and also a series of openings after every third dial and spacing marks exposed through said latter series of openings; substantially as described.

250. In calculating mechanism, in combination with a series of totalizing dials, a plate arranged in front thereof and having a series of dial openings and also a series of openings respectively after the second dial and after every third dial thereafter and spacing marks exposed through said latter series of openings; substantially as described.

251. In calculating mechanism, in combination with a series of dials, means for indicating spacing therebetween for general calculations and also for money calculations; substantially as described.

252. In calculating mechanism, in combination with a series of totalizing dials, a shield arranged in front thereof and having dial openings to expose one figure of each dial, a key-board having a plate and a series of banks of keys operating therein, said shield being provided with an opening after every third dial opening, and said key-board plate being provided with a slot after each third bank of keys, and means for indicating spacing marks for both the dials and banks of keys, comprising a frame or plate movable beneath the key-board plate and beneath the shield, said frame having parallel strips of colored surface adjacent to and parallel with said slots, one of said colors being substantially that of the key-board plate and the other being distinguishable therefrom, said plate also bearing a series of commas exposable through said shield openings when said distinguishing colors are exposable through the slots; substantially as described.

253. In calculating mechanism, in combination with a series of totalizing dials, a a shield in front thereof and having dial openings to expose one figure of said dial, a key-board having a plate and a series of banks of keys operating therein, said shield being provided with an opening after every third dial opening, and said key-board plate being provided with a slot after each third bank of keys, and means for indicating spacing marks for both the dials and banks of keys comprising a frame having a series of longitudinal strips movable beneath the key-board plate and also extended forward beneath the shield and in proximity to both the slots and shield openings, said strips at the point beneath the key-board plate bearing two longitudinal lines of different colors, one being distinguishable from the color of the key-board plate and the other being substantially the same as such plate and said extensions of these strips being provided with commas adapted to register through the shield openings when the strips are so positioned as to expose the distinguishing color through the slots, and a cross piece connecting said strips and extending to the side of the machine for the purpose of shifting the frame substantially as described.

254. In calculating mechanism, in combination with a series of totalizing dials, a shield in front thereof having dial openings to expose one figure of each dial and also provided with other openings after every third dial opening and provided with additional openings between the second and third dial opening counting from the left hand dial and following every third dial thereafter, a key-board having a plate and a series of banks of keys operating therein and provided with a slot after each third bank of keys and also provided with a slot between the second and third banks of keys and also slots following every third bank thereafter, and means for indicating spacing marks for both the dials and banks of keys for general calculations and for money calculations comprising a frame or plate movable beneath the key-board plate and also beneath said shield openings, said frame having beneath the key-board plate parallel lines of different colors, one color being distinguishable as compared with the keyboard plate while the frame beneath the shield is provided with a series of commas and one decimal point whereby when the frame is in one position, the said distinguishing color will be exposed through the slots between every third bank of keys while a comma will be exposed between every third dial counting from the right and when the said frame is shifted said distinguishing color will be exposed through the slot between the second and third banks of keys counting from the left and also through the slots located after every third bank of keys counting from the second bank, while a decimal point will be exposed through the dial opening between the second and third dial and a comma will be exposed through the dial openings between every third dial counting from said decimal point; substantially as described.

255. In calculating mechanism, in combination with a series of totalizing dials, a shield arranged in front thereof and having dial openings to expose one figure of each dial and also having spacing openings arranged between the dial openings after every third dial counting from the right, also an opening between the second and third dial openings and also openings between the dial openings located after each third opening counting from the second dial opening, a key-board having a plate, a series of banks of keys operating therein, said plate being provided with a series of slots corresponding to the said spacing openings in the shield, and a plate movably arranged beneath the key-board and said shield and having thereon indicating means adapted to register or not register in the said spacing openings and the slots according as the mechanism is being used for general calculations or for money calculations; substantially as described.

256. In a calculating machine, the combination with a series of totalizing dials and mechanism for operating them, of a keyboard having different banks of keys between for actuating said mechanism, means coöperative with such keyboard for indicating spacing between the banks of keys, and means operated in unison with the first mentioned means for indicating spacing between the dials; substantially as described.

257. In a calculating machine, the combination of a keyboard having different banks of keys thereon, a series of totalizing dials operated by the keys, means for indicating spacing between the banks of keys and separate but connected means for indicating spacing between the dials; substantially as described.

258. In a calculating machine, the combination of a keyboard having different banks of keys thereon, and provided with slots between the keys at predetermined places, a series of totalizing dials operated by the keys, a sliding colored plate coöperating with the keyboard and its slits to expose at will contrasting colors through certain of the slots, a shield arranged in front of the dials and having openings at predetermined places between the dials, and plates carrying commas and a decimal point respectively, said plates being operatively connected to said sliding plate; substantially as described.

259. In a calculating machine, the combination of a keyboard having different banks of keys thereon and provided with slots between the keys at predetermined places, a series of totalizing dials operated by the keys, a sliding colored plate coöperating with the keyboard and its slots to expose at will contrasting colors through certain of the slots, a shield arranged in front of the dials and having openings at predetermined places between the dials, and a series of extensions 399 connected to and sliding with said sliding plate, said extensions bearing respectively spacing commas and a decimal point adapted to be exposed through certain of the openings in said shield; substantially as described.

260. A key-board for a combined typewriter and calculating machine, comprising a series of keys having all of the ordinary typewriter characters in one case and all the figures for the calculating machine in the other case; substantially as described.

261. A key-board for a combined typewriter and calculating machine, comprising a series of keys having all of the ordinary typewriter characters in one case and for the calculating machine having the numbers from 1 to 9 repeated in banks; substantially as described.

262. A key-board for a combined typewriter and calculating machine comprising keys for upper and lower case work and arranged in banks of nine, each bank bearing for one case work the numbers from 1 to 9 and for the other case work, the usual typewriter characters; substantially as described.

263. A key-board for a combined typewriter and calculating machine comprising keys for upper and lower case work and arranged in banks of nine, each bank bearing for one case work the numbers from 1 to 9 beginning at the front of the machine and for the other case work the usual typewriter characters; substantially as described.

264. A key-board for a combined typewriter and calculating machine comprising keys for upper and lower case work and arranged in banks of nine, each bank bearing for one case work the numbers from 1 to 9 beginning at the front of the machine with all the 1's in the first or front row, the 2's in the second row and so on and bearing for the other case work the usual typewriter characters; substantially as described.

265. A key-board for a combined typewriter and calculating machine, comprising keys for upper and lower case work and arranged in banks of nine, each bank bearing, for one case work, the numbers from 1 to 9 and for the other case work the usual typewriter characters, and a set or row of additional keys for operating the typewriter carriage; substantially as described.

266. In a combined typewriter and calculating machine, the combination of the calculating mechanism, a main lever, a typewriter, mechanism comprising a series of key-operated type levers, carriage and platen, and means controlled by the main lever for moving said platen; substantially as described.

267. In a combined typewriter and calculating machine, the combination of the calculating mechanism, a main lever coöperating with the calculating mechanism, a typewriter carriage and platen, movable means controlled by the said lever for operating the platen, and mechanism for determining the amount of movement of said means at each operation of the said lever; substantially as described.

268. In a combined typewriter and calculating machine, the combination, with calculating mechanism and also a typewriter carriage and its platen, of a main lever coöperating with the calculating mechanism and having a fixed or predetermined movement, and means controlled by the main lever for moving the platen; substantially as described.

269. In a combined typewriter and calculating machine, the combination, with calculating mechanism and also a typewriter carriage and its platen, of a main lever coöperating with the calculating mechanism and having a fixed or predetermined movement, and means adapted to move said platen and adjustable to move the platen different distances, said means being controlled by said main lever; substantially as described.

270. In a combined typewriter and calculating machine the combination, with calculating mechanism and also a typewriter carriage with its platen, of a main lever coöperating with the calculating mechanism and having a fixed or predetermined movement, and means controlled by the main lever and adapted to move the plate different predetermined amounts with the same movement of the lever; substantially as described.

271. In a combined typewriter and calculating machine, the combination of the calculating mechanism, a main lever coöperating with such mechanism, a typewriter carriage and platen, a paper feed bail pivoted upon the carriage, an operative connection between the paper feed and the platen, and a hook controlled by said lever and adapted to operate said paper feed bail; substantially as described.

272. In a combined typewriter and calculating machine, the combination of the calculating mechanism, a main lever for such mechanism, a typewriter carriage and platen, a paper feed bail pivoted on the carriage in operative connection between the platen and the paper feed bail, a vertically movable plate having a hook adapted to engage and operate said paper feed bail and itself operated by the main lever; substantially as described.

273. In a combined typewriter and calculating machine, the combination of the calculating mechanism, a main lever for such mechanism, typewriter carriage and platen, a paper feed bail pivoted on the carriage, an operative connection between the paper feed bail and the platen, a vertically movable plate having its upper end in the form of a hook engaging and operating the paper feed bail, and having its lower end extended laterally and provided with a slot, said lever or restoring bail having a cross rod 188 working in said slot for reciprocating said plate; substantially as described.

274. In combined typewriting and adding mechanism, the combination with the adding mechanism, comprising registering devices, a series of movable members normally tending to actuate said mechanism, key elements arranged in multiple banks for controlling the adding mechanism, and typewriting mechanism also controlled by the key elements and arranged to consecutively print the figures comprising the item written on the key-board; substantially as described.

275. In combined typewriting and adding mechanism, the combination with the adding mechanism comprising registering devices, a series of longitudinally movable members coöperating with the registering mechanism and normally tending to actuate the same, a corresponding series of banks of keys and key elements to control said members, each bank having nine keys of a value from 1 to 9, and typewriting mechanism also controlled by the key elements and arranged to consecutively print the figures comprising the item written on the keyboard; substantially as described.

276. In combined typewriting and adding mechanism, the combination with the adding mechanism comprising registering devices, consisting of a series of adding dials and pinions, a corresponding series of independently operable racks adapted to engage the pinions and normally tending to actuate them, a corresponding series of banks of keys and key elements to control said racks and their extent of movement, and typewriting mechanism also controlled by the key elements and arranged to consecutively print the figures comprising the items written on the keyboard; substantially as described.

277. In combined typewriting and adding mechanism, the combination with the adding mechanism, consisting of a series of adding dials and pinions rotatable on a relatively fixed axis, a corresponding series of independently operable racks adapted to engage the pinions and normally tending to actuate them, typewriting mechanism arranged to consecutively print the figures comprising the item written on the keyboard, and a series of banks of keys and key elements arranged to control said racks and their extent of movement and also to actuate the typewriting mechanism; substantially as described.

278. In combined typewriting and adding mechanism, the combination with the adding mechanism, consisting of a series of adding dials and pinions rotatable on a relatively fixed axis, a corresponding series of independently operable racks adapted to engage the pinions and normally tending to actuate them, typewriting mechanism arranged to consecutively print the figures comprising the item written on the keyboard, and a series of keys and key elements arranged to control said racks and their extent of movement and also to actuate the typewriting mechanism, said racks being normally in mesh with said pinions and arranged in the adding operation, to move their pinions whenever one of the keys in their corresponding rows of keys is operated; substantially as described.

279. In combined typewriting and adding mechanism, the combination, with a series of banks of keys representing the digits 1 to 9, of a corresponding series of movable racks, registering mechanism having pinions engaged by said racks, stop mechanism for determining the extent of movement of such racks, typewriting mechanism comprising a platen and type bars, key elements operatively connected with the type bars and also controlling the stop mechanism; substantially as described.

280. In combined typewriting and adding mechanism, the combination with a series of banks of keys representing the digits 1 to 9, of a corresponding series of movable racks, registering mechanism having pinions engaged by said racks, stop mechanism for determining the extent of movement of such racks, typewriting mechanism comprising a platen and type bars, key elements and a series of wires connecting each key with its type bar and having a projection coöperating with and arranged to actuate the stop mechanism; substantially as described.

281. In combined typewriting and adding mechanism, the combination with a series of banks of keys representing the digits 1 to 9, of a corresponding series of movable racks, registering mechanism having pinions engaged by said racks, stop mechanism for determining the extent of movement of such racks, typewriting mechanism comprising a platen and type bars, said stop mechanism comprising a series of spring pressed sliding plates, key elements and a series of wires, each having a projection arranged to actuate its sliding plate when operated by its corresponding key.

282. In combined typewriting and adding mechanism, the combination, with a series of banks of keys representing the digits 1 to 9, of a corresponding series of movable racks, registering mechanism having pinions engaged by said racks, stop mechanism for determining the extent of movement of such racks, typewriting mechanism comprising a platen and type bars, said stop mechanism comprising a series of equidistantly spaced sliding plates arranged parallel to each other and corresponding in number to the number of keys, a series of keys arranged in banks, and key elements coöperating therewith and provided with a series of operating wires or rods, each wire having a projection in whose path of movement the sliding plate corresponding therewith is arranged; substantially as described.

283. In combined typewriting and adding mechanism, the combination, with adding mechanism comprising registering devices and with typewriting mechanism having type bars, or a series of keys of different values, movable rods or wires operated by the keys and connected with the type bars, a series of sliding stops actuated by said rods or wires and corresponding in value to said keys, and a movable member coöperating with the registering devices, and whose extent of movement is determined by the particular stop operated, and means for locking said movable member in normal position; substantially as described.

284. In a machine of the character described, the combination with a set of adding wheels having zero projections; of clearing means and a member operated thereby and having abutments for said zero projections respectively.

285. In a machine of the character described, the combination of a set of adding wheels having zero projections, clearing means, and a bail operated thereby and having portions for the zero projection to abut, the wheels being set in motion as a result of operation of said clearing means and being arrested when their zero projections encounter said portions of the bail.

286. In a machine of the character described, the combination of a set of adding ing wheels having zero projections, spring drawn actuator slides for said wheels, detents for said slides, and clearing means comprising detent-releasing parts and parts to present abutments for the zero projections to encounter which latter parts are normally out of the paths of said projections.

287. In a machine of the character described, the combination of a set of adding wheels having zero projections, spring-drawn actuator slides for said wheels, detents for said slides, and clearing means comprising detent-releasing parts and a bail with fingers to be projected into the paths of the zero projections on the wheels.

288. In a machine of the class described, adding wheels, racks adapted to be brought into engagement therewith and moved in one direction to add to or in the other direction to subtract from the total on said wheels, and means for giving a carrying movement to said racks forward or backward as there is an adding or subtracting operation being performed.

JOHN T. HOWIESON.

Witnesses:
SAMUEL E. HIBBEN,
JOHN H. BERKSTRESSER.

Copies of this patent may be obtained for five cents each, by addressing the "Commissioner of Patents, Washington, D. C."